Aug. 3, 1954 H. E. SCHALLER 2,685,309
FLOAT CUTTING APPARATUS FOR LOOMS AND METHOD
Filed March 20, 1950 20 Sheets-Sheet 2

INVENTOR.
HAROLD E. SCHALLER.
BY
ATTORNEY

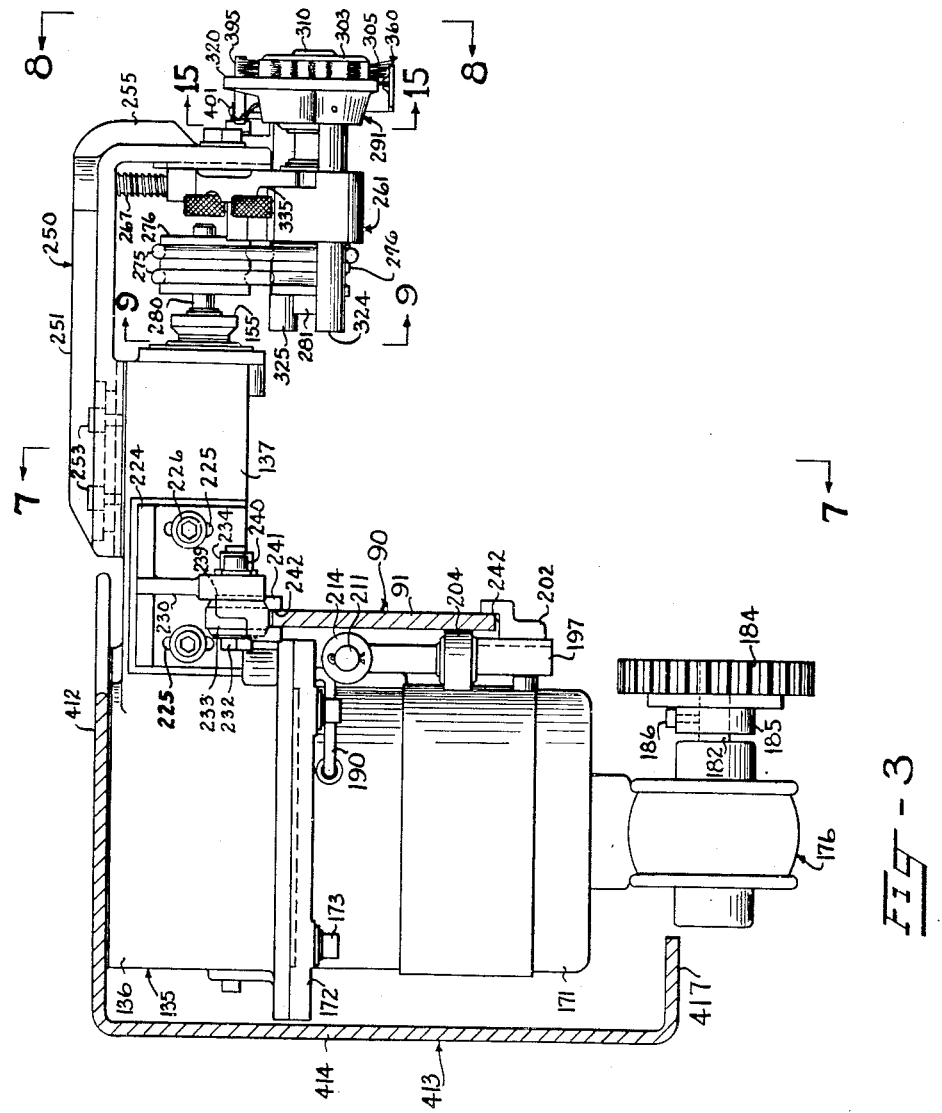

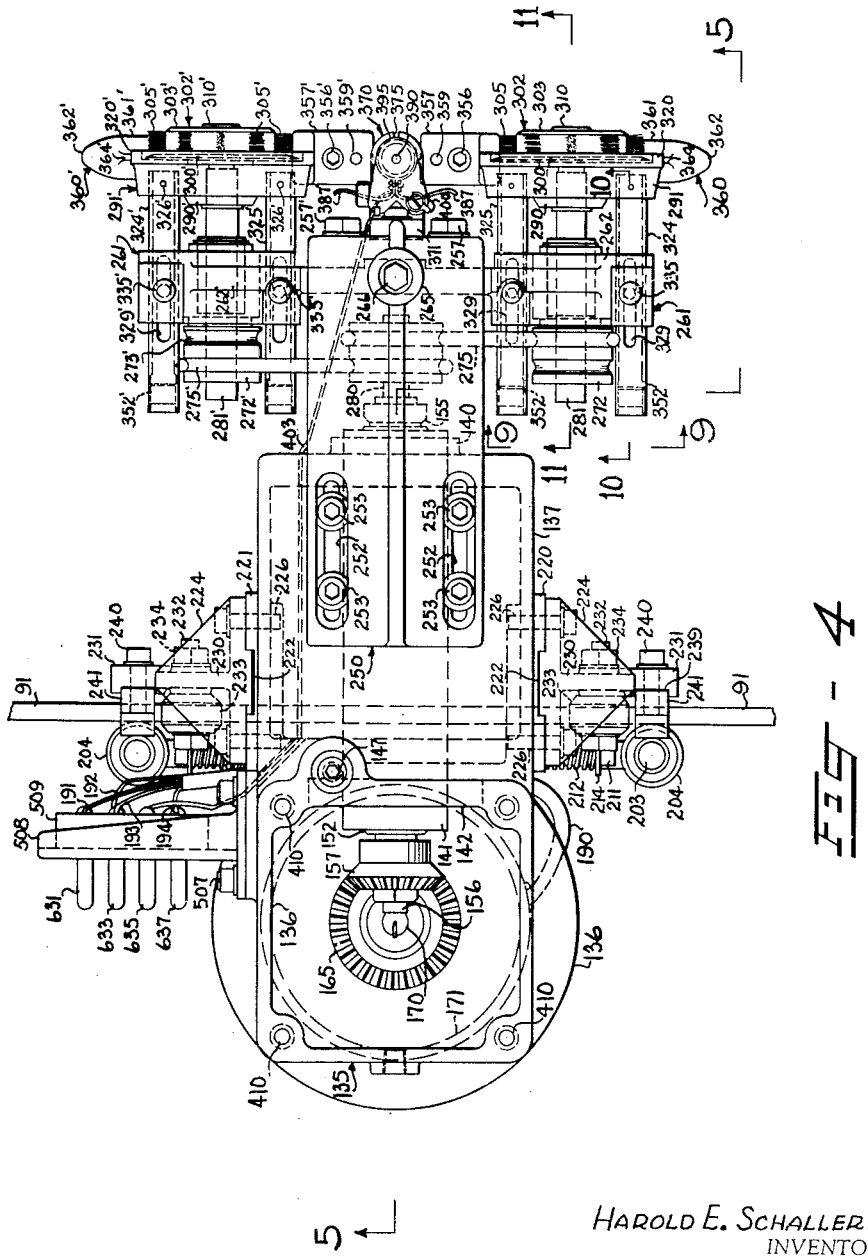

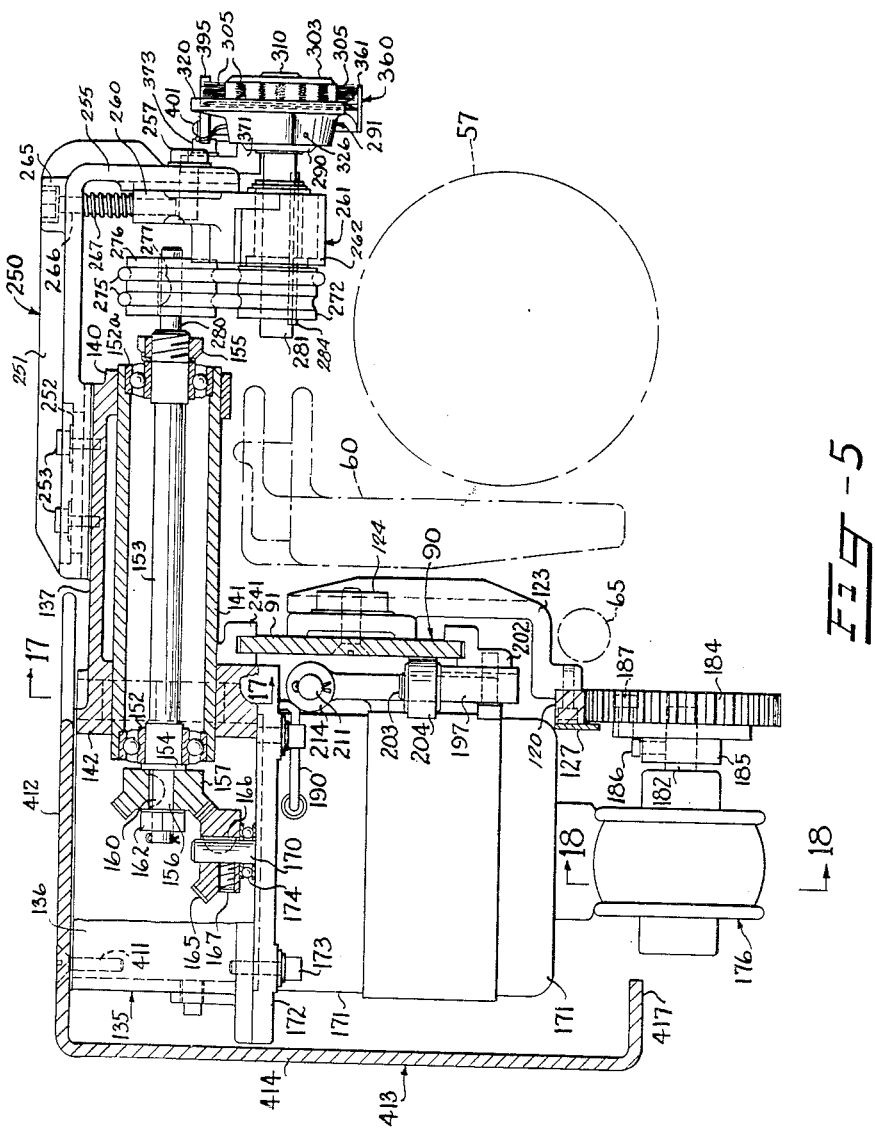

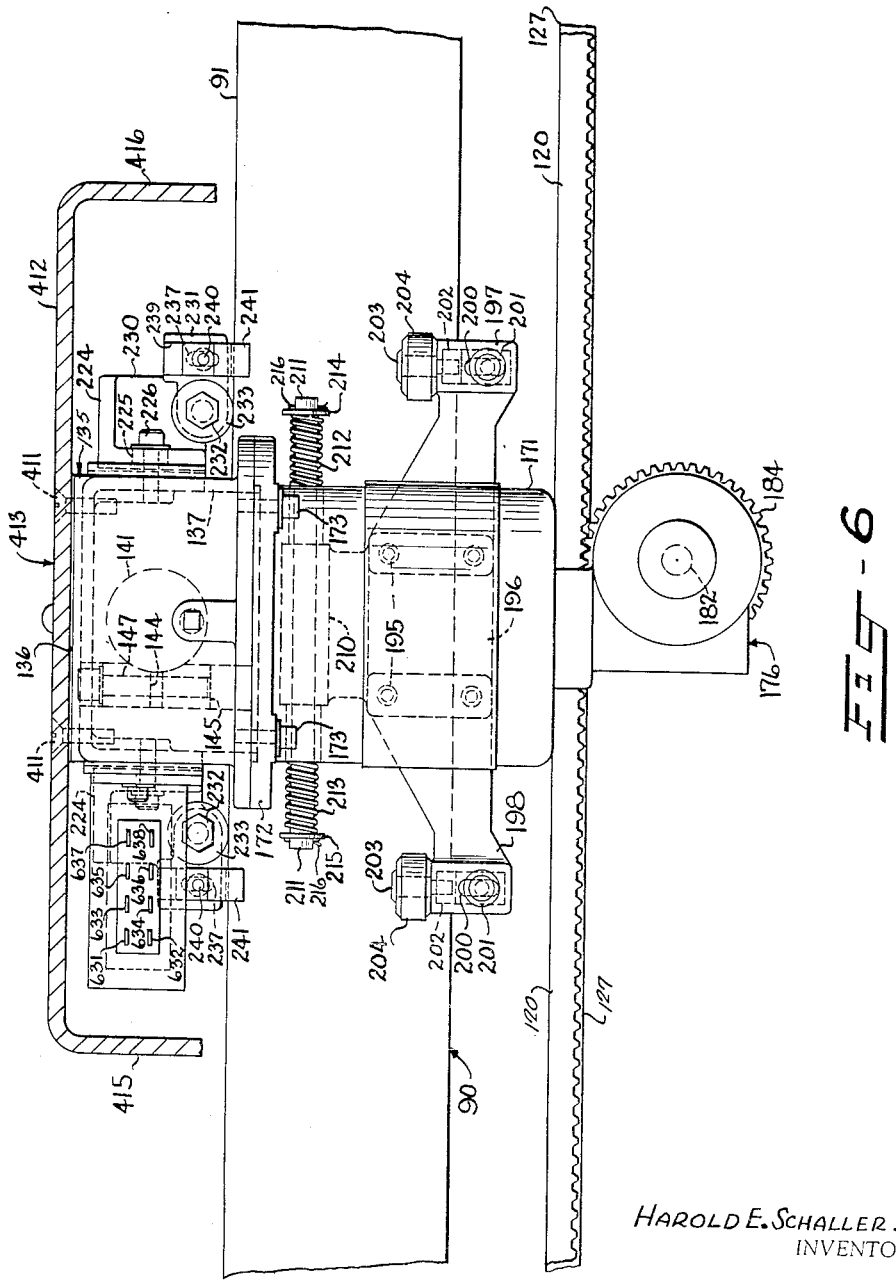

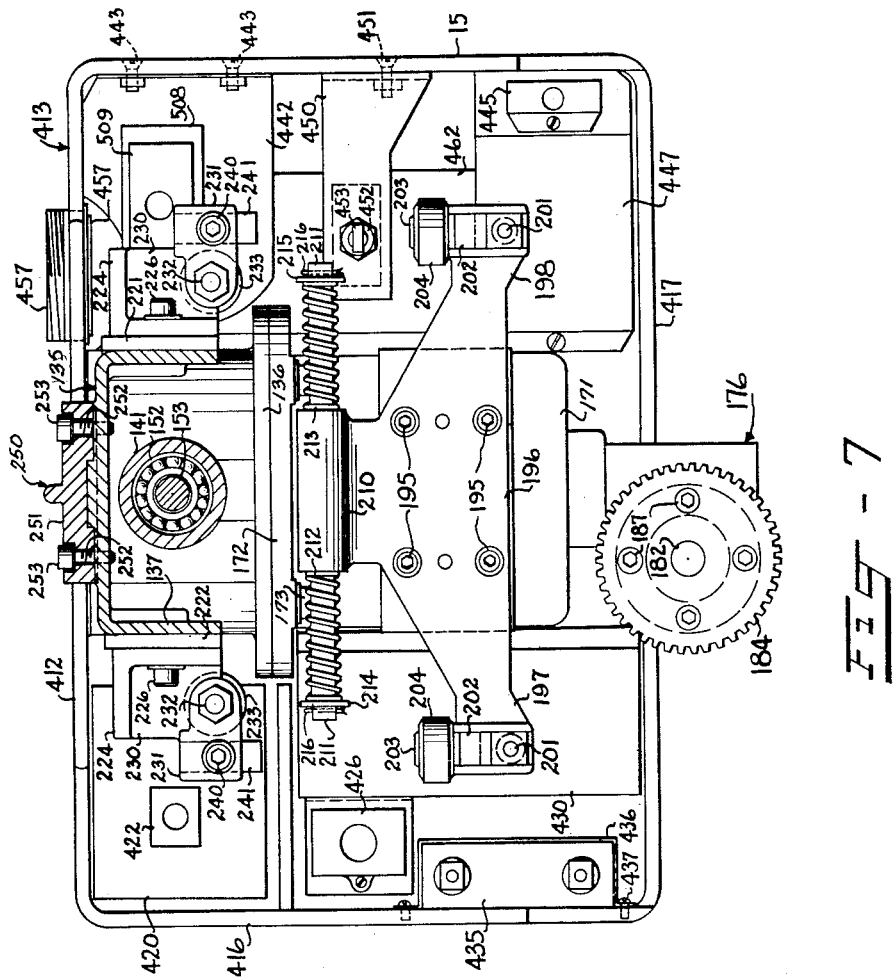

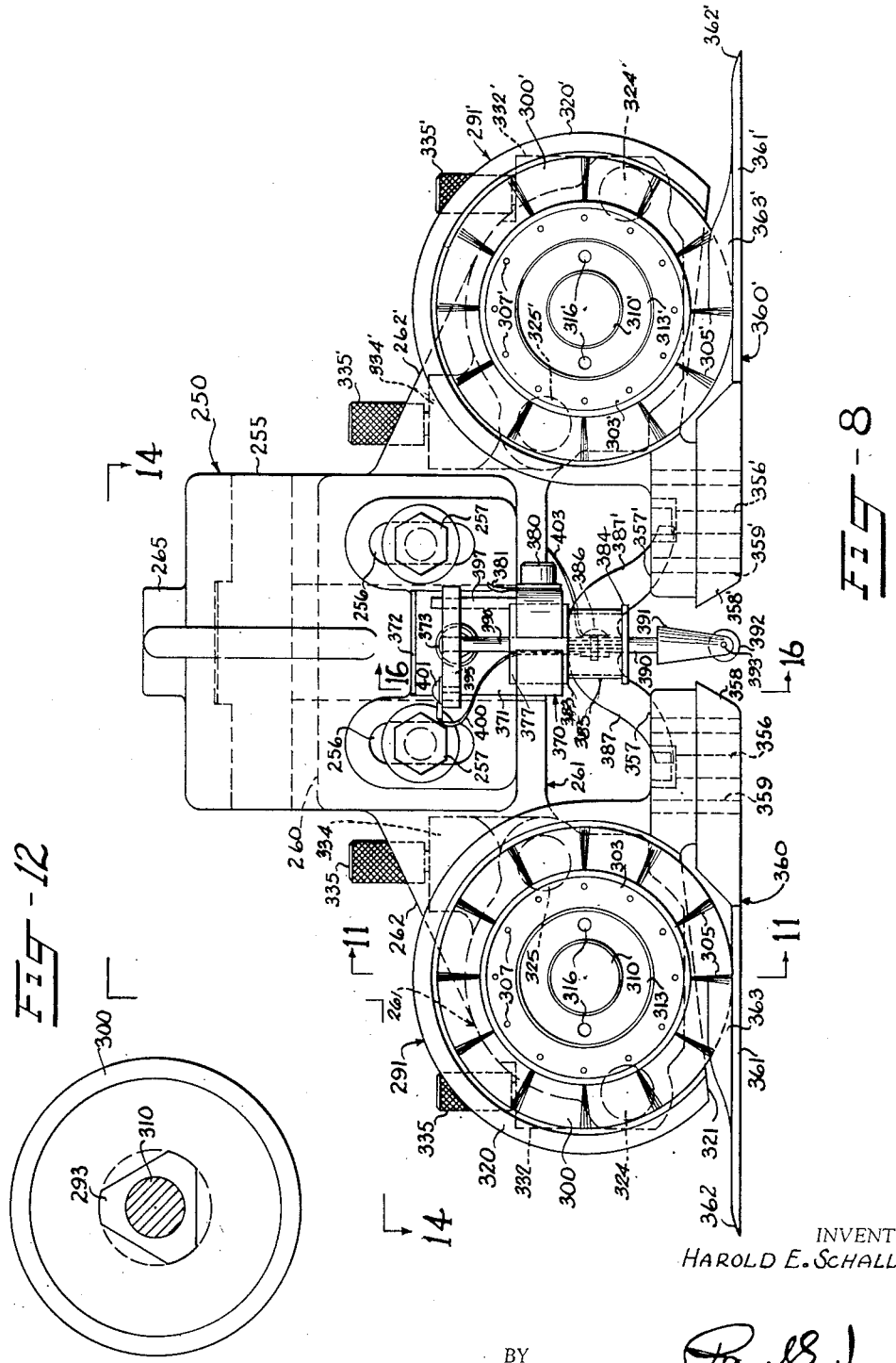

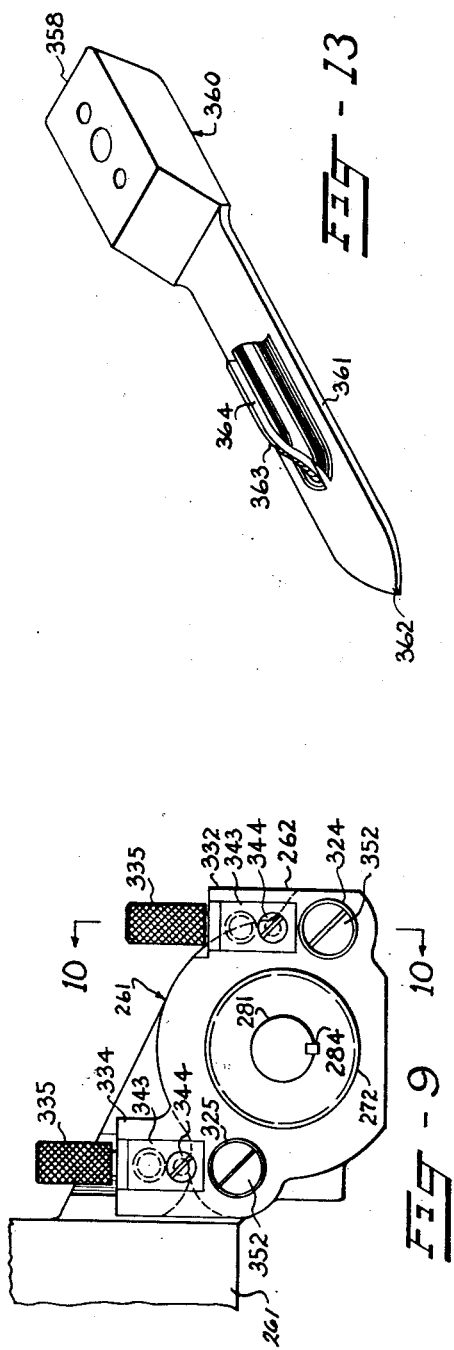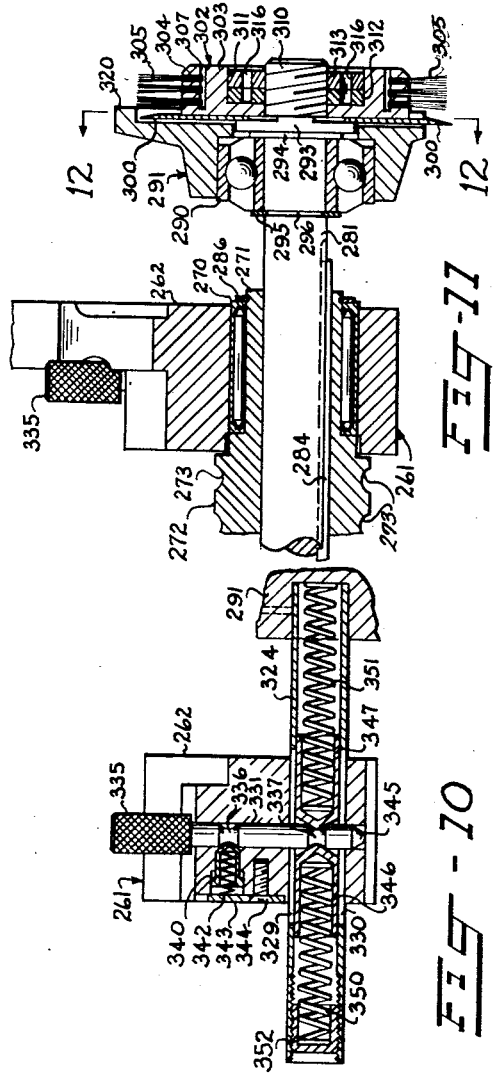

Aug. 3, 1954  H. E. SCHALLER  2,685,309
FLOAT CUTTING APPARATUS FOR LOOMS AND METHOD
Filed March 20, 1950  20 Sheets—Sheet 10
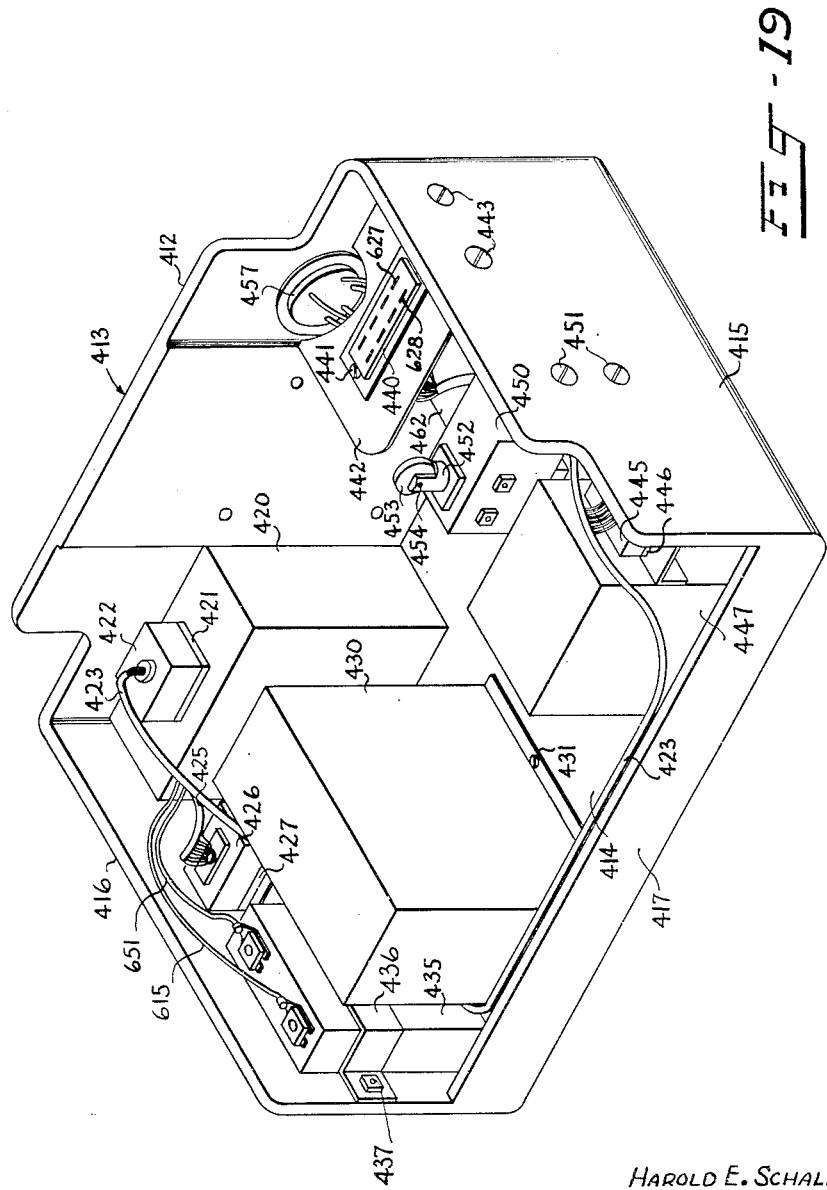
HAROLD E. SCHALLER,
INVENTOR.
BY
ATTORNEY

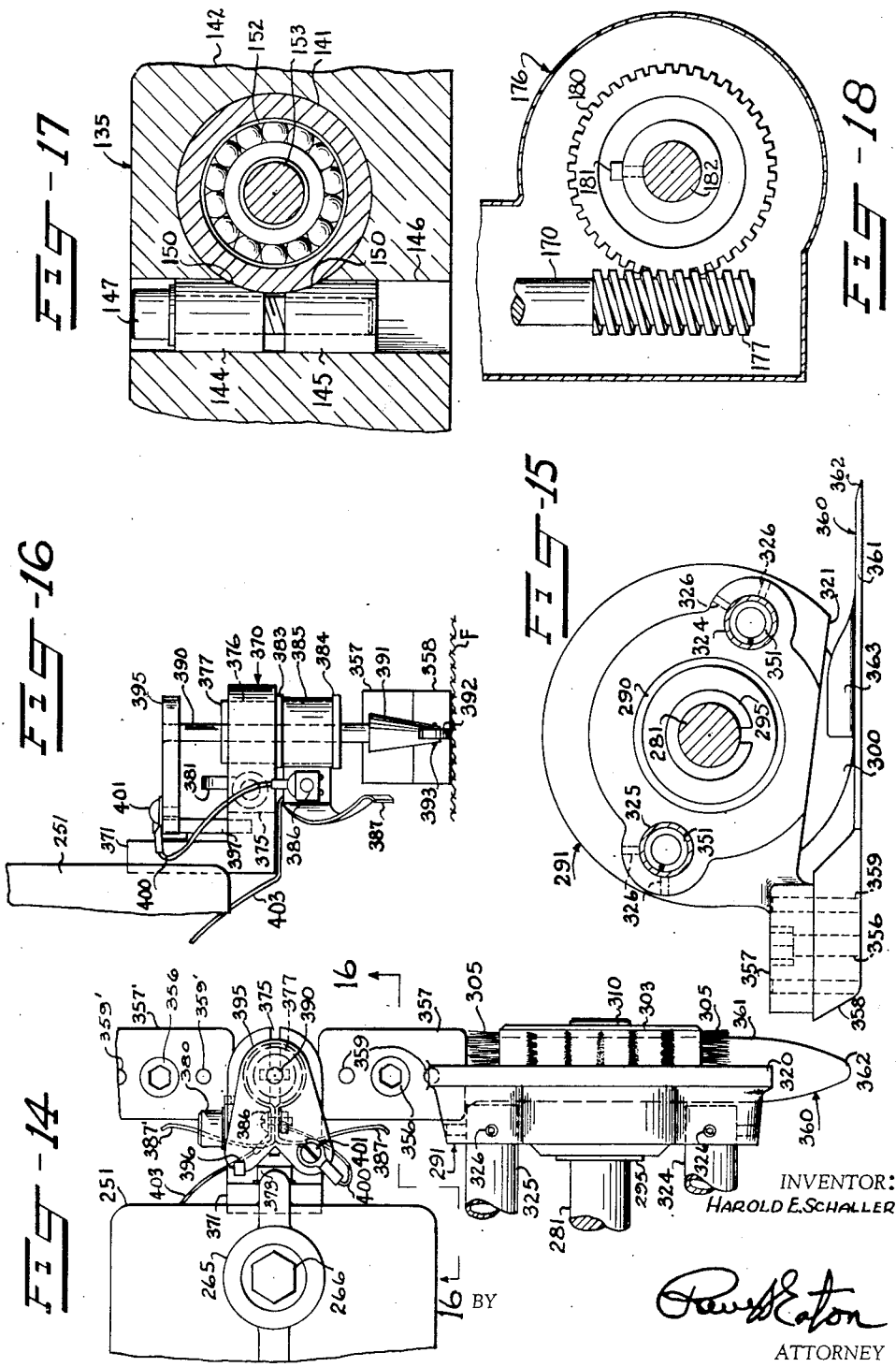

Aug. 3, 1954 — H. E. SCHALLER — 2,685,309
FLOAT CUTTING APPARATUS FOR LOOMS AND METHOD
Filed March 20, 1950 — 20 Sheets-Sheet 12
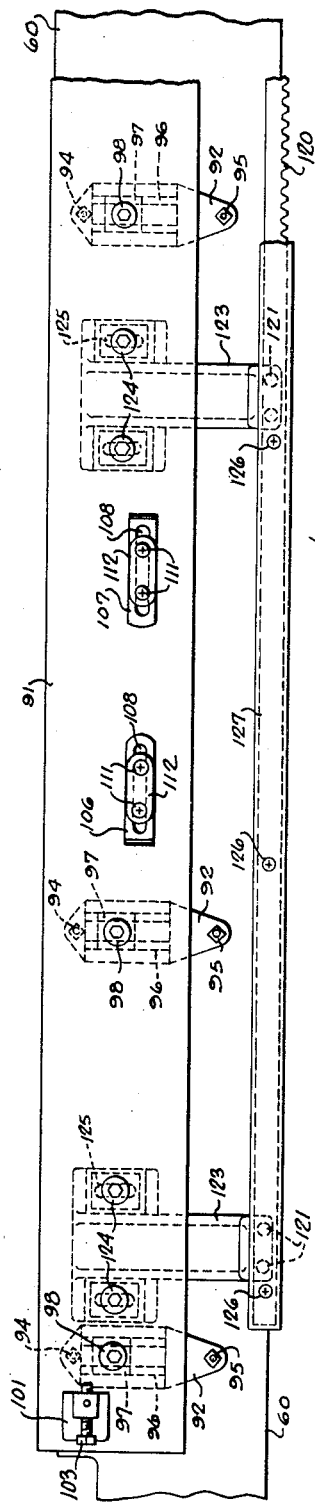
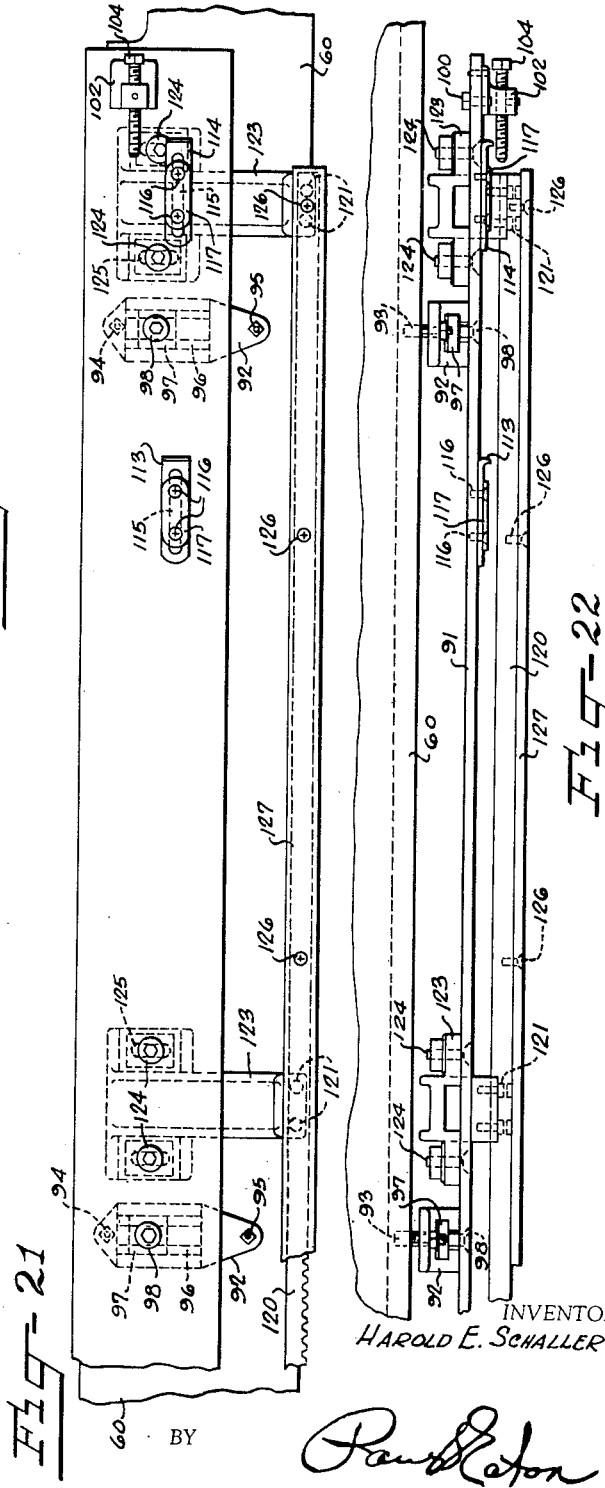
INVENTOR:
HAROLD E. SCHALLER.
BY
ATTORNEY

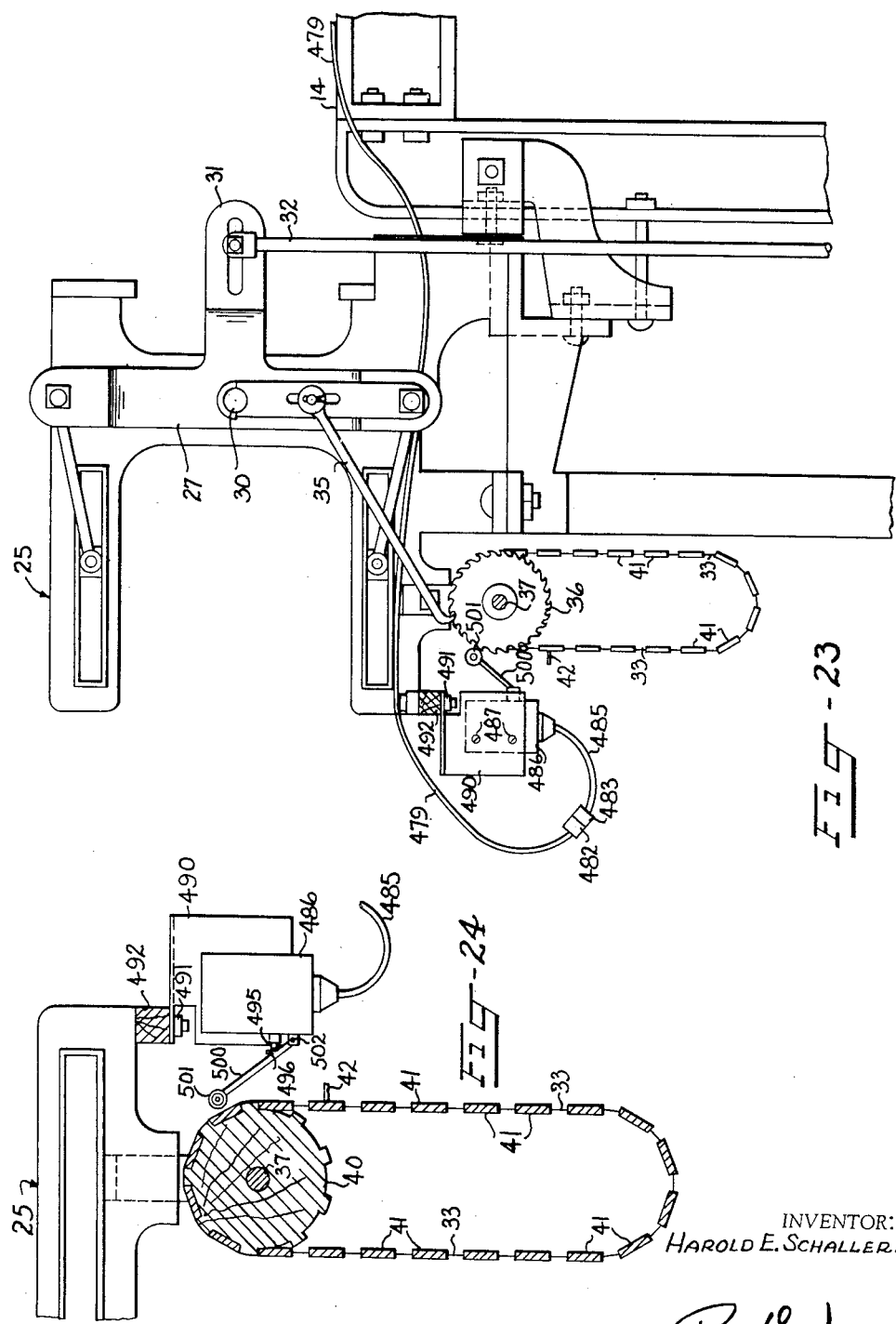

Aug. 3, 1954  H. E. SCHALLER  2,685,309
FLOAT CUTTING APPARATUS FOR LOOMS AND METHOD
Filed March 20, 1950  20 Sheets-Sheet 14
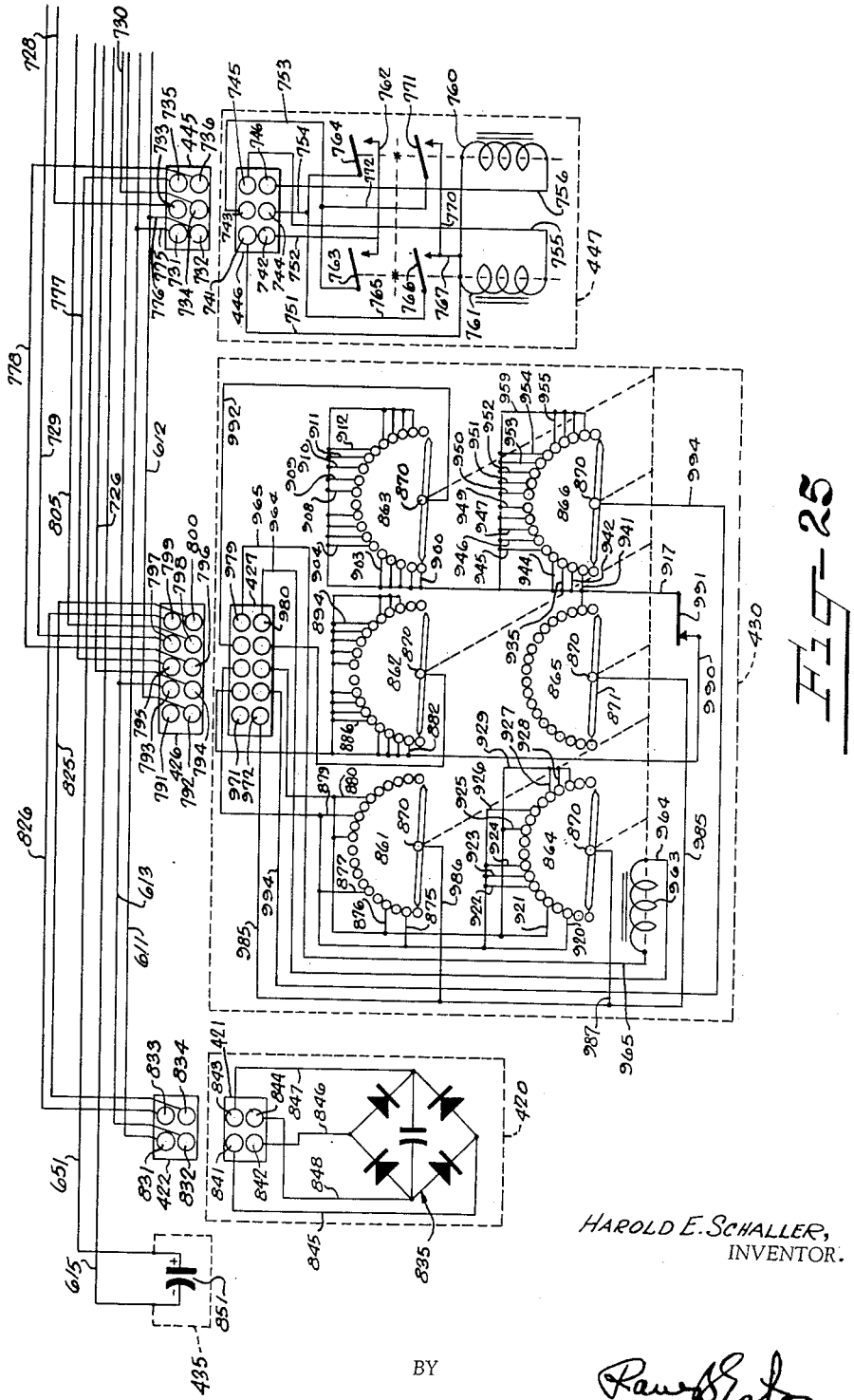
HAROLD E. SCHALLER,
INVENTOR.
BY
ATTORNEY

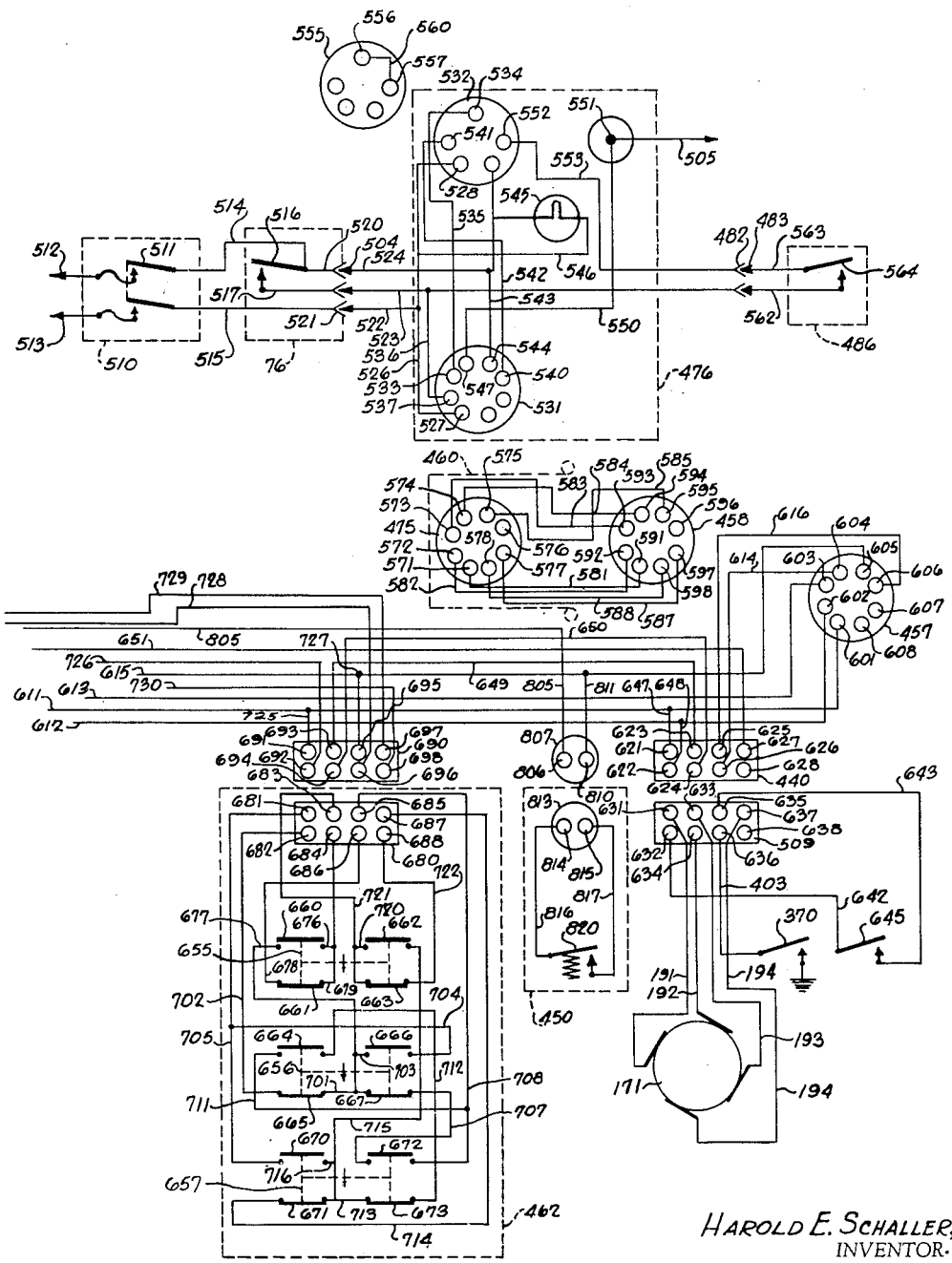
Fig-25-A
HAROLD E. SCHALLER, INVENTOR
ATTORNEYS

Aug. 3, 1954  H. E. SCHALLER  2,685,309
FLOAT CUTTING APPARATUS FOR LOOMS AND METHOD
Filed March 20, 1950  20 Sheets-Sheet 16
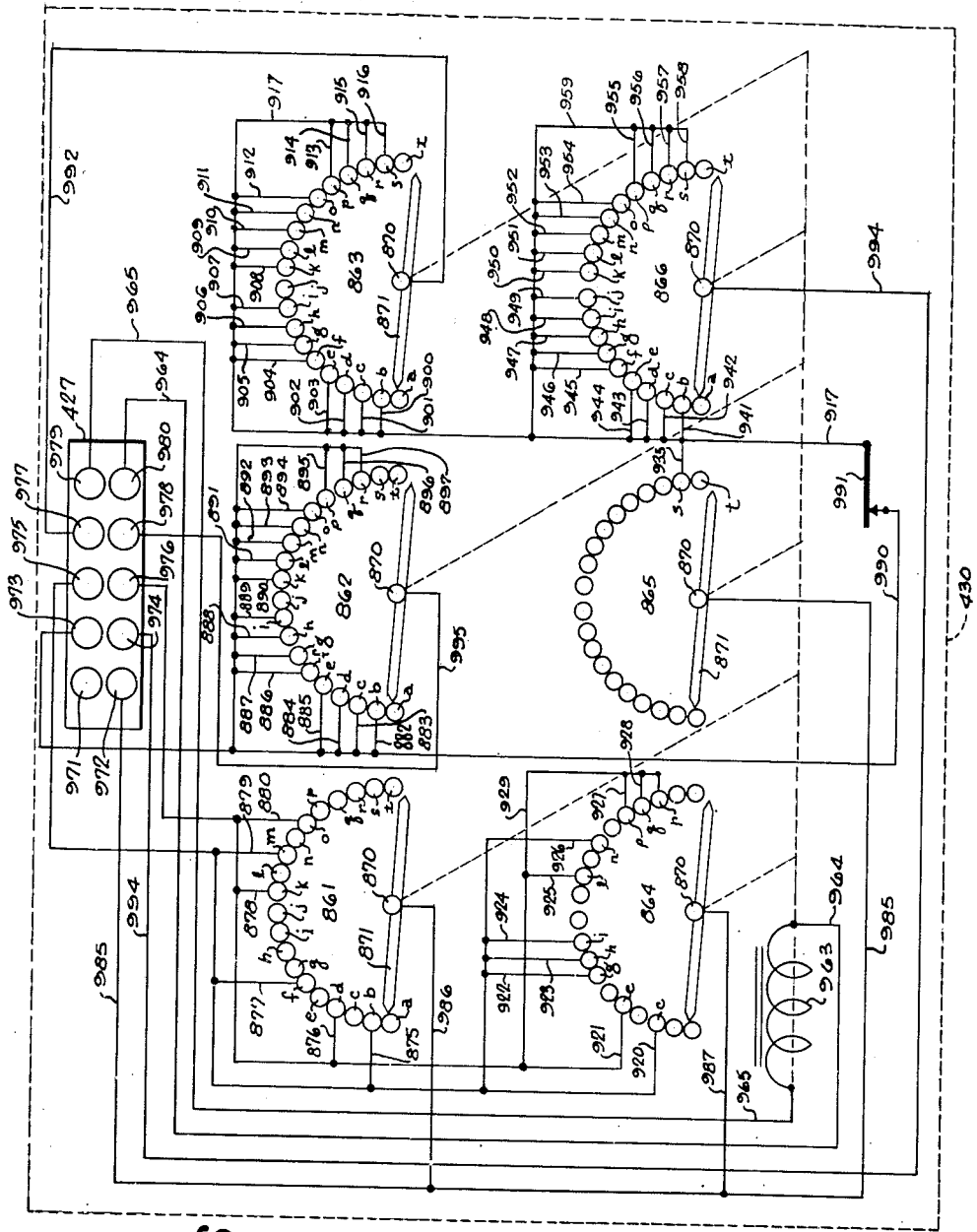
INVENTOR:
HAROLD E. SCHALLER.
BY
ATTORNEY

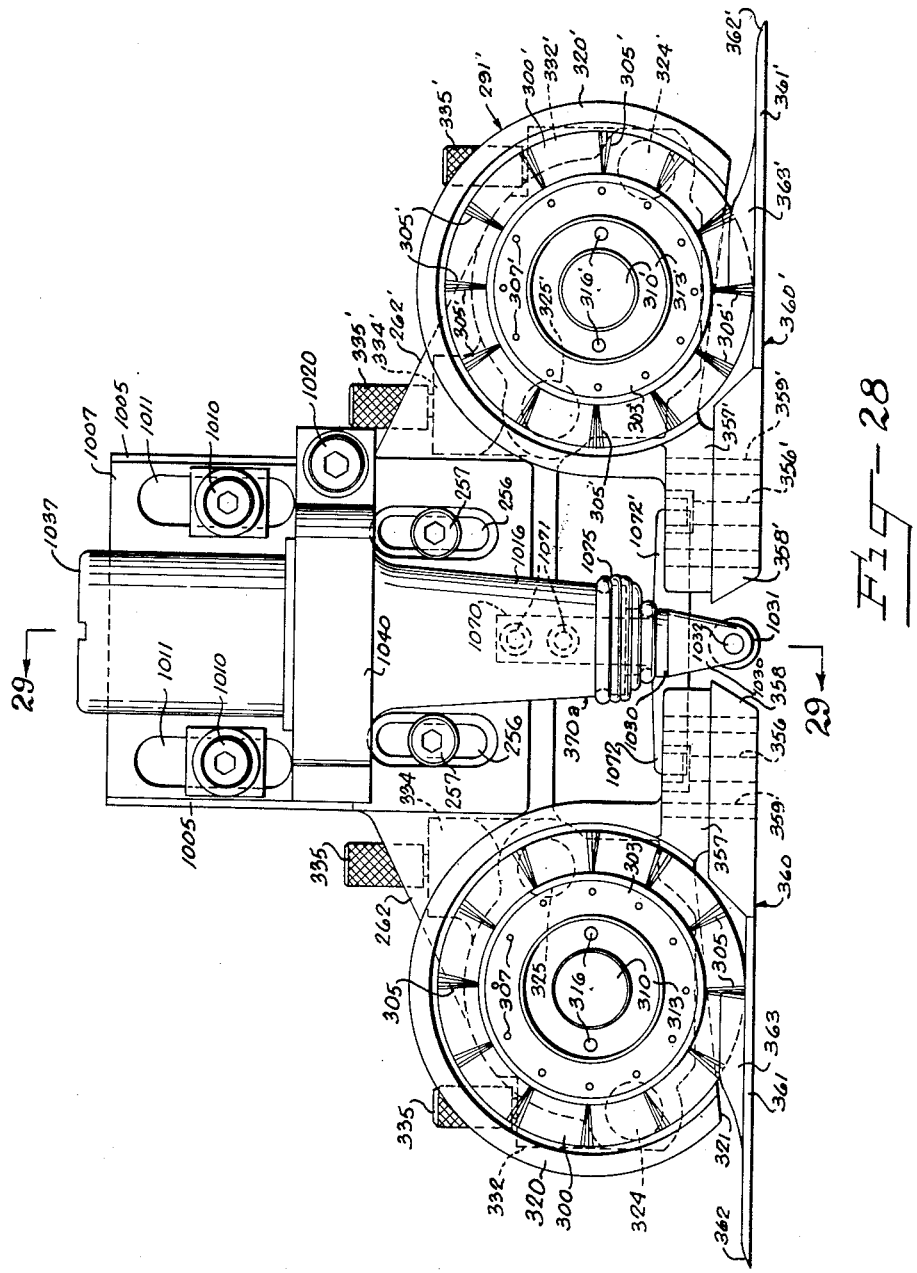

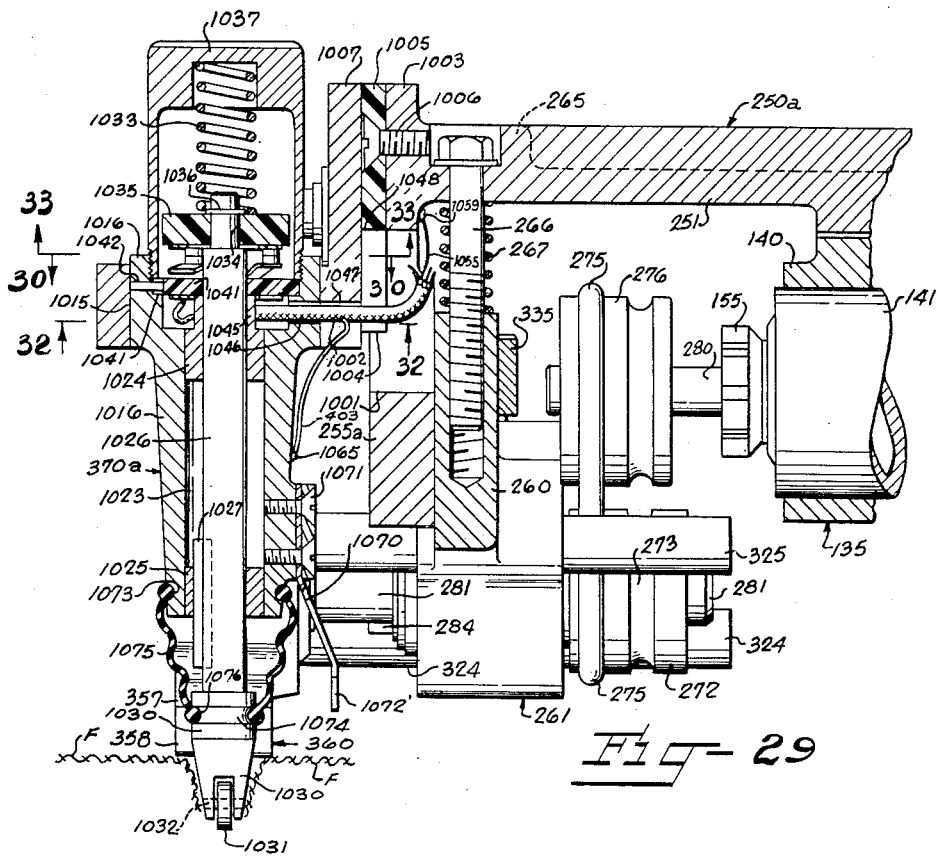
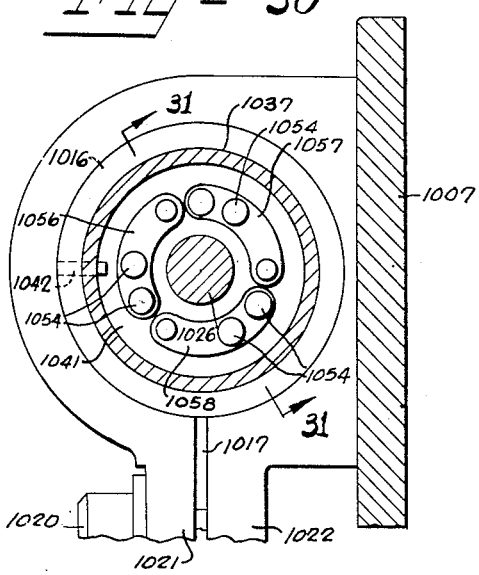
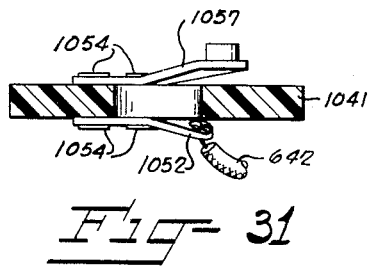

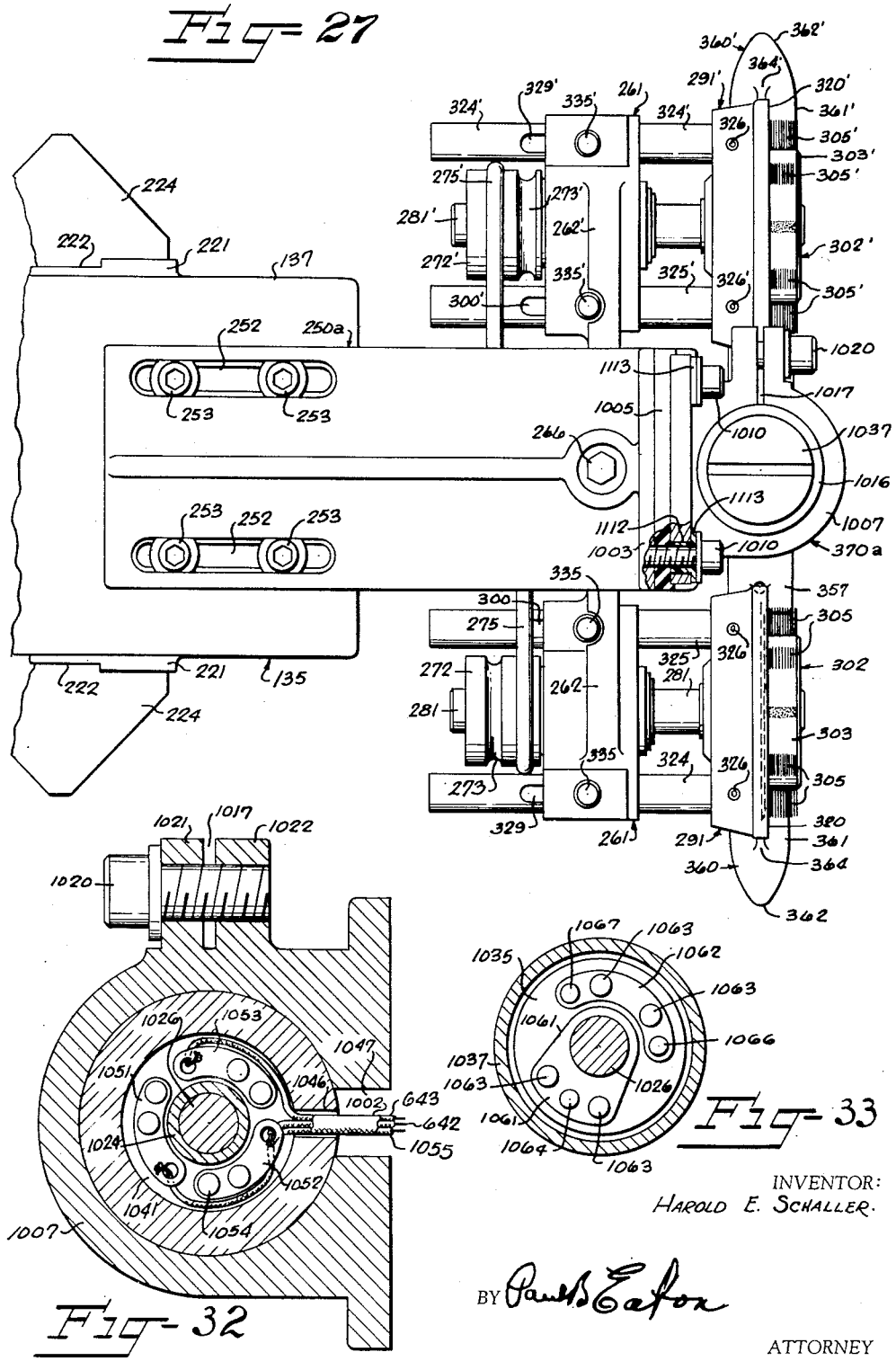

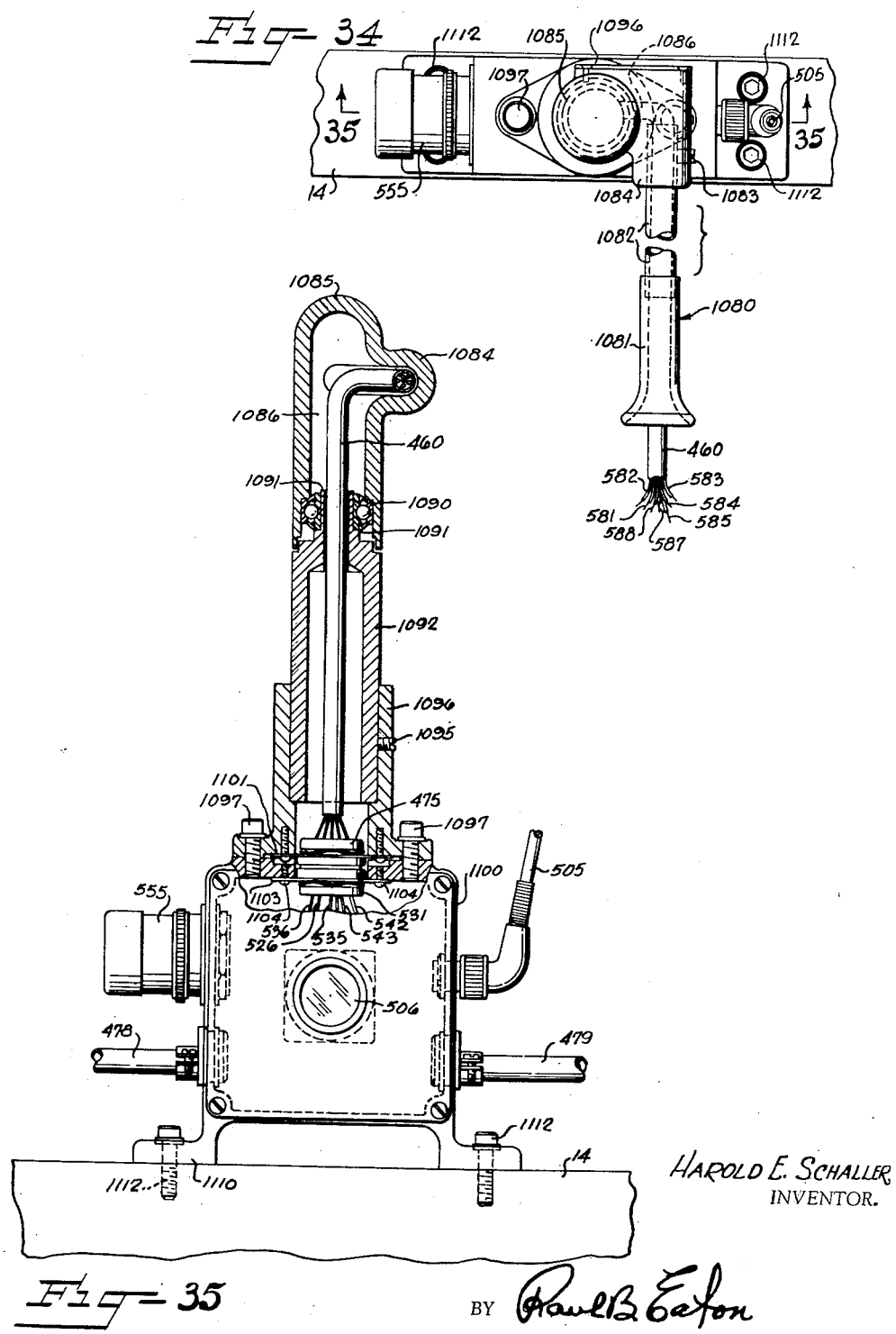

UNITED STATES PATENT OFFICE 2,685,309

FLOAT CUTTING APPARATUS FOR LOOMS AND METHOD

Harold E. Schaller, Lexington, Mass., assignor, by mesne assignments, to Scotland Mills, Inc., Laurinburg, N. C., a corporation of North Carolina Application March 20, 1950, Serial No. 150,599

48 Claims. (Cl. 139—291)

This invention relates to an improved float cutting apparatus employed in the production of tufted woven fabrics and which is particularly adapted for use on a loom.

In the production of a tufted woven fabric, successive alternate portions of either the warp yarns or the filling yarns are floated for a considerable distance on the surface of the fabric, after which the floated yarns are severed and then brushed or finished in any desired manner to produce the desired tufted effect.

It is an object of this invention to sever the floated yarns as a part of the weaving operation to form tufts and to simultaneously fluff the tufts formed by severing of the floats.

It is another object of this invention to provide an improved float cutting apparatus adapted to be mounted on a loom and having driven rotary cutting disks thereon and means associated with the cutting disks for guiding the floated yarns into engagement with the rotary cutting disks.

It is still another object of this invention to provide pattern controlled means associated with a loom for controlling a float cutting apparatus of the type described so as to cause the same to traverse the width of the fabric being woven on the loom as the floated yarns are formed by the warp yarns and in timed relation to the fabric take-up means.

It is still another object of this invention to provide rotary brushes in association with the rotary cutting disks of a float cutting apparatus of the type heretofore described, said rotary brushes being adapted to fluff the tuft formed from the severed floats immediately upon the floated warp yarns being severed by the rotary cutting disks, so as to not only produce a napped effect at the severed ends of the floated yarns but to also assist in locking the severed floated yarns so as to prevent their free ends from being pulled out of the woven fabric upon the next succeeding floated portions of the same warp yarns being severed.

Due to the fact that rotary cutting disks are employed in a float cutting apparatus of the type described, means are provided for directing the floated warp yarns to each of the rotary cutting disks, such means comprising a pair of guides pointing in opposite directions and having pointed free ends which pass between the floated yarns and the woven fabric therebeneath to move these floated yarns away from the woven fabric and into engagement with the rotary cutting blades. However, since the cutting disks, while at rest, are disposed above one or the other of the selvages of the fabric as it is woven, it is obvious that at least a few of the floated portions of the warp yarns will pass beneath the plows as the fabric is taken up by the usual take-up means on a loom. Therefore, it is still another object of this invention to provide pattern controlled means for moving the improved float cutting apparatus away from the adjacent selvage of the fabric, during which the plow furthest from the corresponding selvage passes beneath the floats in front of the same but not those floats that happen to be beneath the same. The latter means then causes the apparatus to reverse its direction of movement so that the leading plow; that is, the plow nearest the corresponding selvage during this reverse movement, will move between the floated yarns, which had previously passed beneath the same, and the woven fabric so as to direct these floated yarns to the adjacent rotary cutting disk, after which automatically operable means are provided to again reverse the direction of movement of the float cutting apparatus so as to cause the same to traverse the width of the fabric. It is evident that the leading plow will then pass beneath all of the remaining unsevered floats to the opposite selvage, causing these floats to be severed.

Due to the fact that several strokes will normally be imparted to the lay of the loom during the period in which the improved float cutting apparatus is traversing the width of the woven fabric in a cutting operation and will, of course, cause the fabric to be taken up by the conventional take-up mechanism of the loom, it is a further object of this invention to provide, in a float cutting apparatus of the type described resilient supporting means for the plows, the fluffing brushes and the rotary cutting disk, which sever the floated warp yarns, so as to permit the plows to guide the cutting disks in such a manner that they will follow a line substantially bisecting the floated portions of the warp yarn midway of the point at which they are tied into the woven surface. In this instance, the plows are guided by engaging the floated warp yarns at the point where they are woven into the fabric. Furthermore, it is well known that in conventional looms bowed fillings are common, that is, the filling does not run in a straight line from selvage to selvage, thus the plows or guide tongues cause the severing disks to follow the transverse line of floats to sever the same at their middle point.

Some of the objects of the invention having been stated, other objects will appear as the description proceeds, when taken in connection with the accompanying drawings in which—

Figure 3 is an enlarged side elevation of the improved float cutting apparatus removed from the loom and showing the motor cover thereof in cross section as well as a part of the supporting means for the apparatus and is taken substantially along the line 3—3 in Figure 2;

Figure 4 is a top plan view of the structure shown in Figure 3 but omitting the motor cover and many of the electrical components associated therewith;

Figure 5 is a right-hand side elevation similar to that shown in Figure 3 but showing the upper portion thereof in section, this vertical sectional portion being taken substantially along the line 5—5 in Figure 4 and also showing the breast beam and sand roll of the loom in dotted lines in association with the float cutting apparatus;

Figure 6 is an elevation looking at the left-hand side of the float cutting apparatus shown in Figure 3 with part of the motor cover being broken away and also being in cross section and omitting many of the electrical components which are mounted in the motor cover;

Figure 7 is a vertical sectional view taken substantially along the line 7—7 in Figure 3 and showing the cutting apparatus removed from the loom;

Figure 8 is an enlarged elevation of the cutter head and looking along the line 8—8 at the right-hand side of Figure 3;

Figure 9 is an elevation looking at the opposite side of the left-hand portion of Figure 8 and also looking substantially along the lines 9—9 in Figures 3 and 4;

Figure 10 is an enlarged vertical sectional view showing one of the resilient means associated with the plows, the cutting disks and the fluffing brushes and being taken substantially along the lines 10—10 in Figures 4 and 9;

Figure 11 is an enlarged vertical sectional view taken substantially along the lines 11—11 in Figures 4 and 8 and showing the manner in which one of the cutting disks and its associated fluffing brush are mounted;

Figure 12 is an elevation of one of the cutting disks, looking substantially along the line 12—12 in Figure 11, and showing the shaft therefor in cross-section;

Figure 13 is an isometric view of one of the float guiding plows removed from the float cutting apparatus;

Figure 14 is an enlarged top plan view of the cutter head at the lower right-hand portion of Figure 4 with parts broken away for purposes of clarity and also looking substantially along the line 14—14 in Figure 8;

Figure 15 is an enlarged elevation, with parts in section, and is taken substantially along the line 15—15 in Figure 3 but showing only that portion of the cutting apparatus nearest the observer in Figure 3;

Figure 16 is an elevation, with parts broken away, looking substantially along the lines 16—16 in Figures 8 and 14;

Figure 17 is an enlarged fragmentary vertical sectional view taken substantially along the line 17—17 in Figure 5;

Figure 18 is an enlarged vertical sectional view showing the gear reduction unit associated with the electric motor for moving the float cutting apparatus across the loom and is taken substantially along the line 18—18 in Figure 5;

Figure 19 is an isometric view of the motor cover removed from the float cutting apparatus and showing the exterior of the electrical parts carried thereby;

Figure 20 is a fragmentary elevation looking substantially along the line 20—20 in Figure 1 and showing a portion of the trackway which is traversed by the floating cutting apparatus;

Figure 21 is a view similar to Figure 19 but showing the other end of the trackway for the float cutting apparatus and looking substantially along the line 21—21 in Figure 1;

Figure 22 is a top plan view of the structure shown in Figure 21;

Figure 23 is an enlarged schematic elevation of the dobby head associated with the loom and looking substantially along the line 23—23 in Figure 1 and showing a pattern controlled electrical switch mechanism in association therewith;

Figure 24 is a view looking at the opposite side of the electrical switch from that shown in Figure 23 and is also an enlarged vertical sectional view taken substantially along the line 24—24 in Figure 1;

Figures 25 and 25A show an electrical diagram wherein the circuits and electrical apparatus are shown schematically and all of the electrical apparatus being shown disassociated from the float cutting apparatus and the loom;

Figure 26 is an enlarged schematic view of the stopping switch shown in the central portion of Figure 25;

Figure 27 is an enlarged view similar to the right-hand portion of Figure 4 but showing a modified form of stop motion apparatus connected to the extreme right-hand end of the bracket 259, the bracket also being modified in Figure 27 to accommodate this modified form of stop motion apparatus;

Figure 28 is a view similar to Figure 8 and looking at the right-hand side of Figure 27, but showing the modified form of stop motion apparatus in association therewith;

Figure 29 is a vertical sectional view taken substantially along the line 29—29 in Figure 28 and also showing a portion of the fabric F in cross-section and showing the follower shaft 1026 in a different position from that shown in Figure 28;

Figure 30 is a sectional plan view taken substantially along the line 30—30 in Figure 29;

Figure 31 is an enlarged vertical sectional view through insulation member 1041 shown in Figure 30 but omitting the other parts shown in Figure 30 and being taken substantially along the line 31—31 in Figure 30;

Figure 32 is an inverted plan view taken substantially along the line 32—32 in Figure 29 and looking at the opposite side of the circular insulation member 1041 shown in Figure 30;

Figure 33 is an enlarged inverted sectional plan view taken substantially along the line 33—33 in Figure 29 and showing the arrangement of the electrical contacts on the insulation member at the upper end of the follower shaft 1026 in Figure 29;

Figure 34 is an enlarged fragmentary top plan view of the central portion of Figure 1 but showing a modified form of apparatus secured to the arch of the loom for directing the electrical cable 460 from the switch box to the float cutting apparatus;

Figure 35 is a part vertical sectional view and a part elevation, the vertical sectional portion being taken substantially along the line 35—35 in Figure 34 and showing the modified form of switch box and swing arm combination secured to a portion of the arch of the loom.

Referring more specifically to the drawings, the present invention is shown in association with a loom of a type such as is manufactured by Draper Corporation, of Hopedale, Massachusetts and is commonly known as their model XL loom. This loom has a dobby head thereon which embodies the usual pattern mechanism for controlling the harnesses and this pattern mechanism also controls the initial electrical energization of the motor on the float cutting apparatus, to be presently described, as it starts to traverse the width of the woven fabric. However, it is to be understood that the present invention may be employed with any of many other types of looms now in use and some of which may not be provided with the dobby head and in which instance, other pattern means may be easily applied by a skilled mechanic to the looms not having the dobby head so as to initially energize the said electric motor, in timed relation to the cloth take-up mechanism of the loom.

Figure 1:
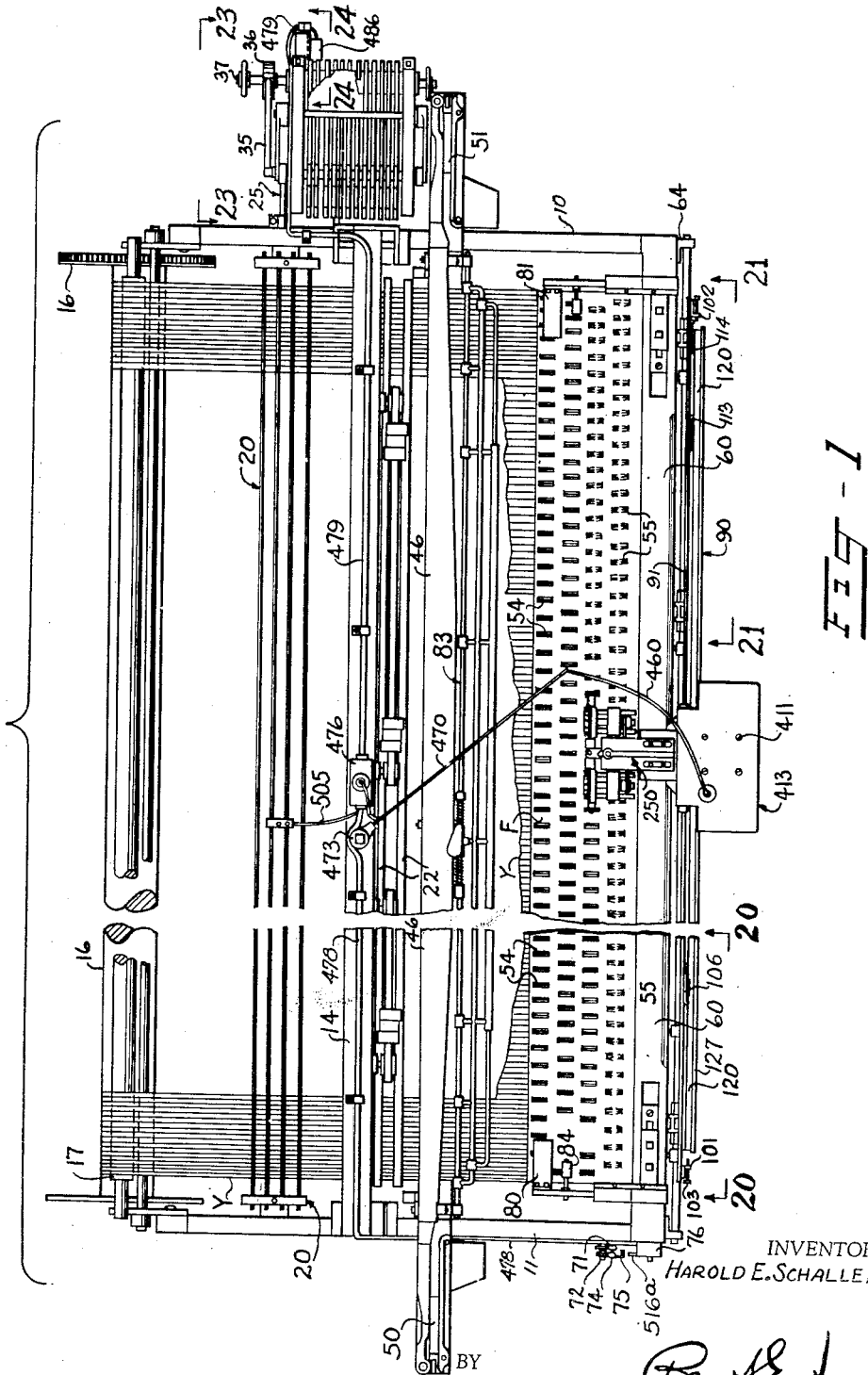
Figure 1 is a top plan view of a loom with parts broken away and showing only the parts which are pertinent to the present invention and wherein the floats are woven in the fabric with the warp yarns and showing the present invention in association therewith.
Figure 2:
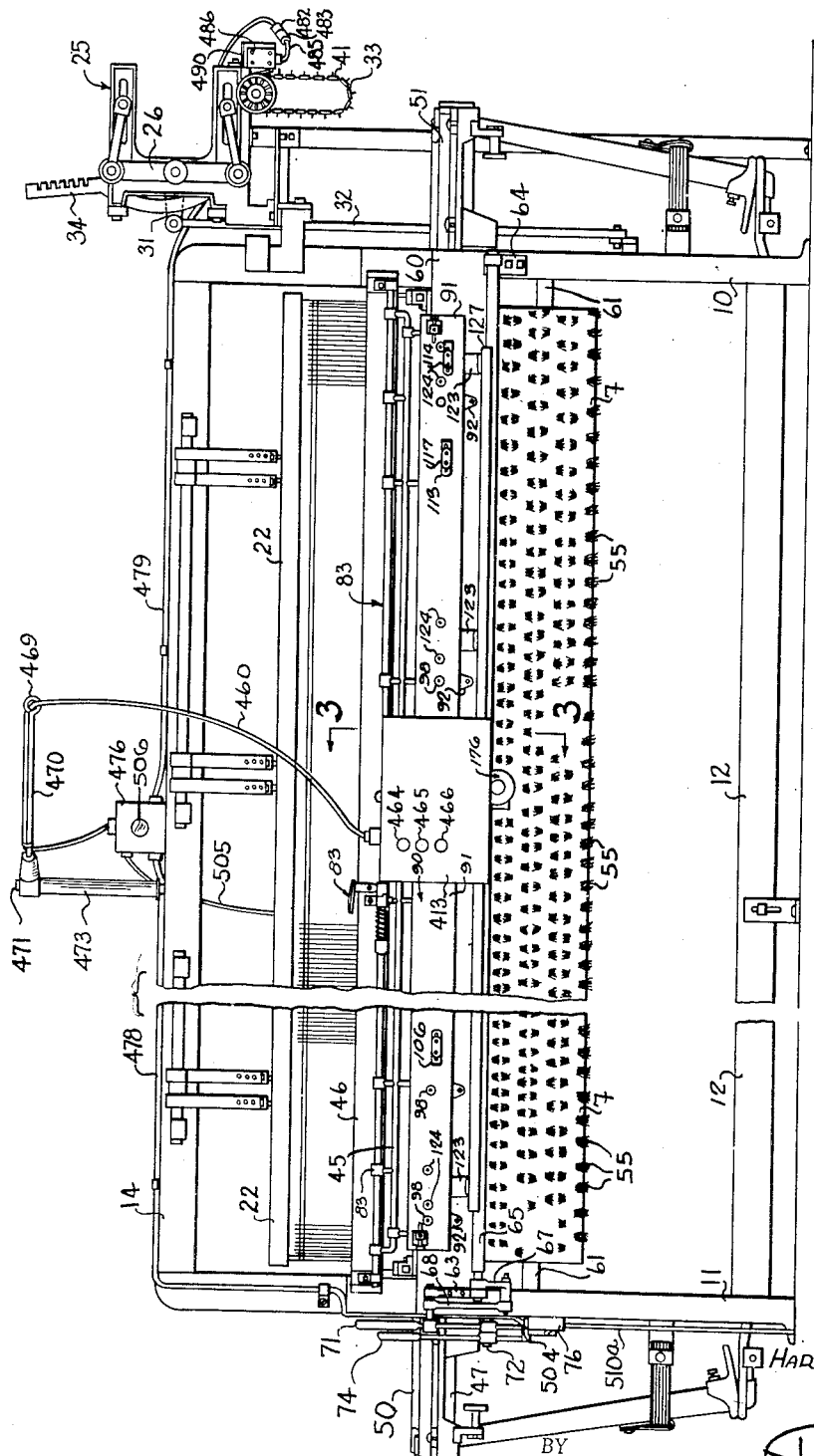
Figure 2 is a front elevation of the loom shown in Figure 1 and also showing the improved float cutting apparatus in association therewith.

The loom shown in Figures 1 and 2 has the usual right-hand and left-hand side frame members 10 and 11, respectively, which are spanned at the lower ends thereof by conventional girts 12, only one of which is shown in Figure 2, and at their upper ends by an arch 14. Warp yarns Y are taken from the usual warp beam 16 disposed at the rear of the loom and pass over the whip roll 17 (Figure 1) and then extend forwardly through the usual type of electrical stop motion, comprising electrical contact bars 20 which extend from one side of the loom to the other below the horizontal plane of the warp yarns Y and which have the usual drop-wires associated therewith all of which is clearly shown in United States Patent No. 1,689,701 of October 30, 1928.

The warp yarns Y then extend forwardly, or downwardly in Figure 1, and pass through harnesses 22 mounted in the usual manner and, in the present instance, the harnesses are controlled by a suitable harness leveling mechanism disposed below the harnesses and not shown in the present drawings but of a type such as is shown in United States Patent No. 1,819,543 of August 18, 1931.

At least one of the harnesses 22 should be controlled by the usual dobby head mechanism, broadly designated at 25 in Figures 1 and 2, mounted in a conventional manner at the right-hand end of the arch 14 of the loom in Figures 1 and 2. The dobby head includes the usual front and the rear rocker arms 26 and 27, respectively (Figures 2 and 23), which are oscillatably mounted intermediate their ends on a shaft 30 oscillatably mounted in the dobby head 25. The rear rocker arm 27 has an extension 31 thereon to which the upper end of a conventional link 32 is connected and which is driven for vertical oscillation by conventional means on the lower portion of the loom, not shown in the present drawings but which may be driven in a manner similar to that shown in United States Patent No. 2,305,328 of September 15, 1942.

Oscillation of the rocker arms 26 and 27 will, upon certain selections being made by a conventional pattern chain 33 and through the usual knives, not shown, transmit movement to certain of the conventional dobby jacks 34 in a manner well known to those familiar with the art. Suitable conventional connections, not shown, extend from the dobby jacks 34 to those corresponding harnesses 22 which are not controlled by a leveling mechanism of the type shown in said Patent No. 1,819,543.

It will be observed in Figure 23 that the rocker arm 27 has a pivoted ratchet arm 35 thereon which extends outwardly and downwardly at an angle and the hooked end of which engages the ratchet wheel 36 fixedly mounted on one end of a conventional pattern chain roll shaft 37. The pattern chain roll shaft 37 has a notched pattern chain roll 40 fixedly mounted thereon to which step-by-step rotation is imparted by the ratchet arm 35 for advancing the pattern chain 33. The pattern chain 33 (Figures 23 and 24) is of a type similar to that shown in United States Patent No. 2,201,707 and includes spaced bars 41 having pattern pins 42 projecting therefrom, only one of which is shown in Figure 23. The function of this particular pattern pin 42 will be later described. Since the remaining unidentified parts of the dobby head 25 are not pertinent to the present invention a further description thereof is deemed unnecessary. The parts of the present invention, which are associated with the dobby head 25 will be later described.

After the yarns Y have passed through the harnesses 22, they pass through the usual reed 45 mounted in the usual manner between a reed cap 46 and a lay 47. The lay 47 has shuttle boxes 50 and 51 at opposed ends thereof for alternately receiving the shuttle, now shown, for drawing a filling through the shed formed of the warp by the harnesses 22 and whereby upon each beat-up stroke of the lay 47, a pick will be cast to weave a sheet of fabric F. Vertical movement of the harnesses 22 is controlled in a conventional manner so as to cause at least one of the harnesses to remain in an elevated position for predetermined intervals so as to cause certain of the warp yarns Y to be floated, as at 54 at spaced points along the width of the fabric F in Figure 1. Since the rest of the harnesses 22 continue to form a shed of the warp yarns Y in the usual manner while some of the warp yarns are floated to form the floated portions or floats 54, it is obvious that fabric will be woven beneath the floated warp yarns. The present invention is employed in severing these floated warp yarns 54 intermediate the points at which they are woven into the fabric to form tufts 55 as will be later described.

The fabric F extends forwardly from the beat-up point of the reed 45 and passes over a conventional sand roll 57 (Figure 5) and beneath and rearwardly of a conventional breast beam 60 secured at opposed ends thereof to the loom side frame members 10 and 11 in a conventional manner. The fabric F then extends downwardly (Figure 2) and is wound around a conventional take-up roll 61 for taking up on the cloth in a manner well known to those familiar with the art.

Referring to Figure 2, it will be observed that a suitable conventional bearing bracket 63 is secured to the left-hand end of the breast beam 60 and a similar bearing bracket 64 is secured to the right-hand side frame member 10 in a conventional manner for oscillatably supporting opposed ends of a conventional shipper rod 65 (Figure 5). This shipper rod 65 is merely described because the invention is made to clear this shipper rod 65 as is clearly shown in Figure 5.

The shipper rod 65 is connected, at its left-hand end in Figure 2 through intervening links 67 and 68, to a conventional shipper handle 71 oscillatably mounted on a stub shaft 72 on the outer vertical surface of the loom side frame member 11. Also mounted on the stub shaft 72 is a conventional brake control handle 74 having an angle clip 75 at the lower end thereof (Figures 1 and 2) for opening a master switch, to be later described, disposed within a master switch box 76 suitably secured to the vertical side frame member 11. This master switch disposed within the master switch box 76 controls the flow of electrical energy to the improved float cutting apparatus in a manner to be later described.

Referring to Figure 1 it will be noted that the selvage at opposed sides of the fabric F passes through conventional temples 80 and 81 which extend forwardly or towards the front of the loom and are secured, in a conventional manner, on the breast beam 60. In Figures 1 and 2 there is shown an improved shuttle guard carried by the reed cap 46 broadly designated at 83, and which is clearly shown and described in my co-pending application, Serial Number 123,677, filed October 26, 1949; now Patent No. 2,532,950 of December 5, 1950. As is clearly shown in said co-pending application, the shuttle guard 83 is normally biased under spring pressure to project outwardly and downwardly towards the front of the loom and each of the temples 80 and 81 in Figure 1 has a bumper 84 thereon, a detailed description of which is also given in said co-pending application, and which are adapted to engage the front end of the shuttle guard 83 upon each beat-up stroke of the lay 47 so as to urge the same downwardly and to prevent the shuttle guard from entering the path of travel of the cutter head of the improved float cutting apparatus to be later described. Since the float cutting apparatus, to be later described, is usually employed in the weaving of bedspreads and the like, the loom associated therewith is, of necessity, a relatively broad loom. In such instances it is preferable that a suitable shuttle guard be provided, and since a conventional shuttle guard would interfere with the operation of the present invention, it is thus seen that my improved shuttle guard, as described in said co-pending application, is a desirable structure to be mounted on looms on which the present invention is employed.

The parts heretofore described are the conventional parts of the loom with which the present invention is adapted to be associated and although other conventional parts of the loom appear in the drawings, they are not pertinent to the present invention and therefore a further description of the same is deemed unnecessary.

*Trackway for float cutter*

Referring particularly to Figures 1, 2, 20, 21 and 22, a trackway, broadly designated at 90 is shown, this trackway 90 being provided for supporting the carriage of the float cutting apparatus, to be later described, as it traverses the width of the fabric F. This trackway 90 comprises a horizontally disposed bar 91 which extends substantially from one end of the breast beam 60 to the other and is secured thereto, in closely spaced relation, in a manner to be presently described.

A plurality of spaced trackway brackets 92 are secured, each by a screw 93, to the breast beam 60. Now, in order to insure that the trackway bar 91 is spaced a proper distance apart from the breast beam 60 and to also adjust the same relative to the vertical, the trackway brackets 92 are also spaced slightly apart from the breast beam 60 and each of the brackets 92 has a pair of set screws 94 and 95 which threadably penetrate the upper and lower portions, respectively, of each of the trackway brackets 92 and the rear ends of which bear against the front vertical surface of the breast beam 60 as is clearly shown in Figure 22. The medial portion of each of the brackets 92 is of substantially greater thickness than the end portions thereof, which are penetrated by the screws 94 and 95, and has a vertically extending T-slot 96 therein in which a substantially rectangular nut 97 is adapted to have vertical sliding movement.

The trackway bar 91 is penetrated by a plurality of spaced screws 98 which coincide with the trackway brackets 92 and which threadably penetrate the nuts 97 mounted in the T-slots 96. It is thus seen that the trackway bar 91 may be adjusted, as to the vertical, by loosening the screws 98 and then sliding the nuts 97 in the desired direction along the T-slots 96 in the brackets 92 after which the screws 98 may be driven home for securing the trackway bar 91 to the front faces of the brackets 92 which are, in turn, secured by the screws 93 to the front face of the breast beam 60.

Secured, as by screws 100, adjacent opposed ends of the trackway bar 91 are blocks 101 and 102, only one of the screws 100 being shown in Figure 22. The threaded blocks 101 and 102 are threadably penetrated by adjusting screws 103 and 104, respectively, the purpose of which is to alternately engage opposed ends of a shock absorber, to be later described and shown in the central portion of Figure 7, as the float cutter reaches the end of its range of travel in opposite directions cross-wise of the loom.

Disposed adjacent the block 101 (Figures 2 and 20), but in a lower horizontal plane, are spaced switch actuating dogs which are in the form of angle clips 106 and 107. Each of the dogs 106 and 107 has a longitudinally extending adjustment slot 108 therein which is slidably penetrated by a pair of screws 111 which also slidably penetrate a plate 112. The plate 112 bears against the outer surface of each of the angle clips 106 and 107. The screws 111 are threadably embedded in the trackway bar 91 for securing the angle clips 106 and 107 to the front surface of the trackway bar 91. Similar switch actuating angle clip dogs 113 and 114 are disposed at the right-hand end of the trackway 90 in Figures 2, 21 and 22, and each of the dogs 113 and 114 is provided with an adjustment slot 115 slidably penetrated by screws 116, these screws 116 also penetrating plates 117 identical to the plates 112 heretofore described, for securing the angle clip dogs 113 and 114 to the front surface of the trackway bar 91. The function of these switch actuating dogs 106, 107, 113 and 114 will be later described.

Disposed in spaced relation to and below the trackway bar 91, and extending substantially the entire length thereof, is a rack 120 which, as is clearly shown in Figures 1 and 5, is also disposed in a vetical plane forwardly of the trackway bar 91 and the purpose of which will be later described. The rack 120 is secured, by any suitable means such as screws 121, to a plurality of variably spaced rack supporting members 123 which extend rearwardly and then upwardly between the breast beam 60 and the trackway bar 91 and are secured to the rear surface thereof, as by bolts 124, there being suitable adjustment slots 125 in the rack supporting members 123 which are slidably penetrated by the bolts 124 to provide means for adjusting the rack supporting members 123, along with the rack 120, in a vertical plane. Extending longitudinally of the rack 120 and secured to the outer surface thereof, as by screws 126, is a rack shield member 127 which is provided to protect the operator and to prevent lint from collecting on the teeth of the rack.

*Structure of float cutting apparatus*

Th float cutting apparatus per se comprises an upper cast gear housing broadly designated at 135 and comprising a substantially square vertically disposed tubular portion 136 and a rearwardly extending open bottomed hollow portion 137 closed at its outer end by a downwardly projecting wall 140 (Figures 3, 4 and 5).

A forwardly and rearwardly extending tubular member 141 is fixedly mounted at one end thereof in a rear wall portion 142 (Figure 5) of the vertically disposed substantially rectangular tubular portion 136 and its other end is slidably mounted in the downwardly extending portion 140 at the rear of the upper cast gear housing 135. Referring to Figures 4, 5 and 17, it will be observed that the tubular member 141 is locked in the rear wall portion 142 of the casting 135 by a pair of relatively short sleeves 144 and 145, the rear wall 142 of the vertically disposed substantially rectangular tubular portion 136 of the casting 135 having a vertically disposed bore 146 therein in which the sleeves 144 and 145 may have vertical sliding movement.

The upper sleeve 144 (Figure 17) is slidably penetrated by a lock screw 147 whose lower end is threadably embedded in the lower sleeve 145 and each of the sleeves 144 and 145 has a slightly rounder or tapering surface 150 which conforms to the configuration of the tubular member 141. Referring to Figure 17, it is obvious that by tightening the screw 147 in the lower sleeve 145, the sleeves 144 and 145 will be urged toward each other and will thus bear against and lock the tubular member 141 in the wall portion 142 of the upper cast gear housing 135.

Opposed ends of the tubular member 141 (Figure 5) are counterbored for reception of suitable bearings, such as ball bearings 152 and 152a, and in which the enlarged opposite ends of a main drive shaft 153 are mounted for rotation. The outer surface of the inner race of the ball bearing 152 at the left-hand end of the shaft 153 in Figure 5 is engaged by an annular shoulder 154 on the shaft 153 while the remote surface of the inner race of the ball bearing 152a, at the right-hand end of the shaft 153, is engaged by a suitable nut and washer structure indicated at 155, the nut 155 being threadably mounted on the enlarged right-hand end of the shaft 153 in Figure 5 for securing the shaft in fixed relation to the inner races of the bearings 152 and 152a at opposed ends of the tubular member 141.

The left-hand end of the shaft 153 in Figure 5 has a restricted portion 156 integral therewith which has a beveled gear 157 keyed thereon as by a key 160. The left-hand end of the restricted portion 156 of the shaft 153 is threaded and has a lock nut 162 thereon to lock the beveled gear 157 against the annular shoulder 154. The beveled gear 157 meshes with a beveled gear 165 fixedly secured, as by a key 166 and a set screw 167, on the upper end of a driven motor shaft 170 extending from an electric motor 171.

The motor 171 has a flange 172 on the upper end thereof, in Figures 3 and 5, which is penetrated by screws 173 for securing the upper cast gear housing 135 to the same. A suitable ball thrust bearing 174 is mounted between the lower surface of the beveled gear 165 in Figure 5 and the upper surface of the motor 171.

A gear reduction unit indicated broadly at 176, the housing of which is preferably cast integral with the casing of the motor 171, is disposed therebelow and the shaft 170 extends downwardly into the same (Figure 13). The shaft 170 has a worm 177 on the lower end thereof which meshes with a worm gear 180 fixedly mounted, as by a set screw 181, on a stub shaft 182. The stub shaft 182 is rotatably mounted in the housing of the gear reduction unit 176 and extends rearwardly therefrom as shown in Figure 5.

A pinion 184 is fixedly mounted on the shaft 182 of the gear reduction unit 176 in any desired manner. However, since pinions of the size normally employed for this purpose are relatively small and are not provided with hub portions, there is provided a flanged collar 185 which is fixedly mounted on the stub shaft 182, as by a set screw 186, and onto the flange of which the pinion 184 is secured as by screws 187. This pinion 184 is adapted to ride in engagement with the rack 120 heretofore described. The electric motor 171 has a flexible cable 190 extending therefrom in which wires 191 to 194, inclusive are disposed (Figures 5 and 25-A) and which are a part of the electrical circuit, to be later described.

It has already been described how the upper cast gear housing 135 is supported by the motor 171. Now, secured to the casing of the motor 171, by any suitable means such as screws 195 (Figures 6 and 7), is a float cutter lower carriage bracket 196 of cast material. This lower carriage bracket 196 has oppositely directed outwardly projecting portions 197 and 198 integral therewith, each of which is provided with a vertically disposed adjustment slot 200 (Figure 6) which is slidably penetrated by a screw 201 for securing a substantially Z-shaped guide block 202 to the rear surface thereof. These guide blocks 202 extend upwardly (Figure 5) and their front surfaces are adapted to slidably engage the rear surface of the trackway bar 91 of the trackway 90.

Each of the outwardly projecting portions 197 and 198 of the lower carriage 196 also has a shoulder screw 203 threadably embedded therein and extending upwardly therefrom and on which a lower carriage roller 204 is rotatably mounted. These lower carriage rollers 204 ride against the outer surface of the trackway bar 91 near the lower edge thereof so as to insure that the float cutting apparatus may have freedom of movement along the trackway bar 91 and to assist in maintaining the attitude of the cutter head, to be later described.

Referring to Figures 1, 3 and 7, it will be observed that the lower carriage bracket 196 has an upwardly projecting horizontally disposed bearing portion 210 integral therewith in which a horizontal disposed shock absorber shaft 211 has horizontal sliding movement. Compression springs 212 and 213 of substantially the same strength, encircle the exposed opposite end portions of the shock absorber shaft 211 and the remote ends of these compression springs 212 and 213 bear against washers 214 and 215, respectively, slidably mounted on opposed ends of the shock absorber shaft 211 and which are prevented from sliding off the ends of the shock absorber shaft 211 by suitable cotter keys 216. This constitutes the shock absorber heretofore referred to as being adapted to engage the adjustment screws 103 and 104 at opposed ends of the trackway 90 (Figures 2, 20, 21 and 22) as the float cutter moves from one side to the other on the loom and for arresting movement thereof.

It will be observed in Figure 4 that suitable projections or bosses 220 and 221 are cast integral with opposed sides of the rearwardly extending portion 137 of the upper cast gear housing 135 and each of which is provided with a shallow groove 222 in which a mating portion of an inverted L-shaped upper carriage bracket is mounted. The upper carriage brackets 224 are each provided with vertically disposed adjustment slots 225 (Figures 3 and 6) which are slidably penetrated by screws 226 for securing the substantially L-shaped upper carriage brackets 224 to the opposed side walls of the rearwardly projecting portion 137 of the upper cast gear housing 135.

Each of the upper carriage brackets 224 has a web portion 230 integral therewith which, in turn, has an enlarged downwardly and outwardly projecting lower portion 231 integral therewith (Figures 3, 4, 6 and 7). A bolt 232 threadably penetrates each of the outwardly projecting enlarged portions 231 and has an upper carriage roller 233 rotatably mounted thereon, and freedom of rotation of the upper carriage roller 233 is insured by a lock nut 234 (Figures 4 and 7) threadably mounted on the rear end of the bolt 232.

Each of the outwardly projecting enlarged portions 231 of the upper carriage brackets 224 has a vertically extending adjustment slot 237 therein which is threadably penetrated by a screw 240. The screw 240 secures a substantially L-shaped guide block 241 to the front surface of the enlarged outwardly projecting portion 231, there being a suitable groove 239 in the front surface of each of the outwardly projecting enlarged portions 231 to receive and guide the substantially L-shaped guide blocks 241 as they are adjusted in a vertical plane. The lower surface of each of the guide blocks 241 has a slot 242 therein and the front and rear walls thereof are adapted to slidably engage the front and rear surfaces of the trackway bar 91 adjacent its upper edge in Figures 20 and 21. The rollers 233 are adapted to ride against the upper edge of the trackway bar 91 and actually support the full weight of the float cutting apparatus per se while the guide blocks 241 and 292 as well as the lower carriage rollers 204 serve to insure that the float cutting apparatus will move along the trackway in a straight line from one side of the loom to the other.

Cutter head assembly

Referring to Figures 3, 4 and 5, a cutter head assembly is shown which is supported by a cutter head bracket 250 mounted on the upper cast gear housing 135. Detailed views of the cutter head assembly are shown in Figures 8, 9, 10, 11, 12, 13, 14 and 15. The cutter head bracket 250 has a horizontal leg 251 having a pair of spaced longitudinally extending adjustment slots 252 therein (Figure 4) which are slidably penetrated by screws 253 for securing the horizontal leg 251 of the bracket 250 to the upper surface of the rearwardly projecting portion 137 of the upper cast gear housing 135. The cutter head bracket 250 extends rearwardly a substantial distance beyond the right-hand end of the rearwardly projecting portion 137 of the upper cast gear housing 135 and has a downwardly projecting vertical leg 255 integral therewith which has a pair of spaced vertical adjustment slots 256 therein (Figure 8) which are slidably penetrated by screws 257.

These screws 257 extend forwardly and are threadably embedded in a middle portion 260 of a substantially inverted Y-shaped cast auxiliary cutter head support broadly designated at 261. The auxiliary cutter head support 261 has outwardly and downwardly projecting arms 262 and 262' integral therewith both of which are identical except being opposite hand and which support cutter head assemblies, to be presently described, both of which are identical except being opposite hand.

Referring to Figures 5 and 8, it will be observed that the horizontal leg 251 of the cutter head bracket 250 has a boss portion 265 integral therewith which is slidably penetrated by a screw 266 which extends downwardly and the lower end of which is threadably embedded in the central portion 260 of the auxiliary cutter head support 261. This screw 266 is surrounded by a compression spring 267, the upper end of which bears against the lower surface of the horizontal leg 251 of the cutter head bracket 250 and the lower end of which bears against the upper edge of the central portion 260 of the auxiliary cutter head support 261.

The purpose of the screw 266 and its associated compression spring 267 is to provide means for accurately adjusting the cutter head support 261 in a vertical plane relative to the cutter head bracket 250 by loosening the screws 257 and then turning the screw 266 in one direction so as to raise the cutter head support 261 and, upon turning the screw 266 in the opposite direction, the compression spring 267 will cause the cast cutter head support to be moved downwardly rather than the screw 266 being moved upwardly in the horizontal leg 251 of the cutter head bracket 250.

When the auxiliary cutter head support 261 has been adjusted to the desired position, the screws 257 are, of course, driven home to lock the auxiliary cutter head support 261 in adjusted position. It will be noted that dove-tailed slide connections are provided between the vertical leg 255 of the cutter head bracket 250 and the central portion 260 of the cast cutter head support 261 as well as being provided between the horizontal leg 251 of the cutter head bracket 250 and the upper surface of the rearwardly projecting portion 137 of the upper cast gear housing 135 to thus insure that the cutter head bracket 250 will remain in proper axial alinement with the upper cast gear housing 135 and to insure that both of the cutter heads, to be later described, carried by the auxiliary cutter head support 261 will be disposed in the same horizontal plane when the cast cutter head support 261 is adjusted in the manner heretofore described.

It will be observed in Figures 3, 4 and 5 that the remote portions of the arms 262 and 262' of the auxiliary cutter head support 261 are of substantially greater thickness than the central portion 269 and the parts associated with the arm 262' being identical with the parts associated with the arm 262, only the parts associated with the arm 262 will be described with like parts associated with the arm 262' bearing the prime notation.

The cutter head support arm 262 has a suitable bearing member, preferably a needle bearing 270 (Figure 11), fixedly mounted therein, as by a pressed fit, and which is slidably penetrated by a restricted tubular portion 271 integral with a grooved pulley 272. It will be observed in Figures 3, 4 and 5 that the grooved pulleys 272 and 272' are each provided with two grooves 273 and 273' respectively, but only one of the grooves 273 or 273' being engaged by belts 275 and 275' on the respective pulleys 272 and 272', it merely being a matter of choice as to which of the two grooves in each of the pulleys 272 and 272' will be engaged by the belts 275 and 275', respectively. The belts 275 and 275' extend inwardly and upwardly and engage a common multi-grooved pulley 276 keyed, as at 277 on a restricted portion 280 at the rear of the main shaft 153 (Figure 5).

It is thus seen that the motor 171 will impart rotation to the main drive shaft 153 through the beveled gears 165 and 167 so as to rotate the common pulley 276 and the pulleys 272 and 272' causing them to rotate in the same direction. It is to be understood, however, that suitable gearing may be disposed between the restricted portion 280 of the shaft 153 and the cutter heads to be presently described in lieu of the pulleys 272, 272' and 276 and the belts 275 and 275'.

The pulley 272 (Figure 11) and its tubular portion 271 are slidably penetrated by a quill shaft 281 which is mounted for longitudinal sliding movement in the pulley 272 and its tubular portion 271 but which is caused to rotate therewith by a suitable key 284. The cutter heads comprise the quill shafts 281 and 281' having the cutter head blocks, to be presently described, mounted thereon. Due to the relative movement between the pulley 272 and its tubular portion 271 and the quill shaft 281, the pulley 272 bears against the needle bearing 270 at the left-hand end thereof, in Figure 11, and the right-hand end of the needle bearing 270 is engaged by a suitable snap ring 285 mounted in a suitable groove provided therefor in the restricted portion 271 of the pulley 272. The quill shaft 281 extends rearwardly beyond the arm 262 and has a ball bearing 290 thereon on the outer race of which a cutter head block 291 is mounted. The cutter head block 291 is pressed onto the outer race of the ball bearing 290.

The quill shaft 281 has an enlarged annular portion 293 integral therewith which is provided with an annular shoulder 294 of a slightly less diameter against which the inner race of the ball bearing 290 is held by a suitable snap ring 295 mounted in an annular groove 296 in the quill shaft 281. The enlarged annular portion 293 of the quill shaft 281 has a polygonally-shaped portion 297, the outer dimensions of which are larger than the diameter of the quill shaft 281 but which are smaller than the outer diameter of the enlarged annular portion 293 and this polygonally-shaped portion is shown as being substantially triangular in Figure 12. A rotary cutting disk 300 is fitted onto the polygonally-shaped portion 297 and is held against the annular portion 293 of the quill shaft 281 by a suitable rotary brush broadly designated at 302.

The preferred form of the rotary brush 302 is that it be made of a soft metal circular block 303 such as aluminum, and the circular block 303 has a plurality of radially spaced groups of bores 304 in its periphery in each of which a plurality of bristles 305, preferably of nylon material, are inserted. The circular block 303 of the brush 302 also has a plurality of radially spaced bores 307 therein extending parallel to the axis of the brush 302 and there being one of these bores 307 communicating with each group of bores 304 in the periphery of the circular block 303 of the brush 302.

In order to secure the nylon bristles 305 in the circular block 303, the nylon bristles 305 are inserted in the bores 304 with their inner ends projecting partially into the corresponding bores 307 after which a heated pin or the like is inserted in the bores corresponding to the bores 307, causing the inner ends of the nylon bristles 305 to melt and to become fused to one another and to the walls of the bores 304 in which they are mounted, after which the said heated pin is removed from the corresponding bores 307. The outer ends of the bristles 305 terminate in substantially the same horizontal plane as the cutting edge of the cutting disk 300. The circular brush block 303 is slidably mounted on a threaded end portion 310 of the quill shaft 281 and has a circular cavity 311 therein in which suitable spanner lock nuts 312 and 313 are adapted to be mounted as they are turned onto the threaded end portion 310 of the quill shaft 281 for securing the brush 302 and the rotary cutting disk 300 against the enlarged annular portion 293 of the quill shaft 281. It will be observed in Figures 8 and 11 that the circular lock nuts 312 and 313 are each provided with a pair of diametrically opposed bores 316 which are adapted to be engaged by a suitable spanner wrench, not shown, for tightening the circular nuts 312 and 313 on the threaded portion 310 of the quill shaft 281.

It will also be observed in Figures 8 and 11 that the cutter head block 291 has a substantially circular flange 320 integral therewith, the lower portion of which is cut away at 321 in Figure 8 and which flange 320 surmounts the rotary cutting blade 300 to thus serve as a safety shield around the sharp peripheral edge of the cutting disk 300.

Referring to Figures 8, 9, 10, 14 and 15, it will be observed that the cutter head block 291 has the rear end of each of a pair of diametrically opposed and forwardly extending tubular guide shafts 324 and 325 fixedly secured therein, as by set screws 326, Figures 14 and 15. Both of these tubular guide shafts 324 and 325 are identical with the exception that the guide shaft 325 is disposed at a higher elevation than the guide shaft 324 as is clearly shown in Figures 8 and 15. Since both of the tubular guide shafts 324 and 325 are identical, only the tubular guide shaft 324 is shown in detail in Figure 10. Each of the tubular guide shafts 324 and 325 slidably penetrates the arm 262 of the auxiliary cutter head support 261 and has a pair of diametrically opposed longitudinally extending slots 329 and 330 therein, which slots are slidably penetrated by a vertically disposed locator pin 331. Each of the locator pins 331 (Figure 9) is mounted for vertical sliding movement in boss portions 332 and 334 which correspond to the tubular guide shafts 324 and 325, respectively.

The upper end of each of the locator pins 331 has an enlarged knurled portion 335 integral therewith which is adapted to be grasped for moving the corresponding pin 331 upwardly and out of the corresponding tubular shaft 324 or 325, as the case may be, to thereby permit removal of the shafts 324 and 325 and the cutter head block 291 from arm 262 of the cast cutter head support 261.

Referring again to Figure 10, it will be observed that the locator pin 331 has a pair of annular grooves 336 and 337 therein. The upper annular groove 336, in Figure 10, is adapted to be engaged by a spring loaded detent 340 which is slidably mounted in the enlarged portion of the arm 262 and is urged inwardly against the locator pin 331 by a suitable compression spring 342, the outer end of which bears against a closure plate 343 secured to the front surface of the enlarged portion of the arm 262 by any suitable means such as a screw 344. The lower or free end of the locator pin 331 is rounded, as at 345, so as to lead the same past the detent 340 as well as a pair of locator plungers 346 and 347, mounted for longitudinal sliding movement in each of the tubular shafts 324 and 325, so that upon the locator pin 331 being moved to the position shown in Figure 10, the proximate edges of the locator plungers 346 and 347 which, incidentally, are tapered, will be moved apart from each other and will engage the annular groove 337 in the locator pin 331 while the detent 340 engages the annular groove 336 in the locator pin 331.

Each of the tubular guide shafts 324 and 325 has a pair of longitudinally extending compression springs 350 and 351 therein (Figure 10), the proximate ends of which bear against the locator plungers 346 and 347 respectively. The front end of the spring 350 bears against a plug 352 threadably mounted in the free end of the tubular guide shaft 324 and the remote end of the other of the compression springs 351 bears against the cutter head block 291. It is thus seen that the cutter head comprising the cutter head block 291 and associated parts is resiliently mounted for forward and rearward movement with respect to the arm 262 of the auxiliary cutter head support 261 and, by adjusting the threaded plug 352 (Figure 10), the optimum position for the cutter disk 300 relative to the trackway 90 may be attained and also, through this medium, the cutter head blocks 291 and 291' may be properly alined with respect to each other.

The compression springs 350 and 351, within each of the tubular guide shafts 324 and 325, also provide means whereby the cutter head may be moved automatically or manually either inwardly or outwardly with respect to the auxiliary cutter head support 261. The cutter head blocks 291 and 291' (Figure 8) have inwardly projecting ears 357 and 357' integral therewith to the lower surfaces of which raised portions 358 and 358' of guiding plows or nose-like members 360 and 360' are secured, by any suitable means such as screws 356 and 356', respectively, and dowel pins 359 and 359' respectively.

Referring to Figure 13, an isometric view of the plow 360 is shown and since the plow 360' is identical to the plow 360 only the plow 360 will be described further with like parts associated with the plow 360' bearing the same reference characters with the prime notation added. An elongated nose portion 361, preferably cast integral with the raised portion 358 of the plow 360, extends outwardly a substantial distance beyond the raised portion 358 and beneath the corresponding cutting disk 300. The outer end of this nose portion 361 is rounded and tapered slightly, as at 362, so that upon movement of the float cutting apparatus from left to right in Figure 1, or from right to left in Figure 8, the rounded end portion 362 of the plow 360 will pass beneath any floated yarns which happen to be in its path of travel. It is obvious that the plow 360' will function in an identical manner upon movement of the float cutting apparatus in the opposite direction.

In order to direct the floated yarns to the corresponding rotary cutting disk 300 after the nose portion 362 of the plow 360 has passed beneath the floated yarns, there is integral with the upper surface of the outwardly projecting flange portion 361 a rounded and curved second raised portion 363 having a longitudinally extending groove 364 therein which is of sufficient width to permit the corresponding peripheral portion of the rotary cutting disk to pass through the same without engaging either of the side walls of the groove 364. It will be observed in Figures 8 and 13 that the leading end of this second raised portion 363 is rounded and the upper surface thereof terminates in slightly spaced relation to the lower edge 321 of the substantially circular portion 320 of the cutter head block 291.

Therefore, as the plow 360 continues to move from right to left in Figure 8, after the rounded end portion 362 has moved beneath the floated yarns, the second raised portion 363 will then move beneath the floated yarn causing the same to move upwardly and into engagement with the peripheral edge of the rotary cutting disk 300 to thus sever the floated yarns intermediate the point at which they are woven into the fabric F.

Since the outer ends of the bristles 305 on the rotary brush 302 associated with the cutting disk 300 terminate in substantially the same plane as the peripheral edge of the rotary cutting disk 300, it is evident, by referring to Figure 8, that these bristles 305 will engage one of the proximate edges of the severed floated yarns immediately upon their being severed by the corresponding rotary cutting disk 300 to thus fluff the severed ends of the portions 54 of the floated yarns nearest the lay so as to prevent these portions of the floated yarns from being pulled out of the woven fabric upon the next succeeding tranverse two of floated yarns 54 being engaged by the plow 360'.

It is evident that the end play in the shafts 281 and 281' will allow the float cutting apparatus to be guided by the plows 360 and 360' not only as the take-up motion is operating, but also will allow the float cutting apparatus to follow bowed fillings.

*Electrical stop motion for float cutting apparatus*

Referring to Figures 4, 8, 14 and 16, there is shown an electrically operable stop motion in association with the cutter head which is adapted to be connected to the conventional warp stop motion of the loom, by means to be later described, for stopping the same in the event that one or the other or both of the plows 360 may have penetrated the woven fabric as they pass beneath the floated portions 54 of the warp yarn resulting in a hole being made in the fabric or, if through any other means a hole had been made in the fabric over which the plows 360 and 360' are sliding.

The electrically operable stop motion is broadly designated at 370 and comprises a substantially L-shaped member 371. The vertical leg 255 of the cutter head bracket 250 has a suitable recess 372 therein in which the vertical leg of the L-shaped member 371 is fitted and is secured, as by a screw 373. The rear portion of the horizontal leg of the L-shaped member 371 is split, as at 375, and also has a bore 376 therein (Figure 16) which is slidably penetrated by an insulation bearing rod 377 clampingly secured therein as by a screw 380. The screw 380 also secures a leaf spring metallic contact member 381 to one side of the member 371. This metallic contact member 381 is provided so as to ground a circuit in a manner to be later described to the L-shaped member 371.

The insulation bearing rod 377 has annular shoulders 383 and 384 thereon between which a second leaf spring contact member 385 is mounted. This leaf spring contact member 385 surrounds the portion of the insulation bearing rod 377 between the annular shoulders 383 and 384 and is clampingly secured thereto by any suitable means such as a bolt 386. Remote portions of the second contact member 385 are then bent outwardly with respect to each other and then downwardly to form contact ears 387 and 387', the free ends of which are disposed forwardly of the inwardly projecting portions 357 and 357' of the cutter head blocks 291 and 291' respectively, so that upon either one of the plows 360 or 360' being moved too far towards the front of the loom, the contact ears 387 or 387', as the case may be, may be engaged by the corresponding inwardly projecting portions 357 and 357' of the cutter head blocks 291 and 291', respectively, for completing a circuit to the conventional stop motion of the loom in a manner to be later described.

The plows 360 and 360' may be moved forwardly further than is desired in the event that the timing between the cloth take-up mechanism associated with the loom and the initial starting of the traversing of the float cutting apparatus cross-wise of the loom may not be correct as a result of which the floated portions 54 of the warp yarns may engage the outer edges of the corresponding plows 360 and 360' at their juncture with the woven fabric and at a point near the selvage of the fabric upon the float cutting apparatus starting to move across the loom.

The insulation bearing rod 377 has a vertically disposed follower shaft 390 mounted for vertical sliding movement therein, the lower end of which extends a substantial distance below the lower end of the insulation bearing rod 377 and has an enlarged substantially conically-shaped portion 391 integral therewith in which a follower wheel 392 is rotatably mounted, as at 393 (Figure 16). This conically-shaped portion 391 not only serves as a means for mounting the follower wheel 392 on the lower end of the shaft 390 but also serves as a weight member to normally urge the follower wheel 392 into engagement with the upper surface of the fabric F.

The upper portion of the follower shaft 390 extends a substantial distance above the upper end of the insulation bearing rod 377 and is fixedly mounted in a substantially triangular plate 395, one of the front corners of which has a notch 396 therein (Figure 14) which slidably engages a vertically disposed guide post 397 which is substantially rectangular in cross section and the lower end of which is suitably secured in the horizontal leg of the L-shaped member 371, as by a pressed fit. The other of the front corners of the substantially triangular plate 395 has one end of wire 400 secured thereto, as by a terminal screw 401 and this wire 400 extends to and is mounted on the bolt 386 heretofore described.

It will be observed in Figure 8 that one of the edges of the substantially-triangular plate 395 is disposed in the same vertical plane as the leaf spring contact member 381 and, upon the follower wheel 392 moving downwardly, as the result of a torn place in the fabric, or a hole in the fabric, the follower shaft 390 will move downwardly by gravity, causing the corresponding triangularly-shaped plate 395 to move into engagement with the leaf spring contact member 381. This, of course, will ground the circuit directed to the substantially triangularly-shaped plate 395 by the wire 400. It will be noted that electrical energy is directed to the bolt 386 and thus to the electric wire 400 and the contact ears 387 and 387' by wire 403 which is penetrated by the bolt 386 and which wire extends to other parts of the electrical circuit to be later described.

Referring to Figure 4, it will be observed that the upper end of the rectangular tubular portion 136 of the cast upper gear housing 135 is opened so as to permit access to the beveled gears 157 and 165 and associated parts. Each of the corners of this substantially rectangular tubular portion 136 of the upper cast housing 135 has a threaded bore 410 therein in which screws 411 for securing an upper wall portion 412 of a motor cover or shield, broadly designated at 413, thereto and for closing the upper end of the substantially rectangular tubular portion 136 of the upper cast gear housing 135. This motor cover 413 carries the greater part of the electrical apparatus associated with the float cutting apparatus and which will be later described.

The motor cover 413 is preferably of a cast material, such as plastic or aluminum, and also comprises a front wall 413, side walls 415 and 416 and a partially closing bottom wall 417 (Figure 19). It will be observed in Figure 3 that this partially closing bottom wall 417 (Figure 19) terminates a substantial distance forwardly of the vertical plane of the rear edge of the upper wall 412 so that the reduction gear unit 176 may project from the motor 171 below the motor shield 413 as shown in Figure 3.

*Brief description of electrical apparatus*

Suitably secured to the lower surface of the upper wall 412 of the shield 413 is a selenium rectifier housing 420 (Figure 19) having a male plug 421 thereon and having wires extending therefrom to be later described. This male plug 421 is connected to a female plug 422 to which one end of a harness cable 423 is connected, this harness cable 423 also having a plurality of wires therein, to be later described.

The harness cable 423 has a sub-cable 425 extending therefrom in which a plurality of wires, to be later described, are disposed and which is connected to a female connector 426 adapted to be connected to a male connector 427 suitably secured to the side wall 416 of the shield 413. The male connector 427 has wires, to be later described, extending therefrom to a stepping switch housing 430 secured, by any suitable means such as screws 431, only one of which is shown in Figure 19, to the rear or inner surface of the front wall 414 of the motor shield 413.

Extending from within the harness cable 423, to be later described, are wires 651 and 615 the ends of which are connected to the plus and minus sides, respectively, of a suitable motor capacitor housing 435 which is clampingly secured, as by a strap iron member 436, to the inner surface of the side wall 416 of the motor cover 413. Suitable screws 437, only one of which is shown, secure the strap iron member 436 to the inner surface of the side wall 416. The harness cable 423 extends from the selenium rectifier 420 and its opposite end is connected to a female connector 440 secured, as by screws 441, to a female connector bracket 442 which is, in turn, secured, as by bolts 443, to the inner surface of the side wall 415 of the motor cover 413. Wires, to be later described, also extend from the harness cable 423 and which are connected to a female connector 445 which is adapted to be connected to a male connector 446 suitably mounted on an interlocking reversing relay housing 447.

Other wires from the harness cable 423 are connected to a suitable sensitive dog switch, to be later described, disposed in a housing 450 secured, as by bolts 451 to the side wall 415 of the motor cover 413. This sensitive switch in the housing 450 is of a type having a spring loaded plunger 452 projecting therefrom, in which instance the spring normally holds the switch in open position. It will be observed in Figure 19 that this plunger 452 has a follower wheel 453 rotatably mounted therein as at 454. When the motor cover 413 is mounted on the cast upper gear housing 135, the roller 453 is so positioned as to be disposed in the same horizontal plane as the angle clip dogs 106, 107, 113 and 114 on the trackway 90 and is adapted to move into engagement with these dogs as the float cutting apparatus traverses the width of the loom. These angle clip dogs 106, 107, 113 and 114 will cause the plunger 452 to move inwardly relative to the sensitive switch housing 450 to thus close the switch mounted therein for automatically advancing the mechanism of the stepping switch in housing 430, in a manner to be later described, for controlling the direction of movement of the float cutting apparatus.

The end of the harness cable 423 remote from the selenium rectifier 420 also has wires, to be later described, which are connected to a male cannon plug 457 suitably secured to the upper wall 412 of the motor cover 413 and also penetrating the same and to which a female cannon plug 458 at one end of an extension cable 460 is adapted to be connected. This extension cable 460 has a plurality of wires therein to be later described.

A switch box 462 is suitably secured to the inner surface of the front wall 414 and is disposed in closer relation to the front wall 414 than the reversing interlocking relay 447, the sensitive switch housing 450 and the female connector plug 440. This switch box 462 has switches therein to be later described, which are manually operable and which are provided with spring loaded control buttons 464, 465 and 466 for stopping and moving the float cutting apparatus to the right and to the left, respectively, in Figures 1 and 2. This switch mechanism is generally known as a jogging switch mechanism.

It will be observed in Figures 1 and 2 that the extension cable 460 extends upwardly from the motor cover or shield 413 and passes through an eye portion 469 at the free end of a swing arm 470 and the free end of which is disposed in a vertical plane above the fabric F being woven and the other end of which is oscillatably mounted on a vertically disposed shaft 471 having a spacing sleeve 473 thereon and the lower end of the vertically disposed shaft 471 being suitably secured in the arch 14. The extension cable 460 extends a substantial distance along the swing arm 470 and is suitably secured thereto, as by friction tape or the like, and then extends downwardly and terminates in a male cannon plug 475 which is adapted to be connected to a female cannon plug to be later described, disposed within a junction box 476 suitably secured to the upper surface of the conventional arch 14.

The junction box 476 also has cables 478 and 479 extending therefrom which are suitably secured to the arch of the loom and the cable 479 extends to a point adjacent the dobby head 25 and has a suitable female plug 482 thereon which is adapted to be connected to a corresponding male plug 483 on one end of a flexible cable 485, the other end of the cable 485 being suitably connected to an actuating sensitive switch housing 486 (Figures 2, 23 and 24) secured, as by screws 487, to a bracket 490 (Figures 23 and 24). The bracket 490 is secured, as by a bolt 491, to a forwardly and rearwardly extending bar 492 suitably secured to the dobby head 25.

The sensitive switch housing 486 is of a type having a spring loaded plunger 495 normally biased to hold the sensitive switch disposed within the housing 486 in an opened position and, by referring to Figure 24, it will be observed that the free end of this plunger 495 is adapted to be engaged by a lip portion 496 on a pivoted arm 500 having a follower wheel 501 on one end thereof and being pivotally connected, as at 502, to the sensitive switch housing 486 at its other end. The free end of the pivoted arm 500, having the roller 501 thereon, is disposed closely adjacent the pattern chain 35, heretofore described, and is also disposed in the path of travel of the pattern pin 42 so the pattern pin 42 will engage the roller 501 on the arm 500 in timed relation to a predetermined number of strokes by the lay 47 to close the switch disposed within the housing 486 momentarily.

The cables 470, 479 and 485 each have a plurality of wires therein, to be later described when a description is given relating to the wiring diagram shown in Figures 25 and 25-A. The cable 478 extending from the side of the junction box 476 remote from the cable 479, also extends along the arch 14 and then downwardly and is connected at its other end to a male plug 504 adapted to be connected to a female plug, to be later described since the female plug is not shown in the drawings, other than the wiring diagram in Figure 25-A, and which female plug is disposed within the switch box 76 heretofore described.

The junction box 476 also has a wire 505 extending therefrom, the free end of which is suitably connected to at least one of the contact bars 20 of the conventional electrical stop motion of the loom so the conventional stop motion of the loom may, on occasion, be grounded through the wire 505 and intervening conductors to the stop motion apparatus 370 (Figures 14, 16 and 25-A). The junction box 476 also has a window 506 therein through which light rays of an indicating lamp may be observed.

Now, referring to Figure 4, there is shown secured to one side of the upper cast gear housing 135, as by screws 507, an outwardly extending male connector bracket 508 to which is suitably secured a male connector 509 and which is adapted to be connected to the female connector 440 when the motor cover 413 is placed in operating position on the cast upper gear housing 135.

*Electrical wiring diagram*

The various housings for the electrical components relating to the present invention having been briefly described, a description of the electrical wiring diagram in Figures 25, 25-A and 26 will now be given wherein the parts disposed within the various corresponding housings heretofore described are shown schematically and also including a description of the wires disposed within the various cables heretofore described.

Referring to Figure 2, there is shown extending from the bottom of the switch box 76 a cable 510a which may extend to a point remote from the loom and, by referring to Figure 25-A, it will be observed that a master switch box, indicated by the dotted lines 510, has an overload reset switch 511 therein, preferably of 117 volts, 60 cycles construction, and to which lead wires 512 and 513 are connected, these lead wires 512 and 513 extending from a suitable source of electrical energy, not shown.

Wires 514 and 515 are connected to the side of the switch 511 remote from the lead wires 512 and 513 and these wires extend within the electric cable 510a, heretofore described (Figure 2), and enter the sensitive switch housing 76. This sensitive switch housing 76 has a sensitive switch 516 therein which is of a type having a spring loaded plunger associated therewith and extending out of the housing 76 therefor, and which normally holds the switch 516 in closed position. This spring loaded plunger associated with the switch 516 is shown in Figure 1 and is indicated at 516a. Upon the brake handle 74 being moved to operating position for stopping the loom, the angle clip 75 thereon will engage the spring loaded plunger 516a for opening the switch 516 disposed within the sensitive switch housing 76.

The wire 514 (Figure 25-A) is connected to one side of the sensitive switch 516 and wire 517 is connected to the other side of the sensitive switch 516 and there is also a wire 520 connected to the side of the switch 516 to which the wire 514 is connected. All of the wires 515, 517 and 520 are connected to a common female plug indicated at 521 and to which the male plug 504, heretofore described, is adapted to be connected. The male plug 504, to which one end of the cable 478 (Figure 2) is connected, has the ends of wires 522, 523, and 524 connected thereto and these wires 522, 523 and 524 coincide with the wires 513, 517 and 520, respectively, in the female plug 521. The wires 522, 523 and 524 extend through the cable 478 and enter the junction box 476 at the top of the arch 14, (Figures 1 and 2) the wire 523 extending on through the junction box 476 and entering the cable 479 at the other side of the junction box 476. The wire 522 is connected at it send remote from the male plug 504 intermediate the ends of a wire 526 disposed within the junction box 476, opposed ends of which are connected to terminals 527 and 528 of the female cannon plugs 531 and 532, respectively.

Terminals 533 and 534 on the female cannon plugs 531 and 532, respectively, have opposed ends of a wire 535 connected thereto. One end of a branch wire 536 is connected intermediate the ends of the wire 523 which extends through the junction box 476, and the other end of the wire 536 is connected to a terminal 537 on the female cannon plug 531. The female cannon plugs 531 and 532 have terminals 540 and 541 thereon to which opposed ends of a wire 542 are connected.

One end of a branch wire 543 is connected to a terminal 544 on the female cannon plug 531 and the other end of the wire 543 is connected intermediate the ends of the wire 524 which, in turn, is connected at its end remote from the plug 504 to one side of an incandescent or neon lamp 545 to the other side of which one end of a wire 546 is connected. The wire 546 extends to and is connected intermediate the ends of the wire 526 heretofore described. The lamp 545 is adapted to be mounted adjacent the window 506 in the junction box 476 and will indicate to the operator that the master switch 511 is in closed position.

A terminal 547 on the female cannon plug 531 has one end of a wire 550 connected thereto, the other end of which is connected to a terminal 551 supported by but insulated from the junction box 476 and to which one end of the wire 505, heretofore described as extending to the conventional warp stop motion 20 of the loom, is connected. The female cannon plug 532 also has a terminal 552 to which one end of a wire 553 is connected, this wire 553 extending out of the junction box 476 through the cable 479 along with the wire 523 and these wires 523 and 533 being connected at their other ends to the female plug 482, heretofore described (Figures 2, 23 and 25-A).

It might be stated that although other terminals are shown on the female cannon plugs 531 and 532, these terminals are not employed and therefore will not be described further. The ends of the wires 535 and 553 which are connected to the terminals 534 and 552, respectively, on the female cannon plug 532 may be connected to each other if so desired, however, in the present instance, a suitable dummy male plug 555 is provided which has a plurality of terminals thereon two of which are indicated by the reference characters 556 and 557, these terminals being connected by a wire 560 and which terminals coincide with the terminals 534 and 552 to complete a circuit therebetween when the male and female cannon plugs 532 and 555 are assembled.

It might be stated that the purpose of the cannon plugs 532 and 555, in the upper portion of Figure 25-A, is to provide means for connecting an electrical cable to the circuit from the box 476 and this cable may extend to a suitable counting device or other electrical apparatus which may be responsive to the various electrical parts associated with this apparatus. For example, the electrical stop motion 370, heretofore described, may have suitable electrical connections therefrom for operating a counting device connectable to the female cannon plug 532 if so desired. In a modified form of stop motion, to be later described, there is shown a manner in which electrical connections may be made between a stop motion which functions in a manner similar to the stop motion 370, for thus operating a counting device or the like.

It has already been described how the female plug 482 (Figure 23) is connected to the male plug 483 having the cable 485 extending therefrom. Now, this cable 485 has wires 562 and 563 therein which coincide with the wires 523 and 553, respectively, when the plugs 482 and 483 are assembled and which wires extend into the sensitive switch box 486. The switch box 486 has a sensitive switch 564 therein to opposed sides of which the wires 562 and 563 are connected (Figure 25-A).

The male cannon plug 475, heretofore described as being connected to one end of the main power cable 460, has terminals 571 to 578, inclusive, thereon and the ends of wires 581 to 585 are connected to the terminals 571 to 575, inclusive, respectively. The wires 581 to 585, inclusive, extend through the main power cable 460 and are connected at their other ends to terminals 591 to 595 inclusive, respectively, of the female cannon plug 458, heretofore described. Wires 587 and 588 are connected to the terminals 577 and 578 on the male cannon plug 475 and their other ends are connected to terminals 597 and 598, respectively, on the female cannon plug 458. This female cannon plug also has a terminal 596 thereon which is not employed in the present invention.

The male cannon plug 475 is adapted to be connected to the female cannon plug 531 on the junction box 476 with terminals 527, 537, 533, 547, 544 and 540 engaging the terminals 571 to 576, inclusive, respectively, to complete a circuit therebetween. The female cannon plug 458 is adapted to be connected to the male cannon plug 457 disposed in the upper wall 412 of the motor shield 413 with its terminals 591 to 598, inclusive, engaging terminals 601 to 608, inclusive, respectively, in the male cannon plug 457.

The male cannon plug 457 has wires 611 to 616 extending from the terminals 601 to 606, respectively, and which wires enter the harness cable 423, heretofore described (Figures 19 and 25-A). The ends of the wires 614 and 616 remote from the male cannon plug 457 extend to terminals 626 and 625, respectively, of the female connector 440, heretofore described. This female connector 440 also has terminals 621 to 624, inclusive, and 627 and 628 thereon.

As has already been stated, the female connector 440 is adapted to be connected to the male connector 509 when the motor cover or shield 413 is placed in position on the upper cast gear housing 135, and, in so doing, the terminals 621 to 628, inclusive, on the female connector 440 engage terminals 631 to 638, inclusive, respectively, on the male connector 509 (Figures 4, 5, 6, 19 and 25-A). The wires 191 to 194, inclusive, which extend from the electric motor 171 through the cable 190 are connected at their ends remote from the motor 171 to the terminals 631, 634, 633 and 637, respectively, of the male connector 509. The ends of wires 642, 643, and 403 are connected to the terminals 632, 635 and 636, respectively, on the male connector 509 and the wires 642 and 643 are connected to opposed sides of a switch 645. The wire 403 is connected, in the manner heretofore described, to the electrically operable stop motion 370 (Figures 8, 14 and 16) which is exemplified in Figure 25-A as a switch 370. It has already been described how the closing of this switch 370 will ground the wire 403.

The terminals 621 to 624, inclusive, on the female connector 440 have the ends of wires 647 to 650, inclusive, respectively, connected thereto. The terminal 627 on the female connector 440 has one end of a wire 651 connected thereto. The ends of the wires 647 and 648 remote from the female connector 440 are connected to the wires 611 and 612, respectively, which extend from the male cannon plug 457, heretofore described.

Referring to the lower central portion of Figure 25-A, there is shown in dotted lines the outline of the switch box 462 which, as shown in Figure 2, has the manually operable spring loaded control buttons 464, 465 and 466 associated therewith. This switch box 462 contains a starter switch 655, a right jogging switch 656 and a left jogging switch 657. Each of the switches 655 to 657 may be of identical construction and are preferably of a type manufactured by Square D Company, Industrial Controller Division, Milwaukee 12, Wis., and are known as their class 9001 push button control stations and a description of which is given in Sweet's File for Product Designers for the year 1946 and appearing in Section 36/11, page 7. The starter switch 655 comprises contact bars 660 to 663, inclusive, which are mechanically interconnected in a conventional manner and the contact bars 660 and 662 are normally urged to open position while the contact bars 661 and 663 are normally urged to closed position.

The right jogging switch 656 comprises similar contact bars 664 to 667, inclusive, the contact bars 664 and 666 normally being urged to open position and the contact bars 665 and 667 normally being urged to closed position and these bars also being mechanically interconnected. The right jogging switch 657 comprises mechanically interconnected contact bars 670 and 673, inclusive, the contact bars 670 and 672 normally being urged to open position and the contact bars 671 and 673 normally being urged to closed position. An operator depressing the three push buttons 464 to 466, inclusive (Figure 2), will move the contact bars 660 to 667 and 670 to 673, inclusive to the opposite position from that shown in Figure 25-A and also to the opposite position from that heretofore described. Wires 677 and 676 are connected to terminals adjacent both sides of the contact bar 660 of the starter switch 665 while wires 678 and 679 are connected to terminals adjacent opposed ends of the contact bar 661 and the wires 678 and 679 extend to a male connector 680 having terminals 681 to 688, inclusive, thereon. This male connector 680 is adapted to have a female connector 690 connected thereto, this female connector 690 having terminals 691 to 698, inclusive, thereon which correspond to the terminals 681 to 688, inclusive, respectively, of the male connector 680. The wires 678 and 679 in the switch housing 462 are connected to the terminals 684 and 686, respectively. The wire 676 from the terminal adjacent the right-hand side of the contact bar 660, in Figure 25-A, is connected at its other end intermediate the ends of the wire 679.

The wire 677 extends from the terminal adjacent the left-hand end of the contact bar 660 in Figure 25-A and its end remote therefrom is connected intermediate the ends of a wire 701 opposed ends of which terminate adjacent the proximate ends of the contact bars 665 and 667. A wire 702 extends from a terminal adjacent the left-hand side of the contact bar 665 and is connected at its other end to the terminal 682 on the male connector 680.

A branch wire 703 is connected intermediate the ends of the wire 677 and its other end is connected to a terminal adjacent the left-hand end of contact bar 666 and a wire 704 is connected to a terminal adjacent the right-hand end of the contact bar 666, its other end being connected intermediate the ends of a wire 705, one end of which is connected to the terminal 681 on the male connector 680 and the other end of which is connected to a terminal adjacent the left-hand end of the contact bar 670 in the switch box 462.

A wire 707 extends from a terminal adjacent the right-hand end of the contact bar 667 and is connected at its other end to a terminal adjacent the left-hand end of the contact bar 672. A terminal adjacent the right-hand end of the contact bar 672 has a wire 708 extending therefrom the other end of which is connected to the terminal 685 on the male connector 680. A wire 711 extends from a terminal adjacent the left-hand end of the contact bar 664 and is connected at its other end intermediate the ends of the wire 708.

A wire 712 extends from a terminal adjacent the right-hand end of the contact bar 664 and is connected at its other end to a terminal adjacent the right-hand end of the contact bar 673. To a terminal adjacent the left-hand end of the contact bar 673 a wire 713 is connected, its other end being connected to a terminal adjacent the right-hand end of the contact bar 671. This contact bar 671 also has a terminal adjacent the left-hand end thereof to which one end of a wire 714 is connected, the other end of the wire 714 being connected to the terminal 687 on the male connector 680.

A wire 715 is connected at one end intermediate the ends of the wire 713, in the lower portion of Figure 25-A, and extends upwardly and its other end is connected to a terminal at the right-hand end of the contact bar 662. This wire 715 also has one end of a branch wire 716 connected intermediate its ends and the other end of the wire 716 is connected to a terminal adjacent the right-hand end of the contact bar 670. A terminal adjacent the left-hand end of the contact bar 662 has a branch wire 720 connected thereto, the other end of which is connected to a wire 721, opposed ends of which are connected to a terminal 683 on the male connector 680 and to a terminal adjacent the left-hand end of the contact bar 663. A terminal adjacent the right-hand end of the contact bar 663 has one end of a wire 722 connected thereto, the other end of which is connected to the terminal 688 on the male connector 680. This completes the description of the switch structure disposed within the switch box 462.

Referring to the female connector 690, disposed above the dotted lines defining the switch box 462 in Figure 25-A, the terminals 691 and 692 thereon have the ends of wires 725 and 726, respectively, connected thereto. The other end of the wire 725 is connected intermediate the ends of the wire 611 heretofore described, and the end of the wire 726, remote from the female connector 690, extends a substantial distance through the harness cable 423 (Figure 19) and is connected at its other end to a terminal, to be later described, on the female connector 426.

The wires 649 and 650 from the female connector 440 are connected at their other ends to the terminals 693 and 694, respectively. The ends of wires 727 to 730, inclusive, are connected to the terminals 795 to 798, inclusive, respectively, and the other end of the wire 727 is connected intermediate the ends of the wire 615, heretofore described. The wire 728 from the female connector 690, in Figure 25-A, extends to Figure 25 and is connected to a terminal 733 on the female connector 445 above the motor reversing relay disposed within the housing 447 shown in dotted lines in Figure 25. This female connector 445 has terminals 731 to 736, inclusive, thereon.

It has already been described how this female connector 445 is adapted to be connected to the male connector 446 of the motor reversing relay disposed within the housing 447. This motor reversing relay may be of a type manufactured by Allen-Bradley Company, Milwaukee 4, Wisconsin, under their bulletin 705 and described in said Sweet's File, Section 36/1, page 12. The male connector 446 has terminals 741 to 746, inclusive, thereon which coincide with the terminals 731 to 736, inclusive, on the female connector 445. Wires 751 to 756, inclusive, are connected to the terminals 741 to 746, inclusive, respectively.

The wire 751 is connected at its end remote from the terminal 741 to the upper end of a second relay coil 760 and also has connected intermediate its ends, the upper end of a first relay coil 761. The ends of the wires 755 and 756 remote from the male connector 446 are connected to the lower ends of the relay coils 761 and 760, respectively.

The end of the wire 752 remote from the male connector 446 is connected intermediate the ends of a wire 762 opposed ends of which are connected to one side of switches 763 and 764, respectively. The other side of the switch 763 has one end of the wire 753 connected thereto which extends from the male connector 446, and the side of the switch 764 remote from the side to which the wire 762 is connected has a wire 765 connected thereto and intermediate the ends of which one end of the wire 754 from the terminal 744 is connected. This wire 765 is connected at its end remote from the switch 764, to one side of a switch 766 to the other side of which a wire 767 is connected.

The end of the wire 767 remote from the switch 766 is connected intermediate the ends of the wire 751 and has connected intermediate its ends a wire 770 whose other end is connected to one side of a switch 771. The other side of the switch 771 has a wire 772 connected thereto, the other end of which is connected intermediate the ends of wire 753 extending from the male connector 446 to thus complete the description of the motor reversing relay mechanism disposed within the motor reversing relay housing 447 (Figures 19 and 25).

The wire 730 extending from the female connector 690, in Figure 25-A, is connected at its other end to the terminal 734 on the female connector 445 in Figure 25. The ends of wires 775 to 778, inclusive, are connected to the terminals 731, 732, 735 and 736, respectively, on the female connector 445. The ends of the wires 775 and 776 remote from the female connector 445 are connected intermediate the ends of the wires 611 and 612, respectively.

The wires 777 and 778 from the female connector 445 (Figure 25) extend to the female connector 426 disposed above the stepping switch disposed within the housing 430, which is outlined in dotted lines in Figure 25. The female connector 426 has terminals 791 to 800, inclusive, thereon, the wires 777 and 778 being connected to the terminals 795 and 796, respectively. The wire 729 from the terminal 697 on the female connector 690 (Figure 25-A) extends to Figure 25 and is connected to the terminal 797 on the female connector 426.

The wire 612 from the terminal 602 on the male plug 547 (Figure 25-A) extends to Figure 25 and is connected at its other end to the terminal 792 to the female connector 426. The wire 726 from the terminal 692 of the female connector 690, above the switch housing 462 in Figure 25-A, extends to Figure 25 and is connected at its other end to the terminal 794 of the female connector 426. The terminal 798 on the female connector 426 has one end of a wire 805 connected hereto which extends to a terminal 806 (Figure 25-A) on a female plug 807 which also has a terminal 810 thereon from which a wire 811 extends, the other end of the wire 811 being connected intermediate the ends of the wire 615. The male plug 807 is disposed above the sensitive switch housing, defined by the dotted lines 450 in Figure 25-A, and is adapted to be connected to a male plug 813 having terminals 814 and 815 thereon which coincide with the terminals 806 and 810, respectively, on the female plug 807.

Wires 816 and 817 extend from the terminals 814 and 815 and their other ends are connected to opposed sides of a sensitive switch 820 disposed within the sensitive switch housing 450 and which is normally held in an opened position under spring pressure so as to be closed by the spring loaded plunger 452 upon the roller 453 thereon (Figure 19) engaging any one of the four angle clip dogs 106, 107, 113 and 114 on the trackway 98 (Figures 1, 2, 20, 21 and 22).

Now, referring again to Figure 25, the terminals 799 and 800 on the female connector 426 have the ends of wires 825 and 826, respectively, connected thereto and the other ends of these wires 825 and 826 are connected to terminals 833 and 834 of the female connector 422 associated with the selenium rectifier indicated at 835 and disposed within the housing 420 (Figure 19) which housing is indicated by dotted lines in Figure 25. This female connector 422 also has a pair of terminals 831 and 832 thereon to which the ends of wires 613 and 611, respectively, are connected, these wires extending from the terminals 603 and 601, respectively, on the male plug 457 in Figure 25-A.

The selenium rectifier 825 disposed within the housing 420 has the male connector 421 associated therewith which has terminals 841 to 844, inclusive, which coincide with the terminals 831 to 834, inclusive, respectively, on the female connector 422. Wires 845 and 846 extend from the terminals 841 and 842, respectively and are connected to opposed sides of the selenium rectifier 835. Wires 847 and 848 are connected to the terminals 843 and 844, respectively, their other ends being connected to opposed corners of the rectifier 835.

A motor capacitor 851 is disposed within the motor capacitor housing 435 and has the ends of the wires 651 and 615 connected to opposed sides thereof. As has already been stated, the wire 651 extends from the terminal 627 on the female connector 440 in Figure 25-A and the wire 615 extends from the male plug 457 in Figure 25-A.

*Stepping switch circuit*

Referring to Figure 25 there is shown in the central portion thereof a stepping switch disposed within the stepping switch housing 430 (Figure 19), this stepping switch housing being indicated by dotted lines in Figure 25. An enlarged view of the diagram relating to the stepping switch in the housing 430 is shown in Figure 26. There are many types of stepping switches which may be employed for the purpose of controlling the timing of actuation of the various electrical components associated with the present invention and the schematic diagram shown in Figure 25 is particularly arranged for a spring driven type of stepping switch such as is manufactured by C. P. Clare and Company, 4719 West Sunnyside Avenue, Chicago 30, Illinois, and, in the present instance, is of a type having a ratchet mechanism associated therewith which is remotely controlled by the sensitive switch 820 in the sensitive switch box 450 and by the sensitive switch 564 disposed in the sensitive switch box 486 adjacent the dobby head 25. This switch is also referred to as a 20 point, 6 level switch being provided with six wipers. This spring driven stepping switch, in the housing 430, is of a type illustrated and described in Sweet's file for product designers of 1946, Section 3b/3, page 8.

Since the stepping switch in the housing 430 is a six level stepping switch and although the contact points of each of the levels are disposed in a semi-circular manner around a common axis, these six levels are shown in Figures 25 and 26 as being disposed separate from each other for purposes of clarity and are indicated by the reference characters 861 to 866, inclusive. Since each of these levels 861 to 866 is identical, like reference characters will apply to all of the levels 861 to 866, inclusive and a brief structural description will be given of the level 861 only.

The level 861, being a 20 point level, has 20 contact points indicated by the lower case letters $a$ to $t$, inclusive, and these contact points $a$ to $t$, inclusive, are arranged in a semi-circular manner about a shaft 870 having a plurality of contact wipers or pointers 871 thereon which extend outwardly and are adapted to engage the contact points $a$ to $t$, inclusive, in step-by-step relation in a manner to be later described. There is one of these contact wipers 871 for each of the levels 861 to 866, inclusive.

It will be observed in Figures 25 and 26 that many of the contact points $a$ to $t$, inclusive, associated with each of the levels 861 to 866, inclusive, have no electric wires extending from the same and therefore only those contact points to which wires are connected will be further described. The contact points $b$, $d$, $f$, $k$, $m$, and $o$ of the level 861 have the ends of wires 875 to 880, inclusive, respectively, connected thereto.

The contact points, $b$ to $i$, inclusive, of the level 862 have the ends of wires 882 to 889, inclusive, respectively, connected thereto. The contact points $k$ to $r$, inclusive, associated with the level 862 have the ends of contact wires 890 to 897, inclusive, respectively, connected thereto. The contact points $b$ to $i$, inclusive, of the level 863, have the ends of wires 900 to 907, respectively, connected thereto. The contact points $k$ to $t$, inclusive, of the level 863 have the ends of wires 908 to 917, respectively, connected thereto.

The contacts points $c$, $e$, $g$, $h$, $i$, $l$, $n$, $p$, $q$, and $r$, of the level 864 have the ends of wires 920 to 929, respectively, connected thereto. The contact points $s$ and $t$ of the level 865 have the ends of wires 935 to 936 connected thereto. The contact points $b$ to $t$, inclusive, of the level 866 have the ends of wires 941 to 959, respectively, connected thereto.

It has already been stated how the stepping switch disposed within the housing 430 has a ratchet mechanism associated therewith for imparting a step in movement to the shaft 870, and thus to all of the wipers 871, so as to successively cause the wipers to engage the corresponding contact points *a* to *t*, inclusive. This step-by-step movement is imparted to the ratchet mechanism associated with the shaft 870 by means of a solenoid coil 963 to opposed ends of which wires 964 and 965 are connected. The male connector 427 associated with the selector switch in the housing 430 has terminals 971 to 980 inclusive, thereon which coincide with the terminals 791 to 800 in the female connector 426 when these connectors 426 and 427 are assembled.

The terminal 971 is not used and the terminal 972 has a wire 985 extending therefrom, the other end of which is connected to the wiper 871 of the level 865. Branch wires 986 and 987 are connected intermediate the ends of the wire 985 and their ends remote from the wire 985 are connected to the wipers 871 of the levels 861 and 864, respectively. A wire 990 is connected at one end to the terminal 973 on the connector 427 and at its other end to one side of an automatically operable reset switch 991 and this wire 990 also has the ends of the wires 882 to 885, inclusive, and wire 897 from the level 862 connected intermediate its ends. It will be observed in Figure 26 that the wires 886 to 896, inclusive, are connected at their ends remote from the level 862 intermediate the ends of the wire 897 which extends from the contact point *r* to the wire 990.

The wire 917 from the contact point *t* of the level 863 is connected at its end remote from the level 863 to the side of the switch 991 remote from the wire 990. The ends of the wires 900 to 916, inclusive, remote from the level 863 are connected intermediate the ends of the wire 917. The wires 935, 936 and 941 to 944, inclusive, and wire 959 are also connected at their ends remote from the corresponding levels 865 and 866 intermediate the ends of the wire 917. The ends of the wires 945 to 958, inclusive, remote from the level 866 are connected intermediate the ends of the wire 959.

The wire 880 from the contact point *o* of the level 861 is connected at its other end to the terminal 976 on the male connector 427. The wire 921 from the contact point *e* of the level 864 is connected at its other end intermediate the ends of the wire 886. The ends of the wires 876, 878 and 929, remote from the corresponding levels 861 and 864, are connected intermediate the ends of the wire 921. The terminal 975, on the male connector 427, has the end of the wire 879, from the terminal *m* of the level 861, connected thereto and this wire 879 has the end of the wire 920 remote from the level 864 connected intermediate its ends. The wires 875 and 877 from the level 861 and the wire 926 from the level 864 are connected intermediate the ends of the wire 920.

The ends of the wires 922, 923 and 924, remote from the contact points *g*, *h* and *i* of the level 864, are connected intermediate the ends of the wire 926. The ends of the wires 925, 927 and 928, remote from the level 864, are connected intermediate the ends of the wire 929.

The terminal 977, at the male connector 427, has one end of a wire 992 connected thereto which is connected at its other end to the wiper 871 of the level 863. The ends of the wires 964 and 965 remote from the solenoid coil 963 are connected to the terminals 979 and 980, respectively of the male connector 427. The terminals 974 and 978 have wires 994 and 995, respectively, connected thereto the other ends of which are connected the wipers 871 of the levels 866 and 862, respectively. This completes the description of the structure of the float cutting apparatus and the electrical circuit associated therewith.

SUMMARY

Briefly stated, the master switch 511 (Figure 25-A) is closed for directing energy to the various electrical components of the apparatus and the pattern pin 42 (Figures 23 and 24) on the dobby head 25 initiates the cycle of the stepping switch disposed in the stepping switch housing 430. The stepping switch in the housing 430 (Figures 25 and 26) then completes a circuit to the various other electrical components, in a step-by-step manner to be later described, to cause the following operations to take place in the order named:

Upon the sensitive switch 564 being closed by the pattern pin 42, the wipers 871 of the stepping switch are moved a first step, closing a circuit to the motor reversing relay in housing 447, which will, in turn, energize the motor 171 to start the float cutting carriage moving across the loom.

Upon the carriage starting to move across the loom, the roller 453 (Figure 19) on the end of the spring loaded plunger 452, associated with the sensitive switch 820 (Figures 19 and 25-A), will engage the first of the dogs which, we will say, is the angle clip dog 106, permitting the carriage of the float cutting apparatus to continue to move from left to right in Figures 1 and 2, and this roller 453 will engage the angle clip dog 107 causing the carriage to reverse its direction of movement and to move to the left of the angle clip dog 106 in Figures 1, 2, and 20, the dog 106 again causing the carriage to return to its original direction of movement. The carriage will then move from left to right across the width of the fabric F and, in so doing, moves past the dogs 113 and 114 in Figures 1, 2 and 21 to complete one-half of the cycle of its operation.

After a predetermined number of picks, the pattern pin 42 (Figures 23 and 24) then again causes the switch 564 (Figure 25-A) to be closed momentarily, to initiate the remaining half of the cycle of operation of the electrical stepping switch in housing 430 and to cause the carriage to move from right to left in Figures 1, 2 and 21 with the result that the roller 452 on the sensitive switch 820 in the housing 450 (Figure 19), will successively engage the angle clip dogs 114 and 113, the dog 113 causing the carriage to reverse its direction of movement to again move from left to right past the dogs 113 and 114, successively, and whereupon the dog 114 again causes the carriage to go into its movement from right to left across the loom, with the result that the roller 453 will successively engage the angle clip dog 114, 113, 107, and 106, advancing the stepping switch in the housing 430 a step upon the float cutting carriage passing each of the dogs 106 to 114 inclusive. This will again position the parts of the stepping switch to repeat another cycle upon the pattern pin 42 again moving into engagement with the follower wheel 501 of the switch 820 in the sensitive switch housing 450.

Now, as the carriage during the initial part of the cycle moves from left to right in Figures 1 and 2, it is evident that the plows 360 and 360' (Figure 12) will be disposed above the floated portions 54 of the warp yarns, which move thereneath upon beat-up strokes of the lay 41 while the float cutting apparatus is at rest and until the pattern pin 42 in the dobby head 25 moves into position so as to temporarily close the sensitive switch 820 (Figure 25-A). As the float cutting apparatus is caused to move from left to right, in Figures 1 and 2, the leading edge 362 of the plow 360 will pass beneath the immediately adjacent floated portions 54 of the warp yarns Y, directing the next succeeding floated portions to the rotary cutting disk 300 (Figure 8) in the manner heretofore described.

Now, due to the fact that the plows 360 and 365 will have been disposed above a few of the floated portions 54 of the warp yarns Y at the left hand selvage of the fabric F in Figure 1, reverse movement is imparted to the carriage, causing the same to move from right to left in Figures 1 and 2, with the result that the leading edge 362' of the plow 360' will move beneath these last named floated portions 54 of the warp yarns Y to thereby direct these floated portions 54 to the cutting blade 300' in the identical manner in which the floated portions of the warp yarns Y had previously been directed to the cutting disk 300.

The carriage then resumes its original direction of movement and moves entirely across the loom, severing the floated portions 54 of the warp yarns Y intermediate their ends in so doing. The carriage then stops after having moved to the opposite selvage of the fabric F to that from which it had originally started.

It is evident that the conventional take-up mechanism, not shown, associated with looms of this type will take-up on the fabric F as the float cutting apparatus is moving from one side of the loom to the other and therefore the springs 350 and 351 (Figure 10) are provided in the tubular guide shafts 324, 325, 324' and 325', and the function of which has already been described, so the trailing tie down points of the floated portions of the warp yarns Y may engage and move the plows 360 and 365, along with other associated parts of the cutter head mechanism, forwardly slightly as the carriage moves from approximately midway of the width of the fabric F in the latter half of its movement in one direction or the other.

During movement of the float cutting apparatus from one selvage to the middle of the fabric F in one direction or the other, the leading tie down points of the floated portions 54 of the warp yarns Y will cause the plows 360 and 360' to move rearwardly slightly, the leading ends of these plows 360 and 360' being substantially pointed as at 362 in the manner shown in Figure 13 so as to lead the plows 360 and 360' between the tie down points of the floated portions 54 of the warp yarns Y.

The float cutting apparatus will, of course, dwell at the right hand selvage of the fabric F in Figures 1 and 2, after having moved across the fabric F, until a predetermined number of picks have been woven into the fabric F and whereupon the pattern pin 42, in Figures 2, 23 and 24, will again start the stepping switch mechanism to induce completion of the cycle and which will cause the plow 360' to first move beneath the floated portions 54 of the warp yarns Y at the right hand selvage as the carriage moves from right to left, in Figures 1 and 2, after which reverse movement will again be imparted to the carriage causing the same to move from left to right so as to lead the plow 360 beneath the floated portions 54 of the warp yarns Y which had previously been disposed beneath the plows 360 and 360'. The float cutting operation is then resumed throughout the width of the fabric with the carriage of the float cutting apparatus moving from right to left in Figures 1 and 2 to thus complete the cycle.

Detailed method of operation

For purposes of description, the step-by-step movements of the wipers 871 of the stepping switch in housing 430 will be hereinafter referred to as step a, step b, step c, etc. and, for example, step c will indicate that the free end of the wiper 871 associated with each of the levels 861 to 866, inclusive, will be in engagement with the corresponding contact point c.

Now, assuming a previous cycle in the operation of this float cutting apparatus to have been completed, the master switch 511 in the housing 510 (Figure 25-A) is closed at the same time the usual switch to the loom motor, not shown, is closed and, upon pulling the shipper handle and the brake handle 71 and 74, respectively (Figures 1 and 2), towards the observer in Figure 2. The angle clip 75 on the lower end of the brake handle 74 (Figure 1) moves out of engagement with the plunger 516a permitting switch 516 to close.

The desired number of picks are then woven into the fabric F, whereupon the pattern pin 42 (Figures 23 and 24) moves into engagement with the roller 501 to move the plunger 495 of the switch 486 inwardly and to close the switch 564 (Figures 24 and 25-A). This completes a circuit to the solenoid coil 963 for operating the ratchet mechanism of the stepping switch in the housing 430 to cause the free ends of the wipers 871 of the levels 861 to 866, inclusive, to move into engagement with their corresponding contacts b for step b in operation of this float cutting apparatus.

With the wipers 871 in step b position, a circuit is completed to the first relay 761 in the motor reversing relay housing 447 (Figure 25). This will move the switches 763 and 766 to closed position which energizes the motor 171 to cause the motor shaft 170 (Figure 5) to rotate and to impart rotation to the rotary cutting disks 300 and 300' and the associated brushes 302 and 302' (Figure 8) in one direction. This rotation of the motor shaft 170 will also impart rotation to the pinion 184 (Figure 6), through the worm 177 and the worm gear 180 (Figure 18) and the shaft 182, to cause the pinion to rotate in one direction, which we will assume to be a counterclockwise direction in Figure 6, and to thereby cause the float cutting apparatus to move from left to right in Figures 1, 2, 20, 21 and 22 from the left-hand selvage of the fabric F in Figure 1.

Now, as the float cutting apparatus moves from left to right in Figures 1 and 2, the roller 453 (Figure 19) on the switch plunger 452 of the sensitive switch 820 in housing 450, will engage and move past the first angle clip dog 106 to thus close the switch 820 momentarily and which will index the stepping switch in housing 430 so the wipers 871 will move to step c position. With the wipers 871 in step c position, the reversing relay coil 761 will still remain energized with the result that the motor 171 will continue to rotate in the same direction thus causing the float cutting apparatus to continue movement in the same direction.

The roller 453 on the plunger 452 of the sensitive switch 820 in housing 450 will then engage and move past the second angle clip dog 107 which will again momentarily close the switch 820 and cause the wipers 871 to be indexed to the step d position. This stops the flow of current to the reversing relay coil 761 in the motor reversing relay housing 447 (Figure 25) and directs the flow of current to the second reversing relay coil 760 to thereby close another circuit to the electric motor 171 causing the shaft 170 thereof to reverse its direction of movement and to thereby impart rotation in a clockwise direction to the pinion 184 in Figure 6.

The float cutting apparatus will then be caused to move in a reverse direction or from right to left in Figures 1 and 2. Now, since the reversing of the electric motor 101 will have transpired as the roller 453 of the switch 820 moved to the right of the angle clip dog 107, in Figure 20, upon reverse movement of the float cutting apparatus, the roller 453 associated with the switch 820 will again engage the angle clip dog 107 (Figure 20) to index the wipers 871 of the stepping switch in the housing 430 to step e position.

With the wiper arms 871 in the step e position, current will continue to flow to the second motor reversing relay coil 760 and thus the pinion 184 in Figure 6 will continue to rotate in a clockwise direction to cause the float cutting apparatus to continue its movement from right to left in Figures 1, 2 and 20 and thus the roller 453 associated with the sensitive switch 820 will again engage the first angle clip dog 106 as it continues past the same. This will again stop the flow of current to the motor reversing relay coil 760 and will again direct the flow of current to the motor reversing coil 761.

This will cause the motor shaft 170 to resume rotation in its original direction and the pinion 184 will resume rotation in a counterclockwise direction in Figure 6 to cause the float cutting apparatus to again move from left to right in Figures 1, 2, 21, and 22. The wipers 871 will then have moved to step f.

Now, upon the float cutting apparatus again moving from left to right, upon the wipers 871 being indexed to the step f position, the roller 453 (Figure 19) will successively engage and pass over the angle clip dogs 106, 107, 113 and 114 and this will cause the wipers 871 to be indexed four times; through the steps g, h, i, and to step j. As the wipers 871 move through steps g, h and i they continue to direct the flow of current to the first motor reversing relay coil 761 and therefore the shaft 170 of the motor 171 will continue to rotate in the same direction so the float cutting apparatus may continue its movement from the left-hand to the right-hand selvage of the fabric F in Figure 1.

Now, as the roller 453 of the sensitive switch 820 moves over the fourth angle clip dog 114, causing the wipers 871 to move to step j position, the current will cease to flow to both of the motor reversing relay coils 760 and 761 and, obviously, both of the reversing switches in the motor reversing relay housing 447 will be opened and current will cease to flow to the motor 171. Therefore the float cutting apparatus will come to rest at the right-hand selvage of the fabric F and will dwell in this position until another impulse is received from the dobby head switch 564 and which will index the wipers 871, of the stepping switch in housing 430, to a step k position and which will complete a circuit to the second relay coil 760. This will again cause current to flow to the electric motor 171 in such a manner that rotation will be imparted to the pinion 184 in a clockwise direction in Figure 6. This will cause the float cutting apparatus to start movement from right to left in Figures 1 and 2 as a result of which the roller 454 (Figure 19) of the sensitive switch 820 will again engage and move past the fourth angle clip dog 114 to advance the wipers 871 to step l position. However, since movement of the wipers 871 to step l position continues to cause current to flow to the second motor reversing relay coil 760, the contact bars 764 and 771 thereabove will continue to remain in closed position and the motor shaft 170 will continue to rotate in the same direction and the float cutting apparatus will continue to move from right to left in Figures 1, 2, and 21.

The roller 453, associated with the sensitive switch 820 (Figures 19 and 25-A), will then engage and move past the angle clip dog 113 causing the wipers 871 to advance to step m position. Step m by the wipers 871 will cause the flow of current to the second motor reversing relay coil 760 to cease and will cause electric current to flow to the first motor reversing relay coil 761. This will cause the motor shaft 170 to reverse rotation and will thus cause the float cutting apparatus to again move from left to right, from adjacent the third angle clip dog 113 to the right-hand selvage of the fabric F in Figures 1 and 2.

Upon moving from left to right in Figures 1, 2, and 21, the roller 453, associated with the sensitive switch 820 on the float cutting apparatus, will immediately engage the angle clip dog 113 to index the wipers 871 to a step n position. However, the current will continue to flow to the first motor reversing relay coil 761 and, therefore, the float cutting apparatus will continue to move from left to right in Figures 1, 2 and 21.

Now, as the float cutting apparatus moves to the right-hand selvage of the fabric F in Figure 1, the roller 453 (Figure 19) associated with the sensitive switch 820 (Figure 25-A) will again engage the fourth angle clip dog 114 for indexing the wipers 871 to a step o position and this will stop the flow of current to the first motor reversing relay coil 761 and will cause the current to flow to the second motor reversing relay coil 760 to again start the movement of the float cutting apparatus from the right hand selvage in Figure 1.

Upon the wipers 871 being moved to step o, movement of the float cutting apparatus from right to left in Figures 1, 2, and 21 is initiated and the roller 453 associated with the sensitive switch 820 (Figures 19 and 25-A) will again engage and move past the angle clip dog 114 and will continue to the left-hand selvage of the fabric F in Figure 1, the roller 453 successively engaging the angle clip dogs 113, 107 and 106 as it moves past the same.

This will cause the wipers 871 to successively move through steps p, q, r and s and, during steps p, q and r, current will continue to be directed to the second motor reversing relay coil 760 (Figure 25) thus causing the motor shaft 170 to continue to rotate in the same direction, and, in turn, to cause the float cutting apparatus to move from right to left in Figures 1, 2, 20 and 21 from the right-hand selvage of the fabric F. As the roller 453 (Figure 19), associated with the sensitive switch 820 (Figure 25-A), engages and moves past the first angle clip dog 106 from right to left in Figures 1 and 20, the wipers 871 are moved into engagement with the corresponding contact point s and thus the flow of current is directed to the switch 891 (Figures 25 and 26) in the stepping switch housing 430, and this will cause the flow of current to both of the motor reversing relay coils 760 and 761 to cease thus stopping the motor 171 to thereby permit the float cutting apparatus to dwell at the left-hand selvage of the fabric F until the pattern pin 42 (Figures 23 and 24) again moves into engagement with the roller 501 associated with the sensitive switch 504 in the housing 490 to again initiate another cycle in the operation of the float cutting apparatus.

Also, when the wipers 871 are advanced to the step s position, the circuit is completed to the automatic stepping switch 991 to cause the wipers 871 to continue through the remaining part of a revolution to thus return the free ends of the same to a position in engagement with the contact point a. Although the switch 430 (Figures 25 and 26) is provided with the twenty contact points a through t for each wiper 871, the contacts t need not be used in controlling the operation of the float cutting apparatus.

It has already been stated how the follower wheel 392 of the electrical stop motion 370 shown in Figures 14 and 16 will, upon moving into a hole in the fabric F, move downwardly by gravity to thus ground the circuit directed to the same through the wire 403 and, also, how movement of either one or both of the plows 300 toward the front of the loom beyond a predetermined point will cause the same to engage the leaf spring contact ears 387 and 387', respectively (Figure 8), to also ground the circuit through the wire 403 and which will, in turn, ground the circuit normally passing through the conventional contact bar 29 of the usual drop wire stop motion at the rear of the loom.

This grounding of the circuit in the wire 403 will also stop the flow of current to the electric motor 171 thus causing the motor shaft 170 to cease rotation. A further description of the function of the electrical stop motion for the float cutting apparatus shown in Figures 3, 14 and 16 is deemed unnecessary. It might be stated, however, that upon the electrical stop motion shown in Figures 3, 14 and 16, functioning in the manner heretofore described, it may be necessary to move the carriage of the float cutting apparatus to the right or to the left in Figures 1 and 2 or to also return the wipers 871 of the stepping switch in housing 430 (Figures 25 and 26) to step a position. Therefore, the manually operable switch buttons 464 to 466, inclusive (Figure 2), are provided for operating the switches 655 to 657, respectively, in Figure 25–A.

Now, in order to jog the float cutting apparatus to the right in Figures 1 and 2, the operator must depress the push buttons 464 and 465, for the switches 655 and 656, respectively, simultaneously, for completing circuit to the motor 171 thus causing the shaft 170 to turn in such a manner as to transmit rotation, in a counter-clockwise direction, to the pinion 184 in Figure 6.

In order to jog the float cutting apparatus to the left in Figures 1 and 2, the operator depresses the push buttons 464 and 466 for the switches 655 to 657, respectively, to again complete a circuit to the electric motor 171 and to cause the pinion 184 to rotate in a clockwise direction in Figure 6. Upon releasing any one of the push buttons 464 to 466, the motor shaft 170 of the motor 171 will cease rotation and the float cutting apparatus will rest in this position.

Upon closing the switches 655 and 657 by virtue of the push buttons 464 and 466, respectively, a circuit is also completed through the automatic stepping contact switch so as to return the wipers 871 of the stepping switch disposed in housing 430 (Figures 25 and 26), to step a position upon the roller 453 again moving into engagement with the first angle clip dog 106 as the float cutting apparatus moves from right to left in Figure 2.

Upon the electrical stop motion 370 functioning in the manner heretofore described to ground the circuit to the wire 430 (Figure 14), and assuming the float cutting apparatus had moved from left to right in Figures 1 and 2 to a point substantially midway of the fabric F, for example, the push buttons 464 to 466, inclusive, may be depressed in the manner heretofore described to cause the float cutting apparatus to continue through a cycle in operation, if so desired, and the pattern chain 33 associated with the dobby head 25 may be set back or moved in clockwise direction in Figure 23 by an operator so as to again position the pattern chain and the electrical components in Figure 25 and Figure 25–A as well as the float cutting apparatus for starting another cycle.

Now, referring to Figures 27 through 33, there is shown a modified form of stop motion apparatus similar to the apparatus 370 and which is broadly designated at 370a, this modified form of stop motion apparatus being instrumental in detecting the presence of holes or torn places in the fabric F to thus actuate the conventional stop motion of the loom in a manner very similar to that of the stop motion apparatus 370. However, the modified form of stop motion apparatus 370a includes means for connecting the wires 642 and 643 to the stop motion apparatus (Figure 25–A) and presents a better appearing installation than that of the original form of the invention 370. The switch 645 shown in Figure 25–A is representative in that it actually constitutes contact members to be later described associated with this modified form of stop motion apparatus.

Those parts in Figures 27, 28 and 29 which are identical to the parts shown in the original form of the invention will bear the same reference characters as the original form of the invention shown in, say, Figures 3, 4, 5 and 8 to 15, inclusive, with the exception of the parts relating specifically to the modified form of stop motion apparatus 370a. A description of the parts which are identical to the original form of the invention will not be herein repeated.

The cutter head bracket 259 appearing in the drawings relating to the original form of the invention has also been modified to accommodate the modified form of the invention shown in the Figures 27, 28 and 29, and, therefore, the cutter head bracket is indicated broadly at 259a in Figures 27, 28 and 29. The cutter head bracket 259a is substantially the same as the original form of the cutter head bracket 259 and, therefore, like parts will also bear the same reference characters in both instances. However, the extreme outer end of the bracket 259a, or the right-hand end in Figure 27 and the left-hand end in Figure 30, has a downwardly projecting vertical leg 255a integral therewith which differs substantially from the downwardly projecting vertical leg 255 of the original form of the invention.

This downwardly projecting leg 255a (Figure 29) has an opening 1001 extending therethrough and through which a cable or flexible conduit 1002 containing the wires 403, 642 and 643 (Figure 25-A) may extend. The bracket 259a also has an upwardly projecting portion 1003 which coincides vertically with the downwardly projecting leg 255a. The rear face or left-hand face of the cutter head bracket 259a, in Figure 29, has a recess 1004 in the upper portion thereof in which an insulation plate 1005 is mounted and which is secured to the bracket 259a, as by a screw 1006, the head of which is counter-sunk so as to be disposed inwardly of the outer face of the insulation block 1005. A substantially L-shaped bracket 1007 is secured as by screws 1010 (Figures 27, 28 and 29), against the insulation plate 1005, these screws 1010 being threadably embedded in the bracket 259a.

In order to further electrically insulate the substantially L-shaped bracket 1007 from the cutter head bracket 259a, the substantially L-shaped bracket 1007 has a pair of vertically extending adjustment slots 1011 each of which is slidably penetrated by a restricted portion 1012 (Figure 27) of an insulation block 1013 which is slidably penetrated by the screw 1010. The bracket 1007 and parts carried thereby are charged with electricity as the float cutting apparatus operates, for purposes to be later described and it, therefore, is necessary that it be insulated from the bracket 259a.

The horizontal leg of the substantially L-shaped bracket 1007 has a bore 1015 which is slidably penetrated by a vertically disposed follower shaft housing 1016, the horizontal leg of the bracket 1007 being split at one side thereof, as at 1017 (Figure 27) so as to clampingly secure the follower shaft housing 1016 and the horizontal leg of the bracket 1007 by a screw 1020, the horizontal leg of the bracket 1007 having spaced projections 1021 and 1022 integral therewith defined by the slot 1017.

The vertically disposed follower shaft housing 1016 has a vertically disposed longitudinally extending bore 1023 therein, in the upper and lower ends of which bushings 1024 and 1025, respectively, are secured as by a pressed fit. A vertically disposed follower shaft 1026 is mounted for vertical sliding movement in the bushings 1024 and 1025, the shaft 1026 being keyed, as at 1027, in the bushing 1025 to prevent rotation of the shaft 1026.

The vertically disposed follower shaft 1026 extends a substantial distance below the lower end of the vertically disposed follower shaft housing 1016 and has an enlarged tapering portion 1030 integral therewith in the lower end of which a follower wheel 1031 is rotatably mounted as at 1032. This follower wheel 1031 is adapted to ride on the upper surface of the fabric F as the float cutting apparatus moves to and fro across the loom and upon a torn place or a hole in the fabric F being disposed in the path of travel of the follower wheel 1031, the follower wheel 1031 with the enlarged tapering portion 1030 of the vertically disposed follower shaft 1026 will move downwardly substantially as shown in Figure 30, this follower wheel normally assumes the position shown in Figure 28.

The shaft 1026 is urged downwardly by a compression spring 1033 which encircles a restricted upper end portion 1034 of the shaft 1026 and this spring 1033 bears against an insulation disk 1035 which bears against the shoulder at the upper end of the shaft 1026 formed by the restricted portion 1034. The insulation disk 1035 is fixedly secured on the restricted portion 1034 of the shaft 1026 such as by a snap ring 1036. The upper end of the spring 1033 bears against a cap member 1037 which is circular in cross-section and which also surrounds the insulation disk 1035 and is threadably mounted in the upper end of the vertically disposed follower shaft housing 1016.

The follower shaft housing 1016 has an annular shoulder 1040 against which a second insulation disk 1041 is held by the lower end of the cap member 1037, the insulation disk 1041 being held in proper relation to the insulation disk 1035 disposed thereabove by a suitable key such as a pin 1042 (Figures 29 and 30). The housing 1016 has a cavity 1043 disposed immediately below the shoulder 1040 and into which a restricted portion 1045 of the bushing 1024 extends and this restricted portion 1045 engages the medial portion of the lower surface of the second insulation disk 1041.

The follower shaft housing 1016 has a hole 1046 in one side thereof which communicates with the cavity 1043 and through which the cable 1002 extends. The substantially L-shaped bracket 1007 and the insulation block 1005 has coinciding openings 1047 and 1048 which coincide with the hole 1046 in the follower shaft housing 1016 and through which the cable 1002 extends. This cable 1002 has the wires 403, 642 and 643 extending therethrough (Figures 25-A and 32) as heretofore described. In the modified form of stop motion apparatus 370a the wires 642 and 643 are connected to metallic contact members 1052 and 1053, respectively, which are secured, as by metallic rivets 1054 (Figure 32), to the lower surface of the second insulation disk 1041. A wire 1055 is connected at one end to a contact member 1051 identical to the contact members 1052 and 1053 and being secured to the insulation disk 1041 in an identical manner.

The metallic rivets 1054 extend through the second insulation disk 1041 and secure leaf spring metallic contact members 1056 and 1057 and 1058 to the upper surface of the second insulation disk 1041 (Figures 30 and 31), these leaf spring metallic members 1056, 1057 and 1058 coinciding with the metallic contact members 1051, 1052 and 1053, respectively.

It is evident that the wires 1055, 642 and 643 may be soldered to the free ends of the respective contact members or connectors 1051, 1052 and 1053. The end of the wire 1055 remote from the contact member 1051 is connected, as at 1059 (Figure 29), by soldering to the bracket 259a. The wire 403 extends out of the cable 1002 (Figure 29) before the cable 1002 enters the housing 1016 and is connected to the housing 1016, in any suitable manner such as by soldering as at 1065.

The lower surface of the first insulation disk 1035, in Figure 33, has metallic contact bars 1061 and 1062 secured thereon as by rivets 1063. The contact bar 1061 has a metallic contact 1064 integral therewith which is adapted to be engaged by the leaf spring contact member 1056 when the follower shaft 1026 assumes the lowered position shown in Figure 29. The restricted upper portion 1034 of the vertically disposed follower shaft 1026 slidably penetrates the first insulation disk 1035 as well as the contact bar or block 1061 and the bar 1061 is held against the upper surface of the shoulder formed by the restricted portion of the shaft 1026 by the snap ring 1036 heretofore described (Figure 30).

It is thus seen that, upon the follower shaft 1026 moving downwardly for the reason heretofore described, the contact member 1056 will engage the contact 1064 on the contact bar 1061 to thus ground the circuit carried by the wire 403, this wire 403 being connected to the conventional stop motion of the loom in the manner heretofore described with respect to the original form of the invention. It might be stated that the wire 403 carries a low current, say, 12½ volts, to the housing 1016 from the drop-wire stop motion of the loom and, upon the contact member 1056 and contact 1064 moving into engagement, current will flow from the housing 1016 through follower shaft 1026, plate 1061 (Figure 33), through contacts 1064 and 1056, through the corresponding rivets 1054, contact 1051 and wire 1055 to be grounded on the brackets 250a.

The contact bar 1062 has a pair of contact members 1066 and 1067 on opposed ends thereof which are adapted to be engaged by the leaf spring contact members 1057 and 1058, respectively, upon the shaft 1026 moving to the lowered position, as shown in Figure 29, to thus complete a circuit between the wires 642 and 643 for actuating any desired apparatus such as the counter mechanism.

It will be observed in Figure 29 that the follower shaft housing 1016 has a leaf spring contact member 1070 secured thereto as by screws 1071, this leaf spring contact member 1070 functioning in substantially the same manner in which the leaf spring member 385 in the original form of stop motion apparatus 370 operates, this leaf spring member 385 being clearly shown in Figure 3 and having the ears 387 and 387' integral therewith.

The leaf spring contact member 1070 has ears 1072 and 1072' integral therewith which are adapted to be engaged by the respective portions 357 and 357' of the cutter head blocks 291 and 291', respectively, upon either one of the plows 360 or 360' being moved too far toward the front of the loom so as to ground the housing 1016 and to thus complete a circuit to the conventional stop motion of the loom through the wire 403 (Figure 29).

Referring to Figures 28 and 29, it will be observed that the lower end of the follower shaft housing 1016 has an annular groove 1073 therein and the enlarged tapering portion 1030 of the follower shaft 1026 has an annular groove 1074 therein. A corrugated flexible or rubber boot 1075, which is circular in cross-section has thickened annular portions 1076 at opposed ends thereof which are adapted to fit into the annular grooves 1073 and 1074 in the follower shaft housing 1016 and the enlarged portion 1030 of the shaft 1026 respectively. This boot 1075 is provided to prevent lint and other foreign matter from collecting on the exposed lower portion of the follower shaft 1026 which would, eventually, restrict vertical movement of the shaft 1026.

Now, referring to Figures 34 and 35, there is shown a modified form of swing arm assembly which may be employed in lieu of the swing arm 470, the post 473 and the junction box 476 shown in Figures 1 and 2. The modified form of swing arm shown in Figures 34 and 35, which is indicated broadly at 1080, has the extension cable 460 heretofore described as extending from the motor cover or shield 415, in Figures 1 and 2, extending thereto. The modified form of swing arm assembly comprises a flared tubular member 1081 suitably secured on the free end of a swing arm tubular member 1082 and the extension cable 460 extends into the flared end member 1081 and through the tubular member 1082.

The tubular swing arm 1082 is secured, as by a set screw 1083, in an outwardly projecting portion 1084 disposed adjacent the upper end of a hollow cap member 1085. The hollow cap member 1085 has a passageway 1086 therein through which the extension cable 460 passes into the confines of the cap 1085.

The cap member 1085 is fixedly mounted on the outer race of a ball bearing 1090, the inner race of which is mounted on a restricted portion 1091 of a post 1092. The post 1092 is tubular and the cable 460 extends from the passageway 1086 through the tubular post 1092 and the wires contained therein are connected to the male plug 475 heretofore described. The post 1092 is fixedly secured, as by a set screw 1095 to a hollow bracket 1096 which is secured, as by screws 1097, to a cast junction box 1100. The male plug 475 is suitably secured, in a conventional manner, to a plate 1101 secured to the lower surface of the tubular bracket 1096. The female plug 531 is secured, in a conventional manner, to a plate 1103 secured, as by screws 1104, to the lower surface of the upper wall of the junction box 1100. The junction box 1100 is substantially the same as the junction box 476 in the original form of the invention with the exception of the tubular bracket 1096 being secured to the upper surface thereof and the lower portion having feet, to be presently described, thereon.

Comparing the junction box 476 shown in Figures 1, 2 and 25-A with the junction box 1100 shown in Figures 34 and 35, the junction box 1100 is provided with a dummy plug 555, the cables 478 and 479, the wire 505 and is also provided with the window 506, the parts associated with the modified form of junction box 1100 which are identical to the parts associated with the junction box 476 bearing the same reference characters for purposes of clarity with respect to the wiring diagram shown in Figures 25 and 25-A. The modified form of junction box 1100 also has feet 1110 thereon which are penetrated by screws 1112 for securing the junction box 1100, as well as the swing arm assembly 1080, to the upper surface of the arch 14. It has already been described as to the points to which the wire 505 and the cables 478 and 479 extend and a further description thereof is deemed unnecessary with respect to the modified form of the invention shown in Figures 34 and 35.

It is thus seen that the extension cable 460 may move to and fro with the float cutting apparatus and the tubular swing arm 1082 in the modified form of the invention shown in the Figures 34 and 35, may swing back and forth accordingly, the cap 1085 oscillating freely on the bearing 1090 at the upper end of the fixed tubular post 1092.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a loom for weaving fabric, said loom having means for floating selected warp yarns to form floating portions on the upper face of the fabric, an improved float cutting apparatus for severing the floated portions of the selected warp yarns comprising a trackway disposed transversely of the loom, a carriage mounted for travel on the trackway, means for moving the carriage back and forth on the trackway from one side of the loom to the other, rotary cutting means supported by the carriage, and disposed above the path of travel of the fabric being woven, the axis of said cutting means being parallel to the warp yarns and a pair of means disposed 180° from each other and extending radially from each side of said cutting means for passing beneath the floated portions and directing the floated portions to the cutting means upon movement of the carriage in both directions of travel across the loom, and means operable automatically for reversing the direction of travel of the carriage when it has completed its travel across the fabric.

2. In a loom for weaving a fabric having transverse rows of spaced floated portions of warp yarns on its upper surface, said loom having an oscillatable lay and also having a breast beam, a trackway secured to the breast beam and extending substantially from one side of the loom to the other, a carriage mounted for movement along said trackway and a motor on said carriage, a rotary shaft mounted for longitudinal sliding movement in the carriage, a cutter head mounted on said rotary shaft and disposed above the path of travel of the fabric being woven, said cutter head comprising a rotary cutting disk fixed on the shaft, a connection between the motor and the cutting disk for driving the rotary shaft and means on the cutter head for engaging the upper surface of the fabric and for directing floated portions of the yarns being woven into the fabric to the cutting disk for severing said floated portions of the yarns intermediate the points at which they are woven into the fabric, said means for directing the floated portions to the cutting disk being mounted to travel with the shaft in its longitudinal movement while the shaft is rotatably mounted in said means.

3. In a loom for weaving a fabric having transverse rows of spaced floated portions of warp yarns on its upper surface, said loom having an oscillatable lay and also having a breast beam, a trackway secured to the breast beam and extending substantially from one side of the loom to the other, a carriage mounted for movement along said trackway and a motor on said carriage, a cutter head mounted on said carriage and disposed above the path of travel of the fabric being woven, said cutter head comprising a rotary cutting disk and a connection between the motor and the cutting disk for driving the cutting disk, means on the cutter head for engaging the upper surface of the fabric and for directing floated portions of the yarns being woven into the fabric to the cutting disk for severing said floated portions of the yarns interminate the points at which they are woven into the fabric, a resilient connection between the cutter head and the disk and the means for directing the floated portions of the yarns to the disk, whereby, upon said means for directing the floated portions of the yarns to the disk being engaged by the floated portions of the yarns at their points of anchorage, further movement of the fabric being woven will cause the cutting disk and the associated means for directing the floated portions of the yarns to the cutting disk to move along with the fabric being woven, said resilient connection allowing limited movement on both sides of the mean line of movement of the cutter head between the cutter head on the one hand and the disk and the means for directing the floated portions.

4. An improvement in a float cutting apparatus for a loom for weaving fabrics and having means for weaving selected warp yarns to form floated warp portions spaced from each other and being disposed in rows extending transversely of the upper face of the fabric, said loom having an oscillatable lay and also having a breast beam extending from one side to the other thereof, a trackway mounted on the breast beam, a float cutting apparatus mounted on said trackway, said improvement comprising two cutter heads carried by the float cutting apparatus, each of said cutter heads including a rotary cutting disk, a pair of guiding means disposed 180 degrees from each other and disposed in the path of travel of the rotary cutting disks for directing the floated warp portions on the face of the fabric to the rotary cutting disks, driving means for driving the rotary cutting disks and a mechanical connection between said driving means for the rotary cutting disk and the trackway so arranged as to cause movement of the float cutting apparatus along said trackway whereby said float cutting apparatus may move from one side of the loom to the other while the cutting disks are severing the floated warp sections on the face of the fabric which are directed to the cutting disk, and means for reversing the direction of travel of the float cutting apparatus when the apparatus has traversed the width of the fabric.

5. In a loom for weaving fabrics and having means for weaving selected warp yarns to form floated warp sections spaced from each other and extending transversely of the fabric on the upper face of the fabric, said loom having an oscillatable lay and also having a breast beam extending from one side to the other thereof, a trackway mounted on the breast beam, a float cutting apparatus mounted on said trackway, cutter heads carried by the float cutting apparatus, each of said cutter heads including a rotary cutting disk and means for directing the floated warp sections on the face of the fabric to the rotary cutting disk, driving means for driving the rotary cutting disks, a mechanical connection between said driving means for the rotary cutting disks and the trackway so arranged as to cause movement of the float cutting apparatus along said trackway whereby said float cutting apparatus may move from one side of the loom to the other while the cutting disks are severing the floated warp sections on the face of the fabric which are directed to the cutting disks and a rotary brush associated with each of said cutting disks and disposed in close proximity thereto for wiping the ends of the floated warp sections as they are severed by the corresponding rotary cutting disks to assist in locking the floated warp sections in the fabric upon succeeding floated warp sections being severed in a like manner.

6. In a loom for weaving fabric wherein floated portions are formed of selected warp yarns, said loom having an oscillatable lay, an improved float cutting apparatus including a trackway extending from one side of the loom to the other, a carriage mounted for movement along said trackway, a cutter head carried by said carriage, said cutter head including at least one rotary cutting disk, the axis of which is disposed parallel to the warp yarns and the lower edge of which is disposed closely adjacent the upper surface of the fabric being woven, oppositely directed plows disposed adjacent the cutting disk for passing between the floated portions of the warp yarns and the fabric and for directing the floated portions to the cutting disk upon movement of the carriage to and fro transversely of the loom, pattern controlled means for initially starting movement of the carriage from adjacent one selvage of the fabric being woven so as to cause the leading one of the plows to direct the adjacent floated portions of the warp yarns to the cutting disk and means automatically operable upon movement of the carriage a comparatively short distance from the adjacent selvage of the fabric for reversing the direction of movement of the carriage so as to cause the other of the plows to direct those floated portions of the warp yarns previously disposed beneath the plows to the cutting disk.

7. In a loom for weaving fabric wherein floated portions are formed of selected warp yarns, said loom having an oscillatable lay, an improved float cutting apparatus including a trackway extending from one side of the loom to the other, a carriage mounted for movement along said trackway, a cutter head carried by said carriage, said cutter head including at least one rotary cutting disk, the axis of which is disposed parallel to the warp yarns and the lower edge of which is disposed adjacent the upper surface of the fabric being woven, oppositely directed plows disposed adjacent the cutting disk for passing between the floated portions of the warp yarns and the fabric and for directing the floated portions to the cutting disk upon movement of the carriage to and fro transversely of the loom, pattern controlled means for initially starting movement of the carriage from adjacent one selvage of the fabric being woven so as to cause the leading one of the plows to direct the adjacent floating portions of the warp yarns to the cutting disk, means automatically operable upon movement of the carriage a comparatively short distance from the adjacent selvage of the fabric for reversing the direction of movement of the carriage so as to cause the other of the plows to direct those floated portions of the warp yarns previously disposed beneath the plows to the cutting disk and automatically controlled means for again causing the carriage to move in its original direction from the selvage of the fabric to the opposite selvage thereof to sever the floated portions of the warp yarns throughout the width of the fabric being woven.

8. In a loom for weaving fabric wherein floated portions are formed of selected warp yarns, said loom having an oscillatable lay, an improved float cutting apparatus including a trackway extending from one side of the loom to the other, a carriage mounted for movement along said trackway, a cutter head carried by said carriage, said cutter head including at least one rotary cutting disk, the axis of which is disposed parallel to the warp yarns and the lower edge of which is disposed closely adjacent the upper surface of the fabric being woven, oppositely directed plows disposed adjacent the cutting disk for passing between the floated portions of the warp yarns and the fabric and for directing the floated portions to the cutting disk upon movement of the carriage to and fro transversely of the loom, pattern controlled means for initially starting movement of the carriage from adjacent one selvage of the fabric being woven so as to cause the leading one of the plows to direct the adjacent floated portions of the warp yarns to the cutting disk, means automatically operable upon movement of the carriage a comparatively short distance from the adjacent selvage of the fabric for reversing the direction of movement of the carriage so as to cause the other of the plows to direct those floated portions of the warp yarns previously disposed beneath the plows to the cutting disk, automatically controlled means for again causing the carriage to move in its original direction from the selvage of the fabric to the opposite selvage thereof to sever the floated portions of the warp yarns throughout the width of the fabric being woven and means for automatically stopping movement of the carriage in the event a plow moves through the fabric to engage the lower side of the fabric.

9. In a loom for weaving fabrics and having means for weaving selected warp yarns to form floated warp sections spaced apart from each other and extending transversely of the fabric on the upper face of the fabric, said loom having an oscillatable lay and also having a breast beam extending from one side to the other thereof, a trackway mounted on the breast beam, a float cutting apparatus mounted on said trackway, cutter heads carried by the float cutting apparatus, each of said cutter heads including a rotary cutting disk, means for directing the floated warp sections on the face of the fabric to the rotary cutting disk, driving means for driving the rotary cutting disk, a mechanical connection between said driving means for the rotary cutting disk and the trackway so arranged as to cause movement of the float cutting apparatus along said trackway whereby said float cutting apparatus may move from one side of the loom to the other while the cutting disks are severing the floated warp sections on the face of the fabric which are directed to the cutting disk, shock absorbing means on the float cutting apparatus and means on the trackway engageable by the shock absorbing means upon the float cutting apparatus reaching the end of its path of travel upon moving across the loom in either direction.

10. Apparatus for cutting floated threads disposed on top of a fabric to form tufts comprising a carriage mounted for movement across and above the top of the fabric, the carriage having a pair of oppositely directed plows thereon adapted to move beneath the floated threads of the fabric, cutting means associated with the plows and penetrating the top portions of the plows and whereby the floated threads will be directed to the cutting apparatus, means for moving the apparatus over the top surface of the fabric, means for causing the float cutting apparatus to move a predetermined distance across the fabric, means for automatically reversing the apparatus to cause it to return to the edge of the fabric to cause the floated threads missed by the leading plow to be engaged by the other plow upon reverse movement of the apparatus and means for again reversing the direction of travel of the apparatus to cause it to move to the other edge of the fabric.

11. In a loom for weaving fabrics having means for floating a plurality of laterally spaced portions of the warp threads to cause them to appear as floats on top of the fabric, a trackway mounted on the loom and extending transversely of the loom, a carriage mounted for travel back and forth along the trackway, a pair of oppositely directed plows disposed on the carriage and adapted to ride on the top surface of the fabric and to pass beneath the floats appearing on the top of the fabric, each of the plows having a cutting means associated therewith and extending down into the top portion of the plows for engaging the floats directed over the plows, means controlled by the loom after a predetermined number of picks have been effected for moving the carriage transversely of the loom along its trackway to cause the leading plow to pass beneath the floats to direct them to the cutting apparatus to sever the same, means for reversing the direction of travel of the carriage after it has moved a portion of the distance along the trackway for causing its other plow to pass beneath floats which were not engaged by the preceding plow and to direct the floats to the cutting apparatus associated with the last named plow and means for again reversing the direction of travel of the carriage to cause the carriage to move to the other end of the trackway to sever the floats to the extreme other edge of the fabric.

12. In a loom for weaving fabric having means for forming spaced spots of warp threads floated on top of the fabric and extending in a substantially straight line across the fabric from one edge to the other, a trackway mounted on the loom and extending from one side of the loom to the other, a carriage mounted on the trackway and having a pair of oppositely directed plows for engaging the top of the fabric and passing beneath the floated warp threads, each of the plows having a cutter associated therewith for cutting the floated threads when directed upwardly over the plows, means operable by the loom for moving the carriage along its trackway to cause the leading plow to pass beneath floated warp threads to direct them to the cutter associated therewith, means automatically operable after the carriage has moved a predetermined distance from the edge of the fabric for reversing the direction of travel of the fabric to cause the other plow to pass beneath the floated warp threads adjacent the selvage edge of the fabric to direct the same to the cutter associated with said other plow and means for again automatically reversing the direction of travel of the carriage to cause it to move to the other end of the trackway to sever the floated warp threads in its travel entirely across the fabric.

13. In a loom for weaving fabric, said loom having means for floating selected warp yarns to form floated portions on the upper face of the fabric, an improved float cutting apparatus for severing the floated portions of the selected warp yarns comprising a carriage, means for moving the carriage from one side of the loom to the other, at least one driven rotary cutting disk supported by the carriage, and disposed above the path of travel of the fabric being woven, the axis of said cutting disk being parallel to the warp yarns, means extending radially of said cutting disk and from opposed sides of the cutting disk for passing beneath the floated portions and directing the floated portions to the cutting disk upon movement of the carriage across the loom and automatic means for stopping the carriage in the event the means for passing beneath the floated portions passes through the fabric to engage the lower side thereof.

14. In a loom for weaving fabric, said loom having means for floating selected warp yarns to form floated portions on the upper face of the fabric, an improved float cutting apparatus for severing the floated portions of the selected warp yarns comprising a carriage, means for moving the carriage from one side of the loom to the other, at least one driven rotary cutting disk supported by the carriage and disposed above the path of travel of the fabric being woven, the axis of said cutting disk being parallel to the warp yarns, means extending radially of said cutting disk and from opposed sides of the cutting disk for passing beneath the floated portions and directing the floated portions to the cutting disk upon movement of the carriage across the loom, automatic means for stoppage the carriage in the event the means for passing beneath the floated portions passes through the fabric to engage the lower side thereof and means allowing movement of the means for passing beneath the floated portions and the cutting disk longitudinally of the direction of travel of the fabric being woven.

15. In a loom for weaving a fabric having transverse rows of spaced floated warp yarns on its upper surface, said loom having an oscillatable lay and also having a breast beam, a trackway secured to the breast beam and extending substantially the entire length thereof from one side of the loom to the other, a carriage mounted for movement along said trackway and a motor on said carriage, a cutter head mounted on said carriage and disposed above the path of travel of the fabric being woven, said cutter head comprising a rotary cutting disk and a connection between the motor and the cutting disk for driving the cutting disk, means on the cutter head for engaging the upper surface of the fabric and for directing floated warp yarns being woven into the fabric to the cutting disk for severing said floated warp yarns intermediate the points at which they are woven into the fabric and means for automatically stopping travel of the carriage upon the means for engaging the upper surface of the fabric for directing floated warp yarns passing to the underneath side of the fabric.

16. In a loom for weaving a fabric having transverse rows of spaced floated warp yarns on its upper surface, said loom having an oscillatable lay and also having a breast beam, a trackway secured to the breast beam and extending substantially the entire length thereof from one side of the loom to the other, a carriage mounted for movement along said trackway and a motor on said carriage, a cutter head mounted on said carriage and disposed above the path of travel of the fabric being woven, said cutter head comprising a rotary cutting disk and a connection between the motor and the cutting disk for driving the cutting disk, means on the cutter head for engaging the upper surface of the fabric and for directing floated warp yarns being woven into the fabric to the cutting disk for severing said floated warp yarns intermediate the points at which they are woven into the fabric, means for automatically stopping travel of the carriage upon the means for engaging the upper surface of the fabric for directing floated warp yarns passing to the underneath side of the fabric and means for allowing movement longitudinally of the warp yarns of the rotary cutting disk and the means for engaging the upper surface of the fabric while traveling transversely of the fabric.

17. In a loom for weaving fabrics and having means for weaving selected warp yarns to form floated portions spaced from each other and extending transversely of the fabric on the upper face of the fabric, said loom having an oscillatable lay and also having a breast beam extending from one side to the other thereof, a trackway mounted on the breast beam, a float cutting apparatus mounted on said trackway, cutter heads carried by the float cutting apparatus, each of said cutter heads including a rotary cutting disk, means for directing the floated portions on the face of the fabric to the rotary cutting disk, driving means for driving the rotary cutting disks and a mechanical connection between said driving means for the rotary cutting disks and the trackway so arranged as to cause movement of the float cutting apparatus along said trackway whereby said float cutting apparatus may move from one side of the loom to the other while the cutting disks are severing the floated warp portions on the face of the fabric which are directed to the cutting disk and means for reversing the direction of travel of the float cutting apparatus after it has moved a predetermined distance away from the edge of the fabric to cause it to return to the edge of the fabric and means for again reversing the direction of travel of the float cutting apparatus to cause it to move to the other edge of the fabric.

18. In a loom for weaving fabrics and having means for weaving selected warp yarns to form floated portions spaced from each other and extending transversely of the fabric on the upper face of the fabric, said loom having an oscillatable lay and also having a breast beam extending from one side to the other thereof, a trackway mounted on the breast beam, a float cutting apparatus mounted on said trackway, cutter heads carried by the float cutting apparatus, each of said cutter heads including a rotary cutting disk, means for directing the floated portions on the face of the fabric to the rotary cutting disks, driving means for driving the rotary cutting disks and a mechanical connection between said driving means for the rotary cutting disks and the trackway so arranged as to cause movement of the float cutting apparatus along said trackway whereby said float cutting apparatus may move from one side of the loom to the other while the cutting disks are severing the floated warp portions on the face of the fabric which are directed to the cutting disks, means for reversing the direction of travel of the float cutting apparatus after it has moved a predetermined distance away from the edge of the fabric to cause it to return to the edge of the fabric, means for again reversing the direction of travel of the float cutting apparatus to cause it to move to the other edge of the fabric and means for stopping travel of the float cutting apparatus when the means for directing the floated portions on the face of the fabric to the rotary cutting disks moves through a thin place in the fabric to engage the lower surface of the fabric.

19. In a loom for weaving fabrics and having means for weaving selected warp yarns to form floated warp portions spaced from each other and extending transversely of the fabric on the upper face of the fabric, said loom having an oscillatable lay and also having a breast beam extending from one side to the other thereof, a trackway mounted on the breast beam, a float cutting apparatus mounted on said trackway, a pair of cutter heads carried by the float cutting apparatus, each of said cutter heads including a rotary cutting disk and means associated with each cutting disk and extending in opposite directions for directing the floated warp sections on the face of the fabric to the rotary cutting disk, driving means for driving the rotary cutting disk, a mechanical connection between said driving means for the rotary cutting disk and the trackway so arranged as to cause movement of the float cutting apparatus along said trackway whereby said float cutting apparatus may move from one side of the loom to the other while one of the cutting disks is severing the floated warp portions on the face of the fabric which are directed to the cutting disk and means for allowing movement of each of the rotary cutting disks longitudinally of the fabric and transversely of the float cutting apparatus to cause the means for directing the floated warp portions on the face of the fabric to follow a row of the floated warp portions if the same should be out of a straight line and also since the position of the floated warp portions change from pick to pick of the loom.

20. In a loom for weaving fabric wherein floated portions are formed of selected warp yarns, said loom having an oscillatable lay, an improved float cutting apparatus including a trackway extending from one side of the loom to the other, a carriage mounted for movement along said trackway, a cutter head carried by said carriage, said cutter head including at least one rotary cutting disk, the axis of which is disposed parallel to the warp yarns and the lower edge of which is disposed closely adjacent the upper surface of the fabric being woven, oppositely directed plows disposed adjacent the cutting disk for passing between the floated portions of the warp yarns and the fabric and for directing the floated portions to the cutting disk upon movement of the carriage to and fro transversely of the loom, pattern controlled means for initially starting movement of the carriage from adjacent one selvage of the fabric being woven so as to cause the leading one of the plows to direct the adjacent floated portions of the warp yarns to the cutting disk, means automatically operable upon movement of the carriage a comparatively short distance from the adjacent selvage of the fabric for reversing the direction of movement of the carriage so as to cause the other of the plows to direct those floated portions of the warp yarns previously disposed beneath the plows to the cutting disk and a driven rotary shaft on which the rotary cutting disk is mounted and means permitting movement of the rotary cutting disk and the plows associated therewith longitudinal of the fabric as the carriage moves transversely of the fabric.

21. In a loom for weaving fabric wherein floated portions are formed of selected warp yarns, said loom having an oscillatable lay, an improved float cutting apparatus including a trackway extending from one side of the loom to the other, a carriage mounted for movement along said trackway, a cutter head carried by said carriage, said cutter head including at least one rotary cutting disk, the axis of which is disposed parallel to the warp yarns and the lower edge of which is disposed closely adjacent the upper surface of the fabric being woven, oppositely directed plows disposed adjacent the cutting disk for passing between the floated portions of the warp yarns and the fabric and for directing the floated portions to the cutting disk upon movement of the carriage to and fro transversely of the loom, pattern controlled means for initially starting movement of the carriage from adjacent one selvage of the fabric being woven so as to cause the leading one of the plows to direct the adjacent floated portions of the warp yarns to the cutting disk, means automatically operable upon movement of the carriage a comparatively short distance from the adjacent selvage of the fabric for reversing the direction of movement of the carriage so as to cause the other of the plows to direct those floated portions of the warp yarns previously disposed beneath the plows to the cutting disk and means for stopping travel of the carriage upon one of the plows passing through the fabric to the lower side thereof.

22. In a loom for weaving fabric having an oscillatable lay and having means for floating spaced portions of warp threads on the top side of the fabric to form floats, a pattern chain, a trackway disposed transversely of the loom and above the fabric, a carriage mounted on the trackway and having a pair of rotary shafts extending horizontally therefrom, means permitting floating movement of the shafts along their longitudinal axes, a rotary cutting disk mounted on the outer ends of each of the rotary shafts, a plow mechanism associated with the rotary cutting disks and having oppositely pointed plow portions provided with grooves into which the lower portions of the rotary cutting disks are adapted to have movement, the plows serving to pass beneath the floats and the main body of the fabric and to direct the floats over the upper portion of the plow and into contact with the rotary cutting disk, an electric motor mounted on the carriage mechanism, means controlled by the pattern chain after a predetermined number of picks have been woven by the loom for energizing said motor to cause it to travel along the trackway, automatically operable means for causing a reverse movement of the carriage after it has moved a short distance from end of the trackway to reverse the same to cause the other trailing plow to pass beneath the floats over which the carriage was resting at the edge of the fabric to sever the same and means for again reversing direction of travel of the carriage to cause it to move all the way across the trackway to the other side of the fabric and means for automatically stopping the carriage when it has reached the other end of the trackway.

23. In a loom for weaving a fabric having an oscillatable lay and having means for floating spaced portions of warp threads to form floats on the top side of the fabric, a pattern chain, a trackway disposed transversely of the loom and above the fabric, a carriage mounted on the trackway and having a pair of rotary shafts extending horizontally therefrom, means permitting floating movement of the shafts along their longitudinal axes, a rotary cutting disk mounted on the outer ends of each of the rotary shafts, a plow mechanism associated with the rotary cutting disks and having oppositely pointed plow portions provided with grooves into which the lower portions of the rotary cutting disks are adapted to have movement, the plow serving to pass beneath the floats and the main body of the fabric and to direct the floats over the upper portion of the plow and into contact with the rotary cutting disk, an electric motor mounted on the carriage mechanism, means controlled by the pattern chain after a predetermined number of picks have been woven by the loom for energizing said motor to cause it to travel along the trackway, automatically operable means for causing a reverse movement of the carriage after it has moved a short distance from one end of the trackway to reverse the same to cause the other trailing plow to pass beneath the floats over which the carriage was resting at the edge of the fabric to sever the same, means for again reversing direction of travel of the carriage to cause it to move all the way across the trackway to the other side of the fabric, means for automatically stopping the carriage when it has reached the other end of the trackway and means for automatically stopping travel of the carriage when either one of the plows passes through a thin place in the fabric to engage the lower surface of the fabric.

24. Apparatus for cutting floated warp threads disposed in spaced relation to each other and transversely of the top of a fabric, comprising a carriage mounted for movement above and transversely of the fabric, the carriage having a pair of oppositely directed pointed plows thereon and adapted to move beneath the floated warp threads of the fabric and to guide the floated warp threads into contact with the top surface of the plows, a pair of rotary cutting disks disposed above the plows and each plow being provided with a groove into which the peripheral portion of the cutting disk is adapted to have movement, means for permitting movement of the rotary cutting disks and the plows longitudinally of the fabric while the carriage is traversing the fabric, means for moving the apparatus transversely of the fabric, means for causing the carriage to move a predetermined distance across the fabric and means for automatically reversing the direction of travel of the carriage to cause it to return to the edge of the fabric to cause the floated warp threads missed by the leading plow to be engaged by the trailing plow upon reverse movement of the apparatus, means for again reversing the direction of travel of the carriage to cause it to move to the other edge of the fabric and means for again reversing the direction of travel of the apparatus to cause it to move a predetermined distance away from the other edge of the fabric, means for again reversing the direction of travel of the apparatus to cause it to return to the end of the trackway adjacent the other edge of the fabric and means for again reversing the direction of travel of the apparatus to cause it to move back to the starting point from whence it first began movement.

25. Apparatus for cutting floated warp threads disposed in spaced relation to each other and transversely of the top of a fabric, comprising a carriage mounted for movement above and transversely of the fabric, the carriage having a pair of oppositely directed pointed plows thereon and adapted to move beneath the floated warp threads of the fabric and to guide the floated warp threads into contact with the top surface of the plows, a pair of rotary cutting disks disposed above the plows and each plow being provided with a groove into which the peripheral portion of the cutting disk is adapted to have movement, means for permitting movement of the rotary cutting disks and the plows longitudinally of the fabric while the carriage is traversing the fabric, means for moving the apparatus transversely of the fabric, means for causing the carriage to move a predetermined distance across the fabric and means for automatically reversing the direction of travel of the carriage to cause it to return to the edge of the fabric to cause the floated warp threads missed by the leading plow to be engaged by the trailing plow upon reverse movement of the apparatus, means for again reversing the direction of travel of the carriage to cause it to move to the other edge of the fabric and means for again reversing the direction of travel of the apparatus to cause it to move a predetermined distance away from the other edge of the fabric, means for again reversing the direction of travel of the apparatus to cause it to return to the end of the trackway adjacent the other edge of the fabric, means for again reversing the direction of travel of the apparatus to cause it to move back to the starting point from whence it first began movement and means for automatically stopping the travel of the apparatus when one of the plows passes through the fabric to engage the lower side of the fabric.

26. Apparatus for cutting floated warp threads disposed in spaced relation to each other and transversely of the top of a fabric, comprising a carriage mounted for movement above and transversely of the fabric, the carriage having a pair of oppositely directed pointed plows thereon and adapted to move beneath the floated warp threads of the fabric and to guide the floated warp threads into contact with the top surface of the plows, a pair of rotary cutting disks disposed above the plows and each plow being provided with a groove into which the peripheral portion of the cutting disk is adapted to have movement, means for permitting movement of the rotary cutting disks and the plows longitudinally of the fabric while the carriage is traversing the fabric, means for moving the apparatus transversely of the fabric, means for causing the carriage to move a predetermined distance across the fabric and means for automatically reversing the direction of travel of the carriage to cause it to return to the edge of the fabric to cause the floated warp threads missed by the leading plow to be engaged by the trailing plow upon reverse movement of apparatus, means for again reversing the direction of travel of the carriage to cause it to move to the other edge of the fabric and means for again reversing the direction of travel of the apparatus to cause it to move a predetermined distance away from the other edge of the fabric, means for again reversing the direction of travel of the apparatus to cause it to return to the end of the trackway adjacent the other edge of the fabric, means for again reversing the direction of travel of the apparatus to cause it to move back to the starting point from whence it first began movement, means for automatically stopping the travel of the apparatus when one of the plows passes through the fabric to engage the lower side of the fabric and means for initiating movement of the carriage for travel transversely of the fabric.

27. In a loom for weaving fabric, said loom having means for floated selected warp yarns to form floating portions on the upper face of the fabric, an improved float cutting apparatus for severing the floated portions of the selected warp yarns comprising a carriage, means for moving the carriage from one side of the loom to the other, at least one driven rotary cutting disk supported by the carriage, and disposed above the path of travel of the fabric being woven, the axis of said cutting disk being parallel to the warp yarns, means extending radially of said cutting disk and from opposed sides of the cutting disk for passing beneath the floated portions and directing the floated portions to the cutting disk upon movement of the carriage across the loom and a rotary brush associated with the cutting disk and disposed in close proximity thereto for wiping the ends of the severed floated portions after they have been severed by the rotary cutting disk.

28. In a loom for weaving a fabric having transverse rows of spaced floated warp yarns on its upper surface, said loom having an oscillatable lay and also having a breast beam, a trackway secured to the breast beam and extending substantially the entire length thereof from one side of the loom to the other, a carriage mounted for movement along said trackway and a motor on said carriage, a cutter head mounted on said carriage and disposed above the path of travel of the fabrics being woven, said cutter head comprising a rotary cutting disk and a connection between the motor and the cutting disk for driving the cutting disk, means on the cutter head for engaging the upper surface of the fabric and for directing floated warp yarns being woven into the fabric to the cutting disk for severing said floated warp yarns intermediate the points at which they are woven into the fabric and a rotary brush associated with the cutting disk and disposed in close proximity thereto for wiping the ends of the severed floated warp yarns after they have been severed by the rotary cutting disk.

29. In a loom for weaving a fabric having transverse rows of spaced floated warp yarns on its upper surface, said loom having an oscillatable lay and also having a breast beam, a trackway secured to the breast beam and extending substantially the entire length thereof from one side of the loom to the other, a carriage mounted for movement along said trackway and a motor on said carriage, a cutter head mounted on said carriage and disposed above the path of travel of the fabric being woven, said cutter head comprising a rotary cutting disk and a connection between the motor and the cutting disk for driving the cutting disk, means on the cutter head for engaging the upper surface of the fabric and for directing floated warp yarns being woven into the fabric to the cutting disk for severing said floated warp yarns intermediate the points at which they are woven into the fabric, a resilient connection between the cutter head and the disk and the means for directing the floated warp yarns to the disk, whereby, upon said means for directing the floated warp yarns to the disk being engaged by the floated warp yarns at their points of anchorage, further movement of the fabric being woven will cause the cutting disk and the associated means for directing the floated warp yarns to the cutting disk to move along with the fabric being woven and a rotary brush associated with the cutting disk and disposed in close proximity thereto for wiping the ends of the severed floated warp yarns after they have been severed by the rotary cutting disk.

30. In a loom for weaving fabric wherein floated portions are formed of selected warp yarns, said loom having an oscillatable lay, an improved float cutting apparatus including a trackway extending from one side of the loom to the other, a carriage mounted for movement along said trackway, a cutter head carried by said carriage, said cutter head including at least one rotary cutting disk, the axis of which is disposed parallel to the warp yarns and the lower edge of which is disposed closely adjacent the upper surface of the fabric being woven, oppositely directed plows disposed adjacent the cutting disk for passing between the floated portions of the warp yarns and the fabric and for directing the floated portions to the cutting disk upon movement of the carriage to and fro transversely of the loom, pattern controlled means for initially starting movement of the carriage from adjacent one selvage of the fabric being woven so as to cause the leading one of the plows to direct the adjacent floated portions of the warp yarns to the cutting disk, means automatically operable upon movement of the carriage a comparatively short distance from the adjacent selvage of the fabric for reversing the direction of movement of the carriage so as to cause the other of the plows to direct those floated portions of the warp yarns previously disposed beneath the plows to the cutting disk and a rotary brush associated with the cutting disk and disposed in close proximity thereto for wiping the ends of the severed floated portions after they have been severed by the rotary cutting disk.

31. In a loom for weaving fabric wherein floated portions are formed of selected warp yarns, said loom having an oscillatable lay, an improved float cutting apparatus including a trackway extending from one side of the loom to the other, a carriage mounted for movement along said trackway, a cutter head carried by said carriage, said cutter head including at least one rotary cutting disk, the axis of which is disposed parallel to the warp yarns and the lower edge of which is disposed closely adjacent the upper surface of the fabric being woven, oppositely directed plows disposed adjacent the cutting disk for passing between the floated portions of the warp yarns and the fabric and for directing the floated portions to the cutting disk upon movement of the carriage to and fro transversely of the loom, pattern controlled means for initially starting movement of the carriage from adjacent one selvage of the fabric being woven so as to cause the leading one of the plows to direct the adjacent floated portions of the warp yarns to the cutting disk, means automatically operable upon movement of the carriage a comparatively short distance from the adjacent selvage of the fabric for reversing the direction of movement of the carriage so as to cause the other of the plows to direct those floated portions of the warp yarns previously disposed beneath the plows to the cutting disk, automatically controlled means for again causing the carriage to move in its original direction from the selvage of the fabric to the opposite selvage thereof to sever the floated portions of the warp yarns throughout the width of the fabric being woven and a rotary brush associated with the cutting disk and disposed in close proximity thereto for wiping the ends of the severed floated portions after they have been severed by the rotary cutting disk.

32. In a loom for weaving fabric wherein floated portions are formed of selected warp yarns, said loom having an oscillatable lay, an improved float cutting apparatus including a trackway extending from one side of the loom to the other, a carriage mounted for movement along said trackway, a cutter head carried by said carriage, said cutter head including at least one rotary cutting disk, the axis of which is disposed parallel to the warp yarns and the lower edge of which is disposed closely adjacent the upper surface of the fabric being woven, oppositely directed plows disposed adjacent the cutting disk for passing between the floated portions of the warp yarns and the fabric and for directing the floated portions to the cutting disk upon movement of the carriage to and fro transversely of the loom, pattern controlled means for initially starting movement of the carriage from adjacent one selvage of the fabric being woven so as to cause the leading one of the plows to direct the adjacent floated portions of the warp yarns to the cutting disk, means automatically operable upon movement of the carriage a comparatively short distance from the adjacent selvage of the fabric for reversing the direction of movement of the carriage so as to cause the other of the plows to direct those floated portions of the warp yarns previously disposed beneath the plows to the cutting disk, automatically controlled means for again causing the carriage to move in its original direction from the selvage of the fabric to the opposite selvage thereof to sever the floated portions of the warp yarns throughout the width of the fabric being woven, operable means for automatically stopping movement of the carriage in the event a plow moves through the fabric to engage the lower side of the fabric and a rotary brush associated with the cutting disk and disposed in close proximity thereto for wiping the ends of the severed floated portions after they have been severed by the rotary cutting disk.

33. In a loom for weaving fabrics and having means for weaving selected warp yarns to form floated warp sections spaced apart from each other and extending transversely of the fabric on the upper face of the fabric, said loom having an oscillatable lay and also having a breast beam extending from one side to the other thereof, a trackway mounted on the breast beam, a float cutting apparatus mounted on said trackway, cutter heads carried by the float cutting apparatus, each of said cutter heads including a rotary cutting disk, means for directing the floated warp sections on the face of the fabric to the rotary cutting disks, driving means for driving the rotary cutting disks, a mechanical connection between said driving means for the rotary cutting disks and the trackway so arranged as to cause movement of the float cutting apparatus along said trackway whereby said float cutting apparatus may move from one side of the loom to the other while the cutting disks are severing the floated warp sections on the face of the fabric which are directed to the cutting disks, shock absorbing means on the float cutting apparatus, means on the trackway engageable by the shock absorbing means upon the float cutting apparatus reaching the end of its path of travel upon moving across the loom in either direction and a rotary brush associated with the cutting disks and disposed in close proximity thereto for wiping the ends of the severed floated warp sections after they have been severed by the rotary cutting disk.

34. In a loom for weaving fabrics and having means for weaving selected warp yarns to form floated warp sections spaced apart from each other and extending transversely of the fabric on the upper face of the fabric, said loom having an oscillatable lay and also having a breast beam extending from one side to the other thereof, a trackway mounted on the breast beam, a float cutting apparatus mounted for travel on said trackway, a cutter carried by the float cutting apparatus, means for directing the floated warp sections on the face of the fabric to the cutter, driving means for driving the float cutting apparatus along said trackway whereby said float cutting apparatus may move from one side of the loom to the other while the cutter is severing the floated warp sections on the face of the fabric which are directed to the cutter, shock absorbing means on the float cutting apparatus and means on the trackway engageable by the shock absorbing means upon the float cutting apparatus reaching the end of its path of travel upon moving across the loom in either direction and means for stopping travel of the float cutting apparatus when the means for directing the floated warp sections passes to the lower face of the fabric.

35. In a loom for weaving fabrics and having means for weaving selected warp yarns to form floated warp sections spaced apart from each other and extending transversely of the fabric on the upper face of the fabric, said loom having an oscillatable lay and also having a breast beam extending from one side to the other thereof, a trackway mounted on the breast beam, a float cutting apparatus mounted on said trackway, a cutter carried by the float cutting apparatus, means for directing the floated warp sections on the face of the fabric to the cutter, means for driving the float cutting apparatus along said trackway whereby said float cutting apparatus may move from one side of the loom to the other while the cutter is severing the floated warp sections on the face of the fabric which are directed to the cutter, shock absorbing means on the float cutting apparatus, means on the trackway engageable by the shock absorbing means upon the float cutting apparatus reaching the end of its path of travel upon moving across the loom in either direction, means for reversing the direction of travel of the float cutting apparatus after it has moved a portion of the distance across the fabric to return it to its starting point and means for again reversing the direction of travel of the float cutting apparatus to cause it to travel to the other end of the trackway.

36. In a loom for weaving fabric having means for floating selected warp yarns to form floated portions on the upper face of the fabric and also having an electrical stop motion, an improved float cutting apparatus for severing the floated portions of the selected warp yarns comprising a carriage, means for moving the carriage from one side of the loom to the other, rotary cutting means supported by the carriage and disposed in closely spaced relation above the path of travel of the fabric being woven, the axis of said rotary cutting means being parallel to the warp yarns, means extending radially from opposed sides of the rotary cutting means for passing beneath the floated portions of the warp yarns and directing the floated portions of the warp yarns to the rotary cutting means upon movement of the carriage across the loom, means allowing movement of the rotary cutting means and its associated means for passing beneath the floated portions longitudinally of the axis of the rotary cutting means, electrical contact means carried by the carriage and engageable by said means extending radially from opposed sides of the rotary cutting means upon said means extending from opposed sides of the rotary cutting means being moved longitudinally of the axis of said rotary cutting means beyond a predetermined point for actuating the electrical stop motion of the loom for stopping the loom.

37. In a structure according to claim 36, said means engageable by the means extending from opposed sides of the rotary cutting means comprising a leaf spring contact member insulatably secured to the carriage and an electrical connection between the stop motion of the loom and the leaf spring contact member whereby, upon the means extending radially from opposed sides of the rotary cutting means moving into engagement with the leaf spring contact member, the circuit carried by the leaf spring contact member will be grounded to thus complete a circuit to the stop motion of the loom.

38. In a loom for weaving fabric having means for floating selected warp yarns to form floating portions on the upper face of the fabric, an improved float cutting apparatus for severing the floated portions of the selected warp yarns comprising a carriage, means for moving the carriage from one side of the loom to the other, at least one driven rotary cutting disk supported by the carriage, and disposed above the path of travel of the fabric being woven, the axis of said cutting disk being parallel to the warp yarns, means extending radially of said cutting disk and from opposed sides of the cutting disk for passing beneath the floated portions and directing the floated portions to the cutting disk upon movement of the carriage across the loom means allowing movement of the means for passing beneath the floated portions and the cutting disk longitudinally of the direction of travel of the fabric being woven, and an electrical contact means carried by the carriage and engageable by said means extending radially of said cutting disk upon said radially extending means being moved longitudinally of the axis of the cutting disk beyond a predetermined point.

39. In a loom for weaving fabrics and having means for weaving selected warp yarns to form floats, said loom having a breast beam extending from one side to the other thereof and also having an electrical stop motion for stopping the loom upon breakage of any one of the warp yarns carried thereby, a float cutting apparatus comprising a carriage, means on the breast beam for supporting said carriage and on which the carriage may travel from one side of the loom to the other, cutter heads carried by the carriage, each of said cutter heads including rotary cutting means, means for directing the floats on the face of the fabric to the rotary cutting means, an electrical stop motion apparatus carried by said carriage and having a follower thereon disposed closely adjacent the rotary cutting means and adapted to move in engagement with the upper face of said fabric being woven and also having cooperating electrical contact means adapted to complete a circuit upon downward movement of the follower by gravity, and electrical connection between the electrical stop motion of the loom and the electrical stop motion apparatus carried by the carriage whereby, upon the occurrence of a torn place, in the fabric being woven, in the path of the rotary cutting means, the follower will pass through said torn place by gravity, and will complete a circuit to the electrical stop motion of the loom to stop the loom.

40. In a loom for weaving fabrics and having means for weaving selected warp yarns to form floats, said loom having a breast beam extending from one side to the other thereof and also having an electrical stop motion for stopping the loom upon breakage of any one of the warp yarns carried thereby, a float cutting apparatus comprising a carriage, means on the breast beam for supporting said carriage and on which the carriage may travel from one side of the loom to the other, cutter heads carried by the carriage, each of said cutter heads including rotary cutting means and means for directing the floats on the face of the fabric to the rotary cutting means, an electrical stop motion apparatus carried by said carriage and having a follower thereon disposed closely adjacent the rotary cutting means and adapted to move into engagement with the upper face of said fabric being woven and also having cooperating electrical contact means adapted to complete a circuit upon downward movement of the follower means by gravity, an electrical connection between the electrical stop motion of the loom and the electrical stop motion apparatus carried by the carriage whereby, upon the occurrence of a thin or torn place in the fabric being woven and in the path of the rotary cutting means, the follower means will pass through said torn or thin place by gravity, and will complete a circuit to the electrical stop motion of the loom to stop the loom, said electrical stop motion apparatus carried by the carriage comprising a vertically extending portion integral with the carriage and spaced substantially above the fabric being woven, a metallic substantially L-shaped member secured to the vertical portion of said bracket, an insulation bearing rod fixedly secured in the L-shaped member, a follower shaft mounted for vertical sliding movement in the insulation bearing rod, a follower on the lower end of the follower shaft and adapted to ride in engagement with the fabric being woven upon movement of the carriage transversely of the loom, a metallic plate secured to the upper end of said follower shaft and spaced above the L-shaped member, a leaf spring contact member extending from the L-shaped member and in the vertical plane of said metallic plate, a source of electrical energy, an electrical connection between said metallic plate and the stop motion of the loom whereby, upon downward movement of said follower shaft by gravity, upon the occurrence of a thin or torn place in the fabric being woven, the metallic plate will move into engagement with the leaf spring contact member carried by the L-shaped member to ground the circuit carried by the metallic plate and to actuate the electrical stop motion of the loom.

41. In a loom for weaving fabrics and having means for weaving selected warp yarns to form floated warp sections spaced from each other transversely of the fabric and on the upper face thereof, said loom having a breast beam extending from one side to the other thereof and said loom also having an electrical stop motion for stopping the loom upon any one of the warp yarns being severed, a trackway mounted on the breast beam, a float cutting apparatus comprising a carriage mounted for movement along said trackway, at least one cutter head carried by the carriage, resilient means for holding the cutter head in a predetermined position and permitting movement of the cutter head longitudinally of the fabric being woven, at least one plow carried by the cutter head and being adapted to pass beneath the floated warp sections for directing the floated warp sections to the cutter head to be severed thereby upon movement of said carriage transversely of the loom, said resilient means associated with the cutter head being provided to permit movement of said plow with the fabric as the plow is engaged by the floated warp sections upon transverse movement of the carriage and as the fabric is being woven, an electrical stop motion carried by the carriage and comprising a metallic bracket, an insulation rod carried by the bracket, said insulation rod having a portion thereof extending adjacent the plow carried by said cutter head, a leaf spring contact member fixedly secured on said insulation rod and having at least one wing portion integral therewith extending adjacent the plow and in the horizontal plane of the plow, an electrical connection between said leaf spring contact member and the electrical stop motion of the loom whereby, upon said plow being moved beyond a predetermined point through engagement with the floated warp sections, the plow will engage the leaf spring contact member and the circuit carried by the leaf spring contact member from the electrical stop motion of the loom will be completed to stop the loom.

42. In a loom for weaving fabrics and having means for weaving selected warp yarns to form floated warp sections spaced from each other transversely of the fabric and on the upper face thereof, said loom having a breast beam extending from one side to the other thereof and also having an electrical stop motion for stopping the loom upon any one of the warp yarns being severed, a trackway mounted on the breast beam, a float cutting apparatus comprising a carriage mounted for movement along said trackway, at least one cutter head carried by the carriage and resilient means for holding the cutter head in a predetermined position and permitting movement of the cutter head longitudinally of the fabric being woven, at least one plow carried by the cutter head and being adapted to pass beneath the floated warp sections for directing the floated warp sections to the cutter head to be severed thereby upon movement of said carriage transversely of the loom, said resilient means associated with the cutter head being provided to permit movement of said plow with the fabric as the plow is engaged by the floated warp sections upon transverse movement of the carriage and as the fabric is being woven, an electrical stop motion apparatus carried by the carriage and comprising a metallic stop motion housing insulatably secured to the carriage, an electrical connection extending from the electrical stop motion of the loom to the stop motion housing on the carriage, a metallic follower shaft mounted for vertically sliding movement in the housing, means on the lower end of the follower shaft adapted to move in engagement with the fabric being woven and being disposed closely adjacent the cutter head, means directing the follower shaft downwardly upon the occurrence of a torn place in the fabric being woven, a first insulation member carried by the housing and a second insulation member carried by the shaft, coinciding contact members on the insulation members, a metallic plate connecting the contact member on the second insulation member with the follower shaft, a conductor extending from one of the contact members on the first insulation member to the carriage, whereby, upon the follower shaft moving downwardly, the contact member on the second insulation member will move into engagement with the coinciding contact member on the first insulation member and a circuit will be completed from the stop motion of the loom through the housing and the follower shaft and the contact member on the first insulation member and through the conductor connected thereto to the carriage to complete a circuit to the electrical stop motion of the loom for stopping the loom.

43. In a loom for weaving fabrics and having means for weaving selected warp yarns to form floated warp sections spaced from each other transversely of the fabric and on the upper face thereof, said loom having a breast beam extending from one side to the other thereof and also having an electrical stop motion for stopping the loom upon any one of the warp yarns being severed, a trackway mounted on the breast beam, a float cutting apparatus comprising a carriage mounted for movement along said trackway, at least one cutter head carried by the carriage and resilient means for holding the cutter head in a predetermined position and permitting movement of the cutter head longitudinally of the fabric being woven, at least one plow carried by the cutter head and being adapted to pass beneath the floated warp sections for directing the floated warp sections to the cutter head to be severed thereby upon movement of said carriage transversely of the loom, said resilient means associated with the cutter head being provided to permit movement of said plow with the fabric as the plow is engaged by the floated warp sections upon transverse movement of the carriage and as the fabric is being woven, a stop motion apparatus carried by the carriage comprising a metallic housing insulatably secured to the carriage, an electrical connection between the metallic housing and the electrical stop motion of the loom, at least one leaf spring member carried by the metallic housing and extending closely adjacent and in the same horizontal plane of the plow on said cutter head, whereby, upon the cutter head and its associated plow being moved in a horizontal plane beyond a predetermined point through engagement with the floated warp sections, the plow will engage the leaf spring contact member to ground the circuit carried thereby from the electrical stop motion of the loom to thus stop the loom.

44. In a loom for weaving fabrics and having means for weaving selected warp yarns to form floated warp sections spaced from each other transversely of the fabric and on the upper face thereof, said loom having an arch and also having a dobby mechanism and also having a breast beam and also having an electrically operable stop motion responsive to the breakage of any of the warp yarns and also having a breast beam extending from one side to the other thereof, a trackway mounted on the breast beam, a junction box fixed on the arch of the loom, a float cutting apparatus mounted for movement on said trackway, a source of electrical energy, cutter heads carried by the float cutting apparatus and extending over the fabric, each of said cutter heads including a rotary cutting disk and means for directing the floated sections on the face of the fabric to the rotary cutting disks, electrically operable driving means for driving the rotary cutting disks, a mechanical connection between said driving means for the rotary cutting disks and the trackway so arranged as to cause movement of the float cutting apparatus along said trackway simultaneously with movement of the rotary cutting disks, an electrically operable stop motion apparatus effective in completing a circuit upon the occurrence of a thin or torn place in the fabric being woven, an electrical connection between the dobby head and the driving means for the rotary cutting disks for initiating operation thereof, an electrical connection between the electrical stop motion of the loom and the electrical stop motion apparatus on the float cutting apparatus for effecting operation of the stop motion of the loom upon the circuit being completed by the stop motion apparatus on the float cutting apparatus caused by the occurrence of a thin or torn place in the fabric, a wing arm carried by the arch of the loom and extending horizontally therefrom and terminating in a plane substantially above the float cutting apparatus, a cable for said electrical connections, a portion of said cable extending from the float cutting apparatus along said swing arm and to the junction box, whereby, upon movement of the float cutting apparatus transversely of the loom, the swing arm may be swung by the cable extending from the float cutting apparatus to the free end of the swing arm to thus prevent the cable from interfering with operation of the loom.

45. In a structure according to claim 44, said swing arm comprising a vertically disposed shaft secured on the arch and extending upwardly therefrom, a sleeve mounted for oscillation on the vertically disposed shaft, means securing one end of the swing arm to the sleeve, said swing arm having an eye formed in the free end thereof and said junction box being secured to the arch adjacent the vertically disposed shaft, said cable extending from the float cutting apparatus through said eye and along said swing arm, means securing the cable to the swing arm adjacent the point at which it is connected to the sleeve and said cable then extending from the swing arm to the junction box.

46. In a loom for weaving fabrics and having means for weaving selected warp yarns to form floated warp sections spaced from each other transversely of the fabric and on the upper face thereof, said loom having an arch and also having a dobby head and also having a breast beam and also having an electrically operable stop motion responsive to the breakage of any of the warp yarns and also having a breast beam extending from one side to the other thereof, a trackway mounted on the breast beam, a junction box fixed on the arch of the loom, a float cutting apparatus mounted for movement on said trackway, a source of electrical energy, cutter heads carried by the float cutting apparatus, each of said cutter heads including a rotary cutting means and means for directing the floated sections on the face of the fabric to the rotary cutting means, electrically operable driving means for driving the rotary cutting means, a mechanical connection between said driving means for the rotary cutting means and the trackway so arranged as to cause movement of the float cutting apparatus along said trackway simultaneously with movement of the rotary cutting means, an electrically operable stop motion apparatus effective in completing a circuit upon the occurrence of a thin or torn place in the fabric being woven, an electrical connection between the dobby head and the driving means for the rotary cutting means for initiating operation thereof, an electrical connection between the electrical stop motion of the loom and the electrical stop motion apparatus on the float cutting apparatus for effecting operation of the stop motion of the loom upon the circuit being completed by the stop motion apparatus on the float cutting apparatus caused by the occurrence of a thin or torn place in the fabric, a swing arm, said swing arm comprising a base member secured to the upper surface of said junction box, said base member being tubular throughout its length and extending upwardly from the junction box, an opening in the junction box coinciding with the base member, an anti-friction bearing secured to the upper end of said tubular base member, a hollow cap member mounted for oscillation on said bearing on the upper end of the base member, a tubular member fixedly mounted adjacent the upper end of said cap member and extending in a horizontal plane therefrom, a passageway in the upper portion of the hollow cap member and communicating with the tubular member, the end of said tubular member remote from the cap member terminating in a vertical plane substantially above the float cutting apparatus, a cable for said electrical connections and a portion of the cable extending from the float cutting apparatus and successively through the tubular member, through the hollow cap member, through the base member and the coinciding opening in the junction box whereby, upon movement of the carriage transversely of the loom, the tubular member of the swing arm may move transversely of the loom at its free end and the cap member will oscillate with movement of the tubular member, the tubular member serving to support the cable so the cable will not interfere with operation of the loom and the float cutting apparatus, and said electrical connections from the dobby head and the electrical stop motion of the loom extending through the junction box and through said cable.

47. In a loom for weaving fabric having means for weaving selected warp yarns to form floated warp sections spaced from each other transversely of the fabric and on the upper face thereof, said loom having an oscillatable lay and also having a breast beam extending from one side to the other thereof and also having a source of electrical energy, a trackway mounted on the breast beam and extending substantially the entire length thereof, a float cutting apparatus mounted on said trackway, said trackway comprising a trackway bar secured to the breast beam, rollers carried by the float cutting apparatus and some of the rollers engaging the upper surface of said trackway bar and other of the rollers engaging the vertical face of said trackway bar for supporting the float cutting apparatus, a rack having gear teeth therein depending from said trackway bar and extending in parallel relation thereto, cutter heads carried by the float cutting apparatus and having rotary cutting means associated therewith, means for directing the floated warp sections on the face of the fabric to the rotary cutting means, driving means for driving the rotary cutting means and for imparting movement to the float cutting apparatus transversely of the loom comprising an electric motor, means controlled by the loom for energizing the electric motor, said motor having a shaft, a pinion mounted on one end of said shaft and engaging said rack whereby, upon energization of the motor, rotation will be imparted to the pinion to cause movement of the float cutting apparatus transversely of the loom, driving connections between the rotary cutting means and the shaft of said motor whereby, upon movement of the float cutting apparatus transversely of the loom, rotation will be imparted to the rotary cutting means.

48. In a loom for weaving fabrics and having means for weaving selected warp yarns to form floated warp sections spaced from each other transversely of the fabric and on the upper face thereof, said loom having a breast beam extending from one side to the other thereof, a trackway mounted on the breast beam, a float cutting apparatus comprising a carriage mounted for movement along said trackway, at least one cutter head carried by the carriage, resilient means for holding the cutter head in a predetermined position and permitting movement of the cutter head longitudinally of the fabric being woven and independently of the carriage, at least one plow carried by the cutter head and being adapted to pass beneath the floated warp sections for directing the floated warp sections to the cutter head to be severed thereby upon movement of said carriage transversely of the loom, said resilient means associated with the cutter head being provided to permit movement of said plow with the fabric as the plow is engaged by the floated warp sections upon transverse movement of the carriage and as the fabric is being woven.

References Cited in the file of this patent

UNITED STATES PATENTS

| Number | Name | Date |
|---|---|---|
| 701,578 | Knowlton | June 3, 1902 |
| 779,763 | Boynton | Jan. 10, 1905 |
| 843,444 | Cunane | Feb. 5, 1907 |
| 1,016,512 | Morton | Feb. 6, 1912 |
| 1,103,838 | Rehfuss et al. | July 14, 1914 |
| 1,450,011 | Wagner | Mar. 27, 1923 |
| 1,557,345 | Schumacher | Oct. 13, 1925 |
| 1,752,611 | Naumann | Apr. 1, 1930 |
| 2,192,410 | Moore et al. | Mar. 5, 1940 |
| 2,445,024 | Fiorina | July 13, 1948 |
| 2,471,845 | Szabo | May 31, 1949 |
| 2,598,578 | McCutchen et al. | May 27, 1952 |
| 2,598,579 | McCutchen et al. | May 27, 1952 |

FOREIGN PATENTS

| Number | Country | Date |
|---|---|---|
| 7,621 | Great Britain | of 1890 |
| 748,100 | France | Apr. 10, 1933 |